United States Patent [19]
Schenk, Jr.

[11] 3,909,301
[45] Sept. 30, 1975

[54] POSITIVE DISPLACEMENT BONDING

[75] Inventor: Raymond L. Schenk, Jr., Doylestown, Pa.

[73] Assignee: Gould Inc., St. Paul, Minn.

[22] Filed: Jan. 21, 1974

[21] Appl. No.: 435,178

[52] U.S. Cl.............. 136/134 R; 29/204; 136/176; 164/DIG. 1; 228/58
[51] Int. Cl.² B23K .............. 11/10; H01M 2/22; H01M 2/30
[58] Field of Search ............ 164/80, 107, 108, 110, 164/DIG. 1; 29/486, 498, 491, 472.1, 204, 475, 494, 495; 136/176, 134 R, 168; 228/45, 58; 219/78, 86

[56] References Cited
UNITED STATES PATENTS

| | | | |
|---|---|---|---|
| 1,094,173 | 4/1914 | Skinner | 136/168 |
| 1,355,396 | 10/1920 | Hawkins | 136/168 |
| 1,467,651 | 9/1923 | Pray | 136/134 R |
| 2,045,523 | 6/1936 | Fassler | 219/86 |
| 2,053,417 | 9/1936 | Brace | 29/494 |
| 2,272,968 | 2/1942 | Dyer | 219/86 |
| 2,612,460 | 9/1952 | Willard et al. | 29/495 X |
| 2,875,514 | 3/1959 | Doerr | 29/495 X |
| 3,490,954 | 1/1970 | Babusci et al. | 136/168 |
| 3,665,148 | 5/1972 | Yasenchak et al. | 228/45 X |
| 3,736,642 | 6/1973 | Miller et al. | 29/204 |
| 3,762,958 | 10/1973 | Kuylenstierna | 136/168 X |
| 3,767,889 | 10/1973 | Sano et al. | 219/137 X |
| 3,793,087 | 2/1974 | Blandford et al. | 136/168 |

*Primary Examiner*—Francis S. Husar
*Assistant Examiner*—Carl Rowold
*Attorney, Agent, or Firm*—Wolfe, Hubbard, Leydig, Voit & Osann, Ltd.

[57] ABSTRACT

Methods and apparatus for positive displacement bonding and products formed thereby and, more particularly, methods and apparatus for automatically forming, on a continuous, reproducible basis, fusion bonds devoid of structural, electrical and cosmetic defects between two or more workpieces by: 1) moving a heated electrode into the area to be bonded so as to uniformly heat and melt the portions of the workpieces to be bonded; while, at the same time, 2) displacing substantially all of the molten material from the area to be bonded into a storage area or reservoir surrounding the heated electrode where such molten material is maintained in its uniformly heated molten state, and 3) maintaining the area of the bond substantially free of oxidants; and, 4) then retracting the electrode so as to permit the molten material to return to the cavity formed by the electrode in the workpieces where such molten material is allowed to cool and solidify—thus forming a flawless bond between the workpieces. Thermal or fusion bonds are made in accordance with the methods of the invention and with the apparatus of the invention by a combination of 1) elevated temperature levels sufficient to melt the material to be bonded, and 2) displacement of the molten material; as contrasted with more conventional techniques and/or apparatus which combine elevated temperature levels and pressure.

33 Claims, 52 Drawing Figures

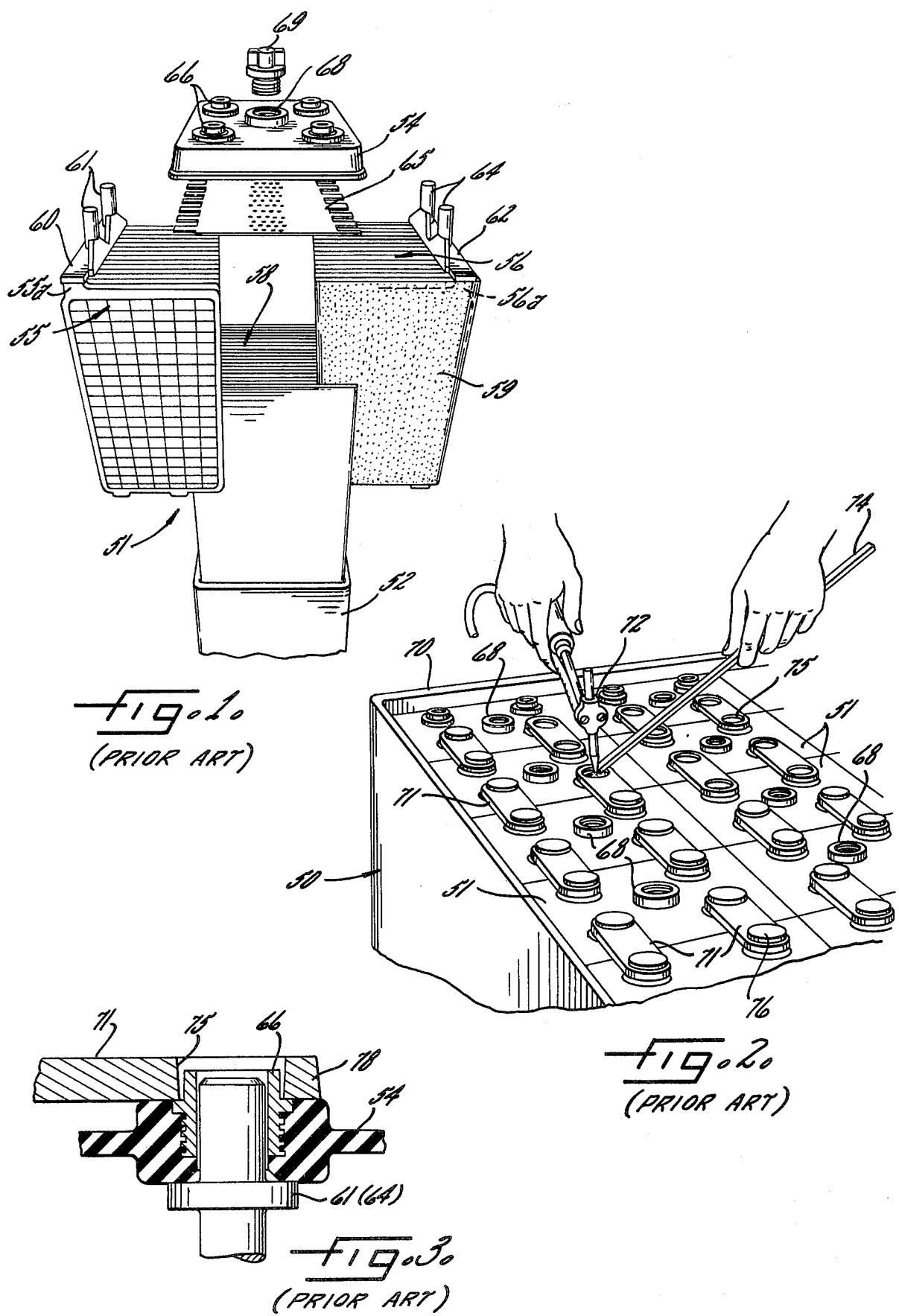

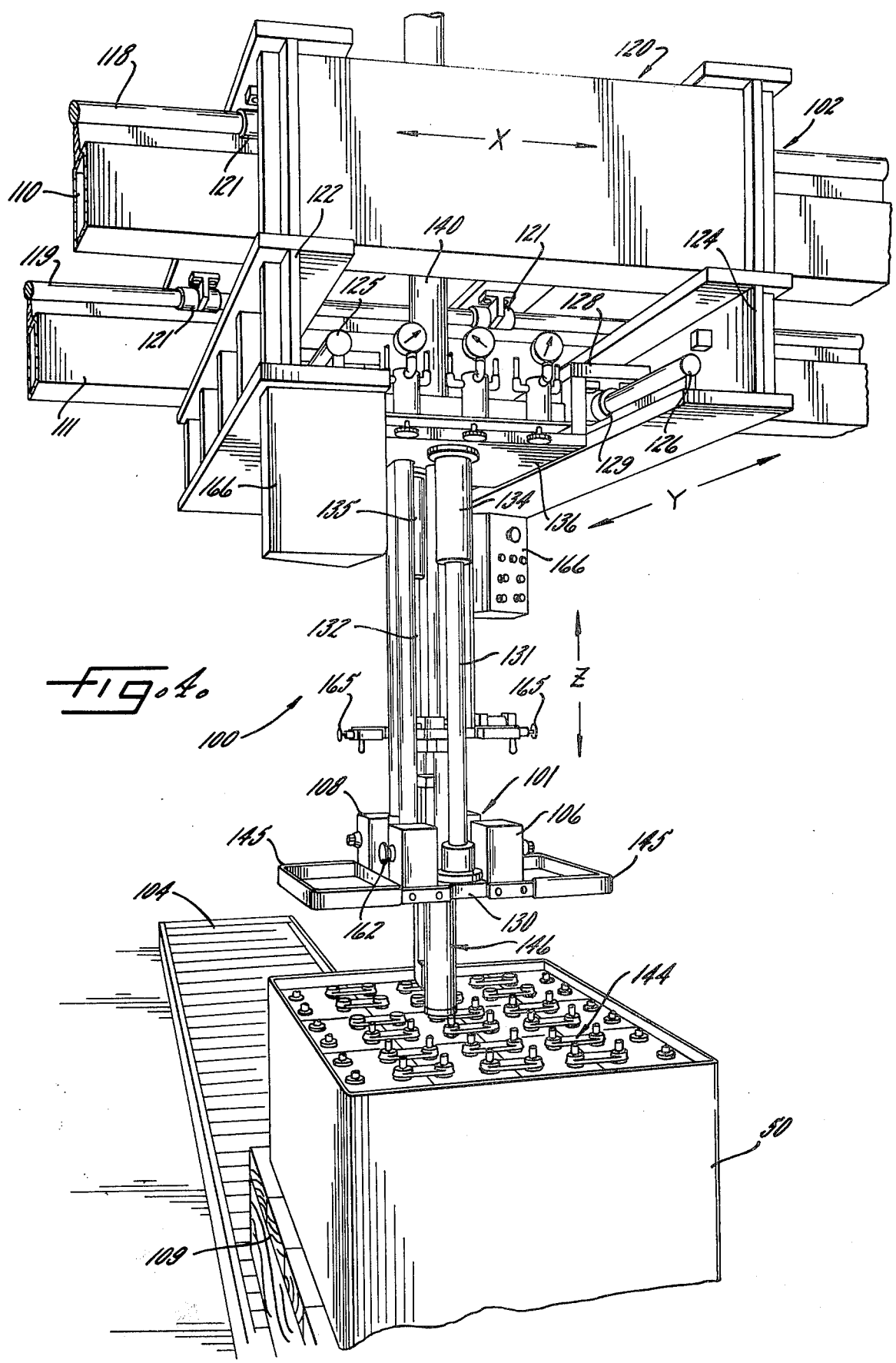

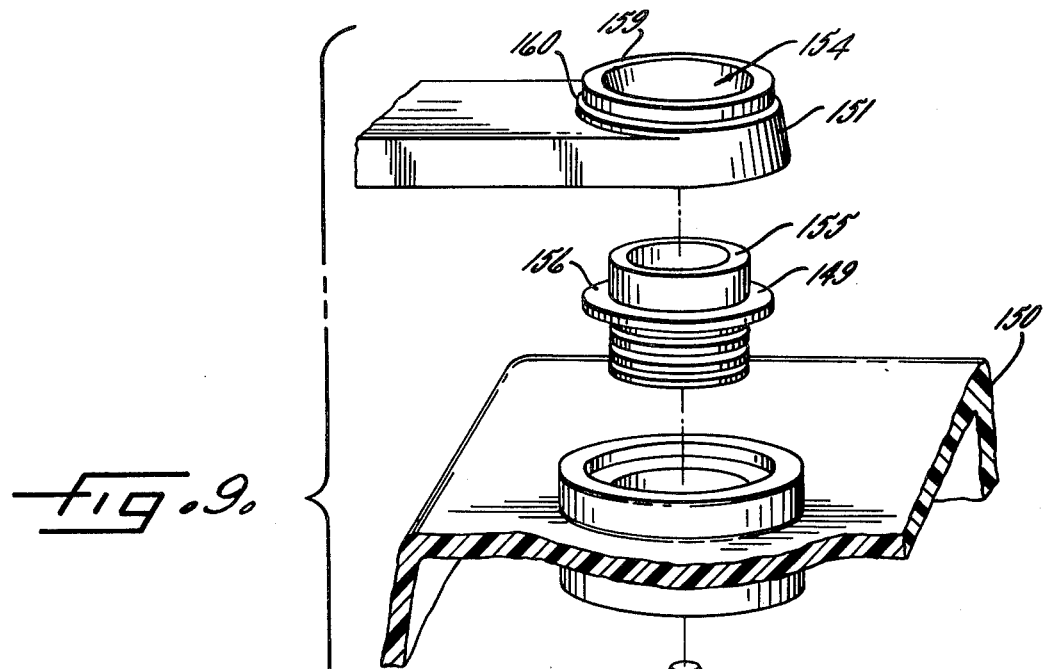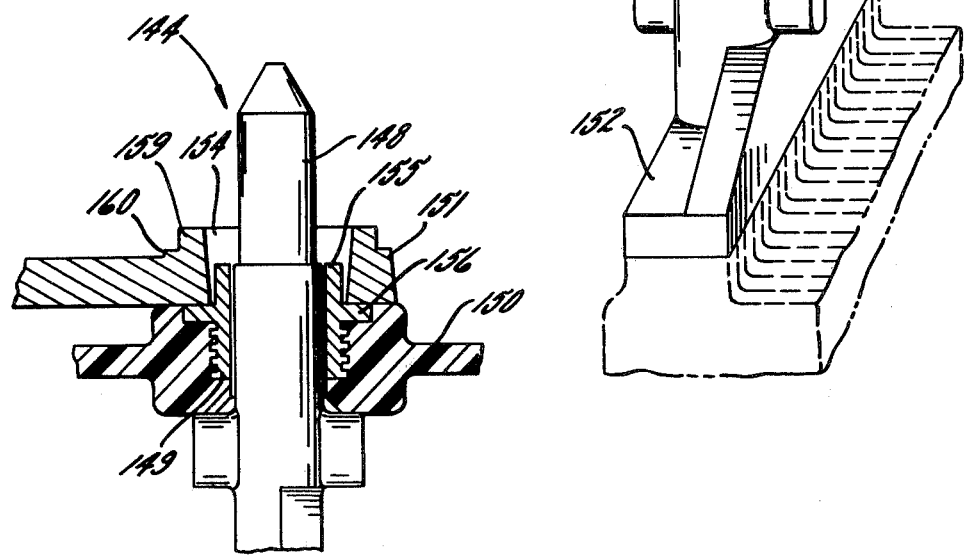

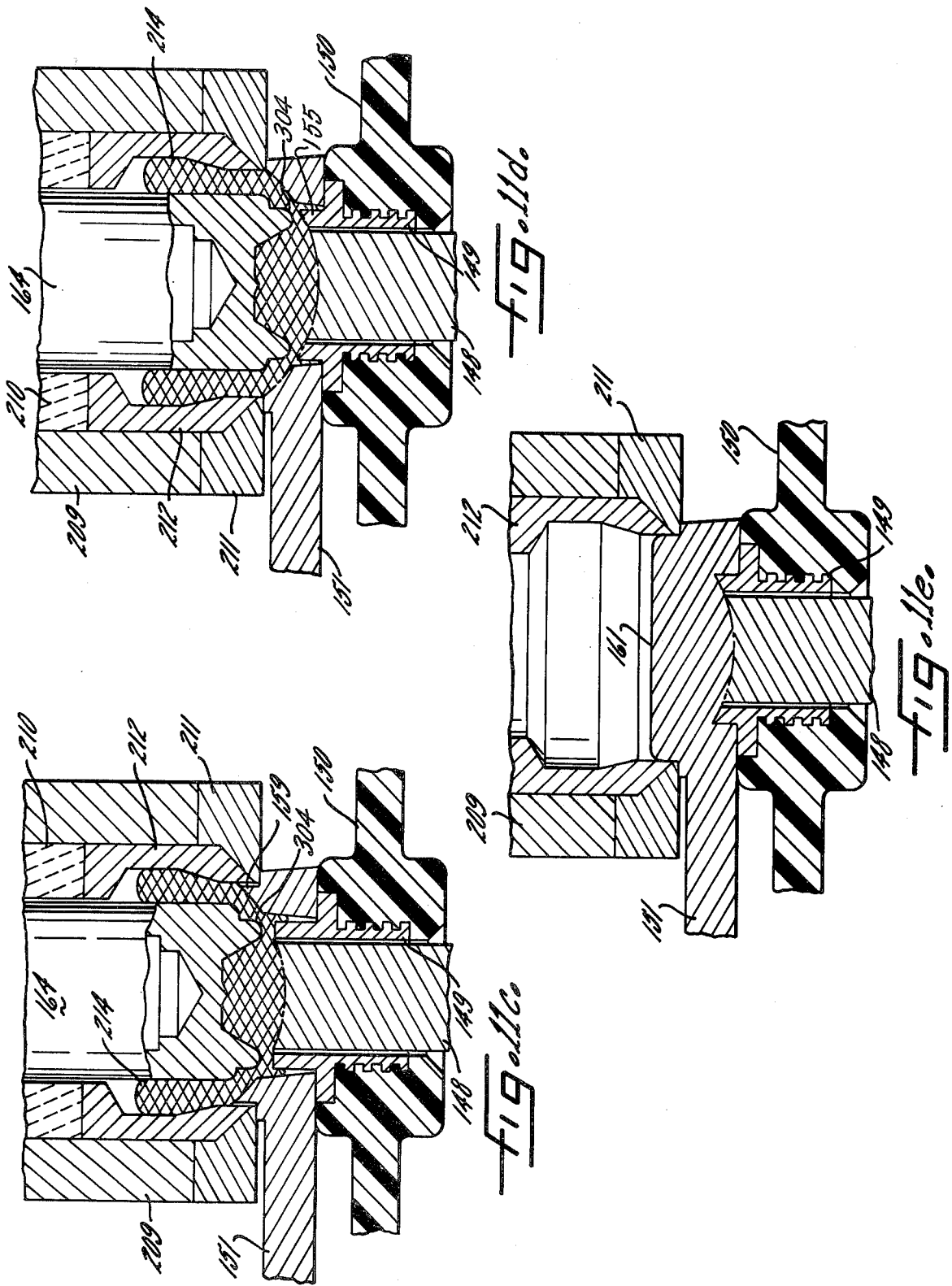

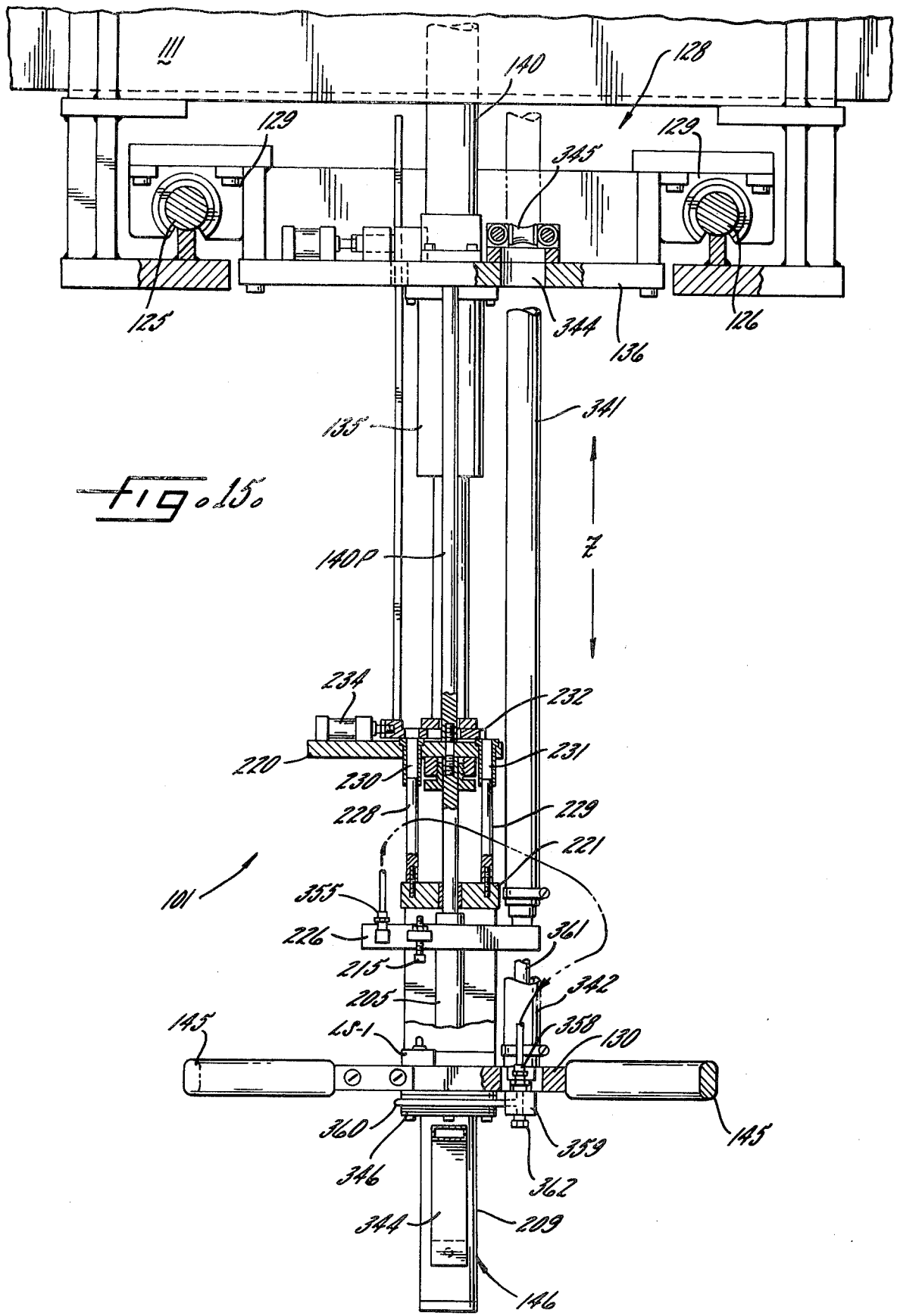

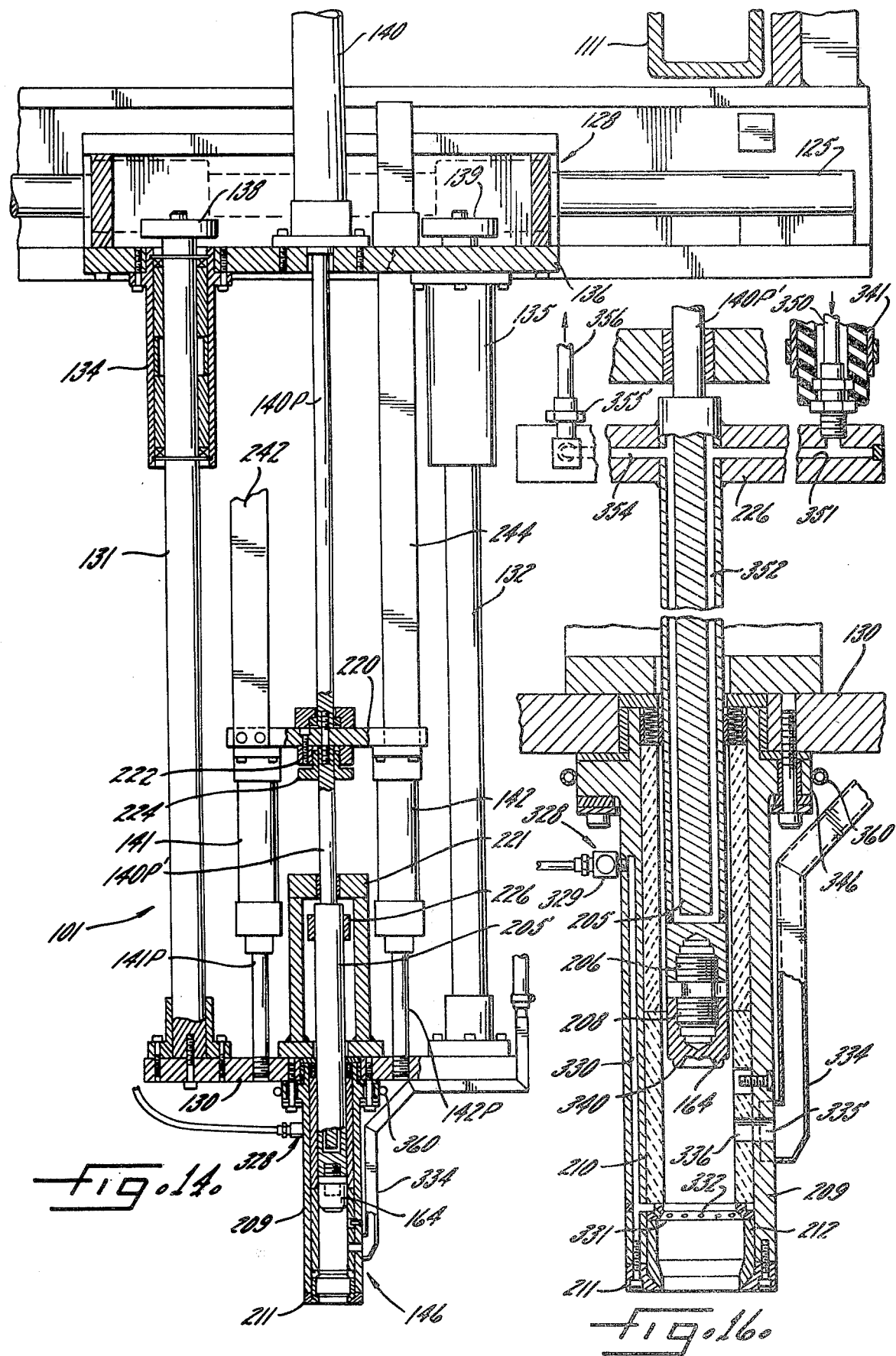

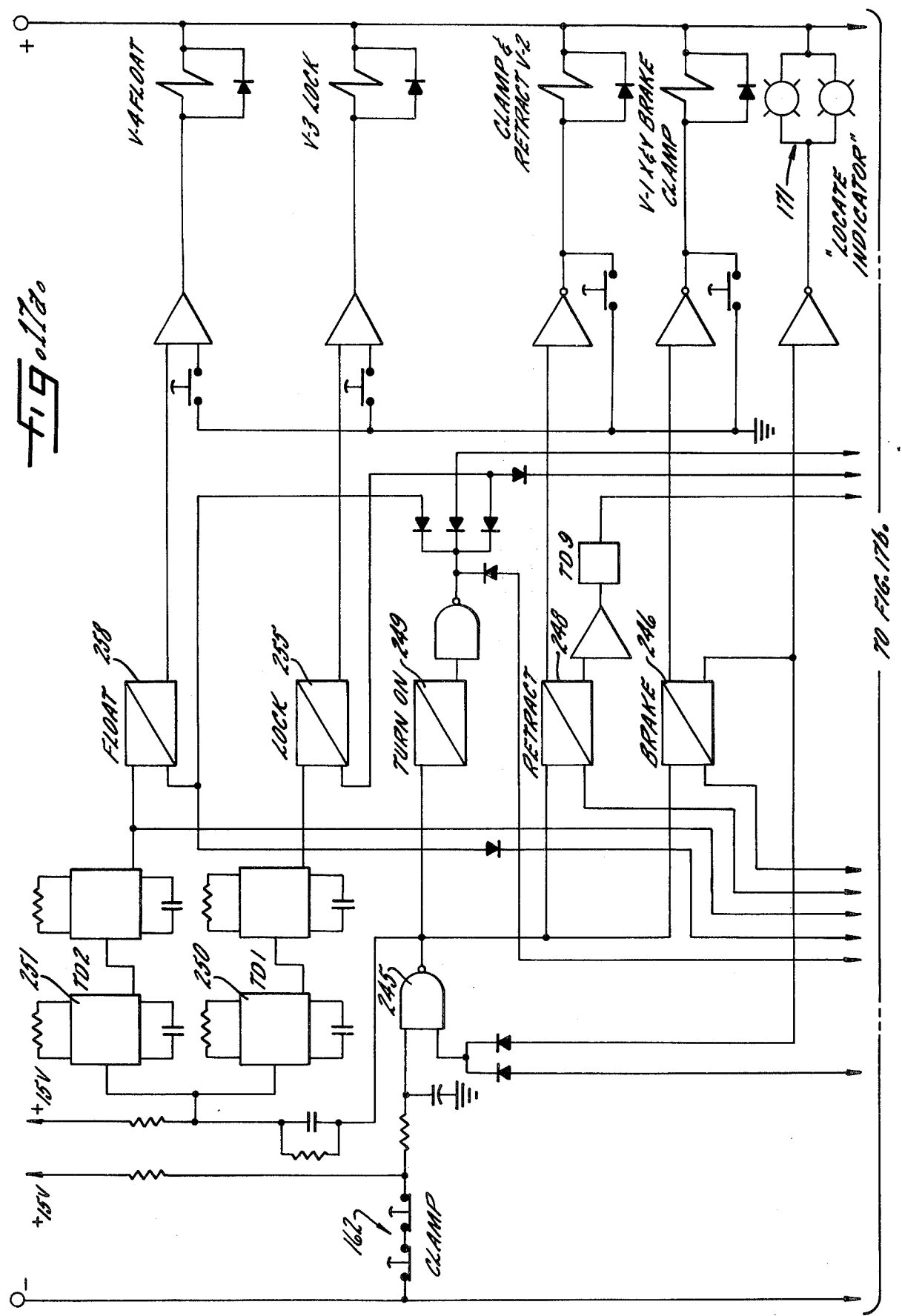

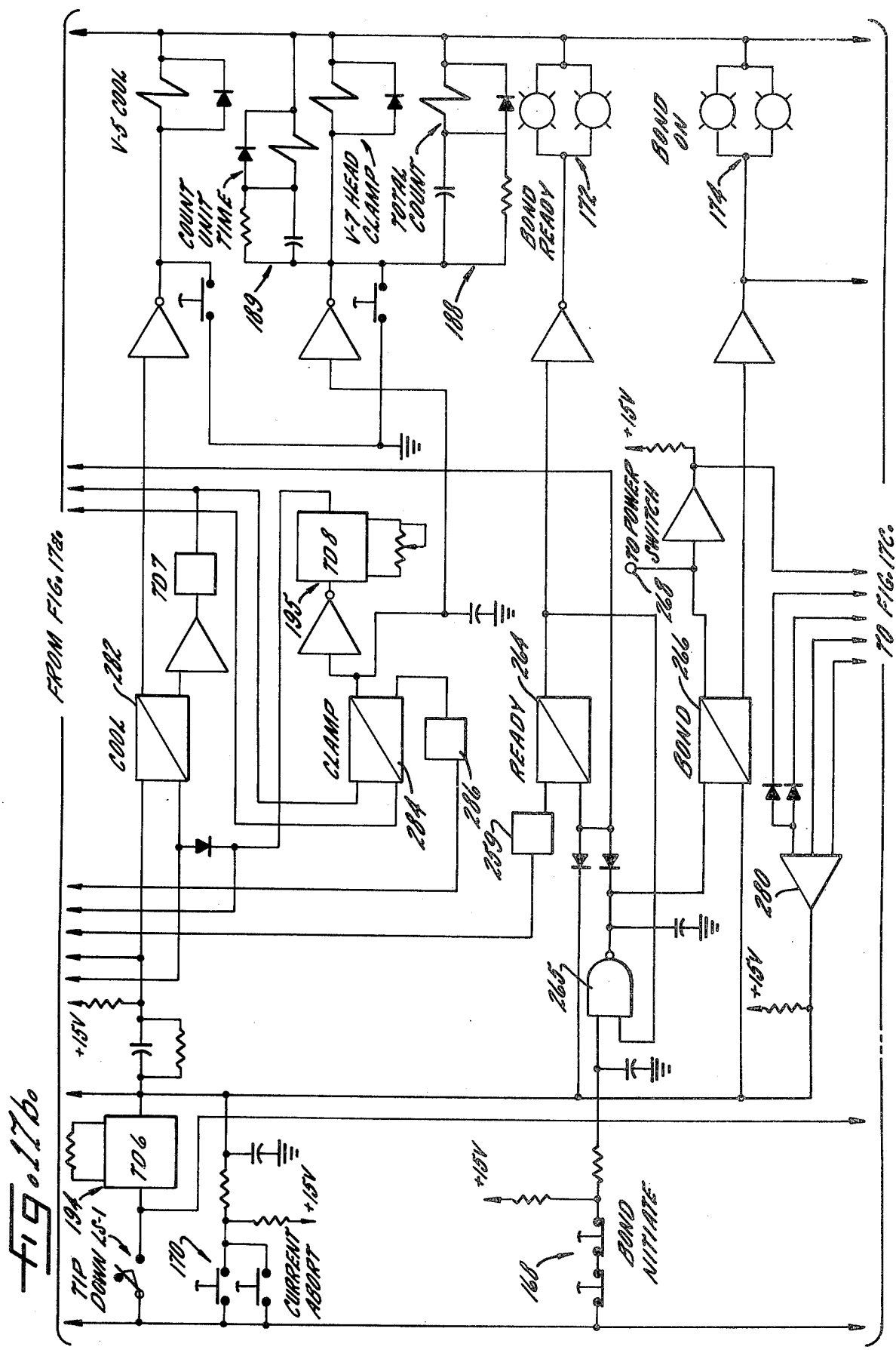

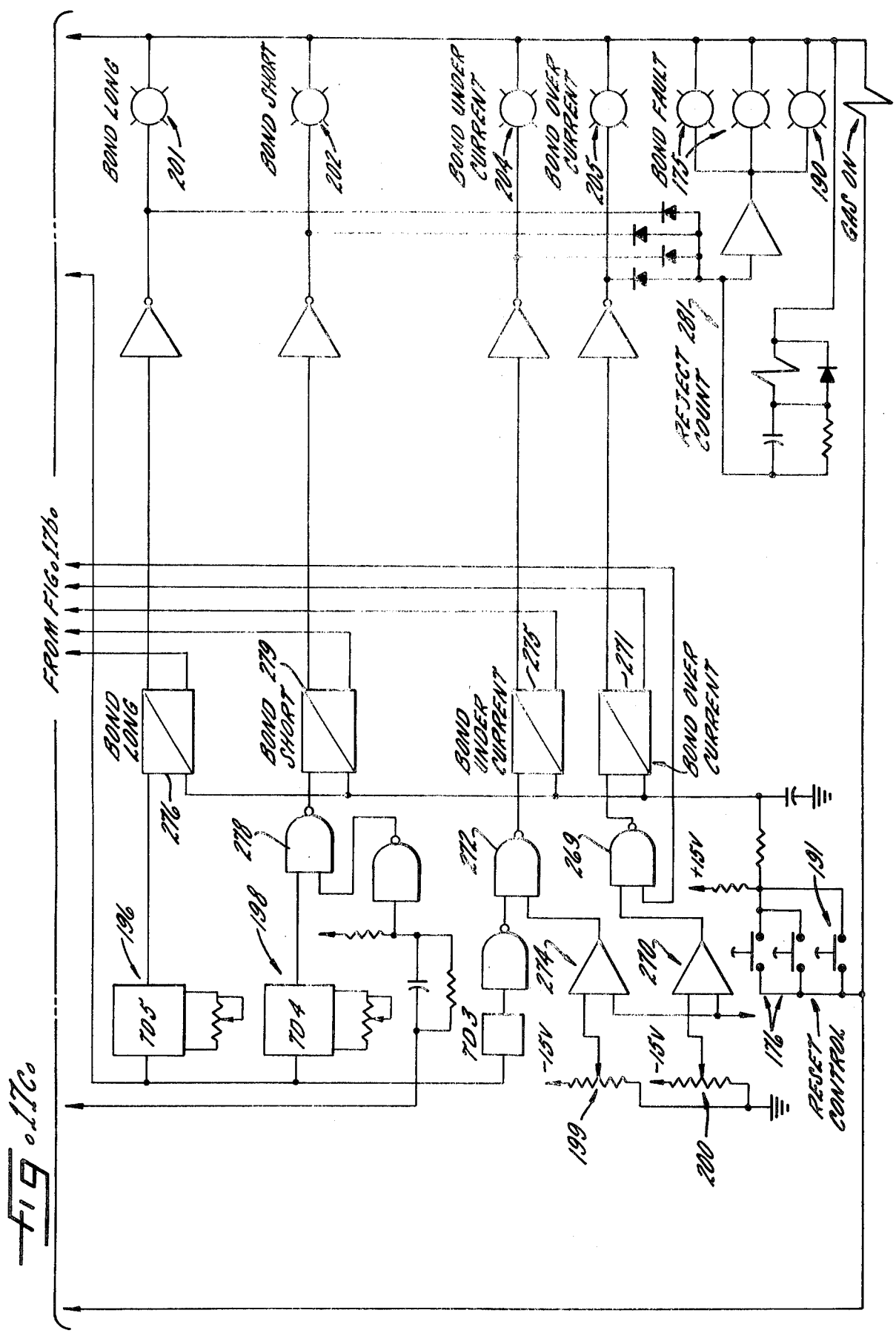

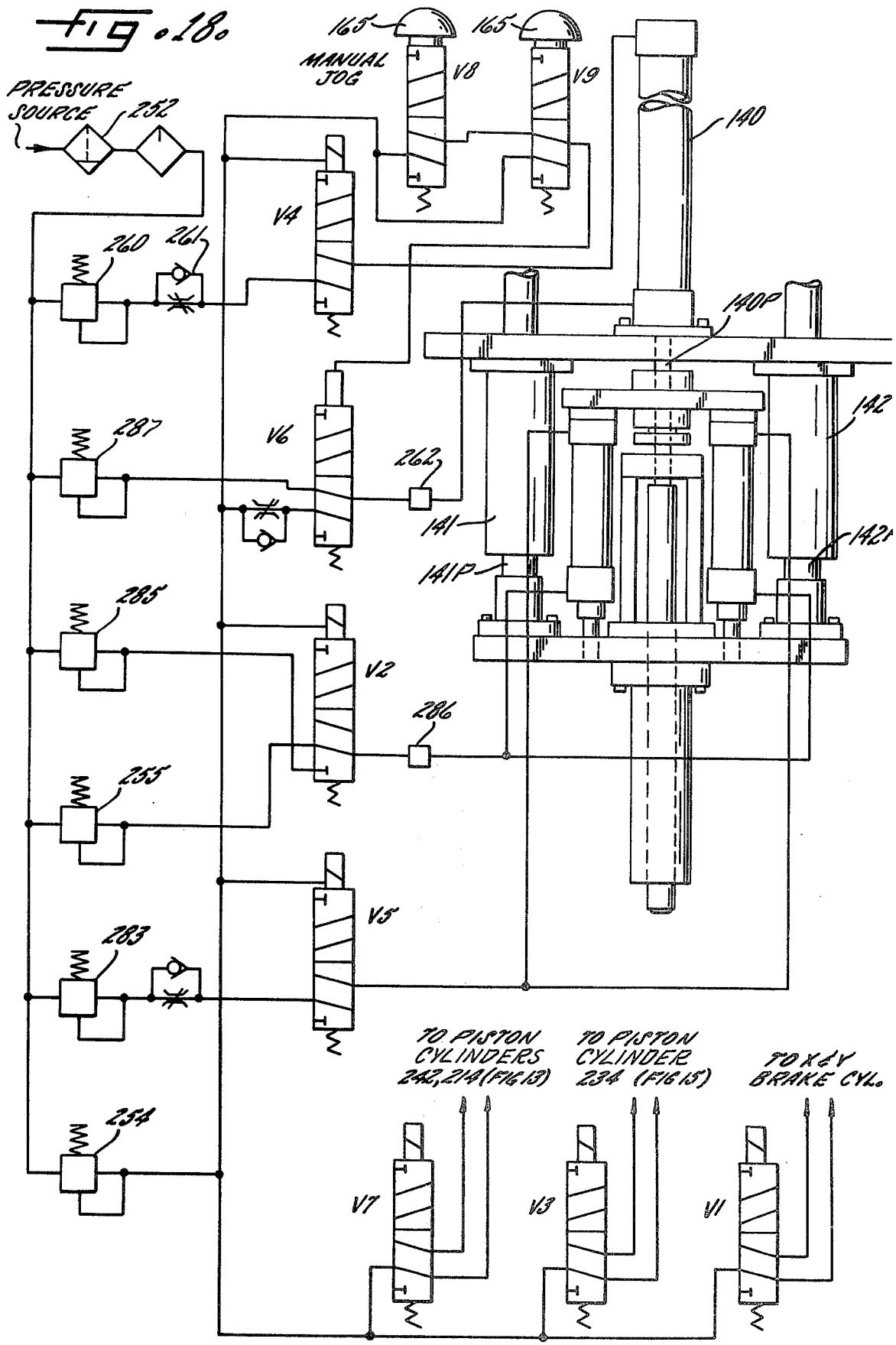

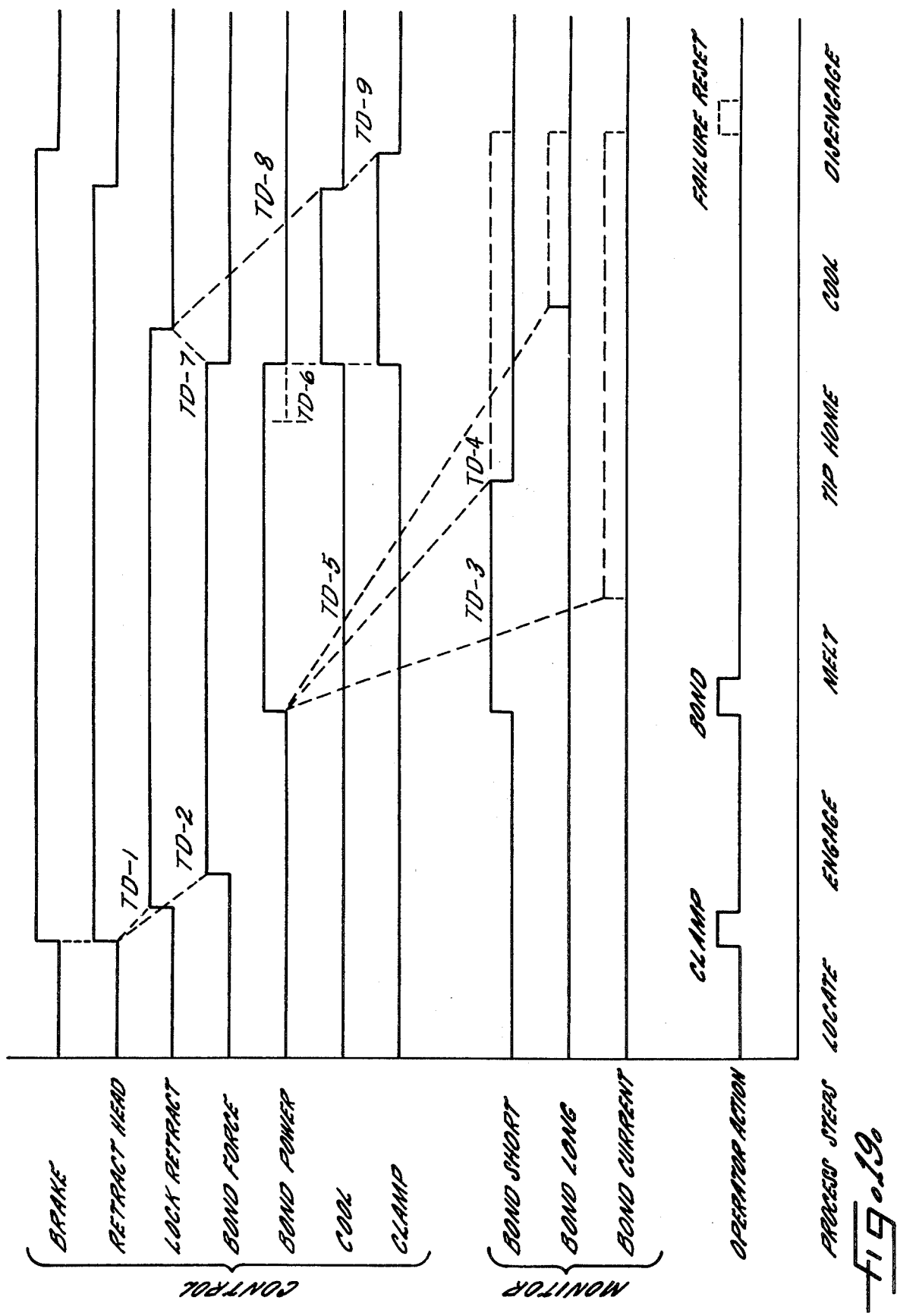

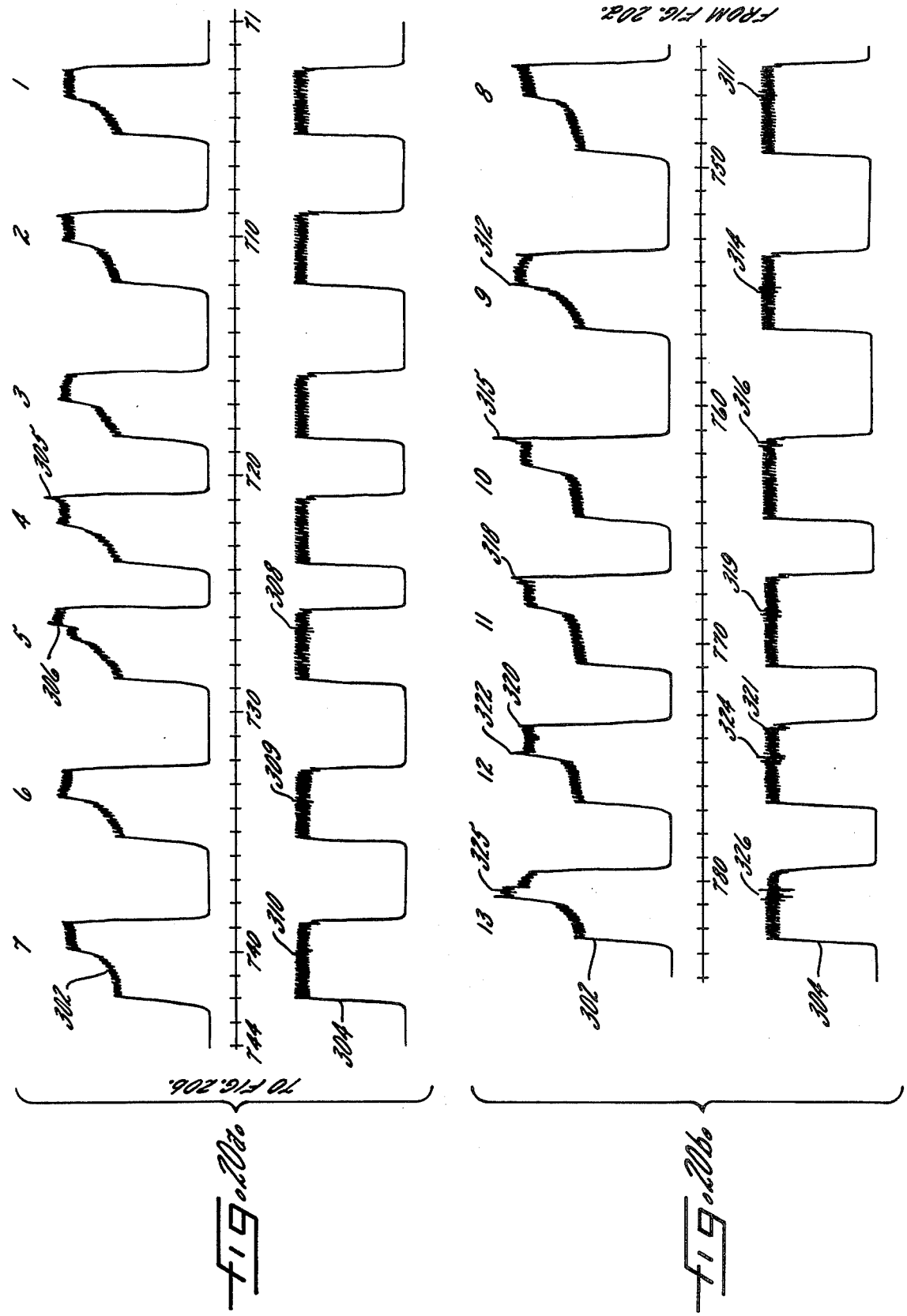

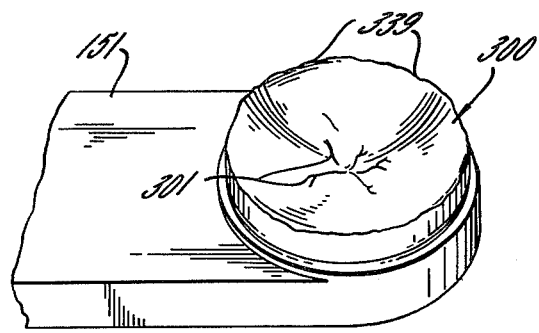
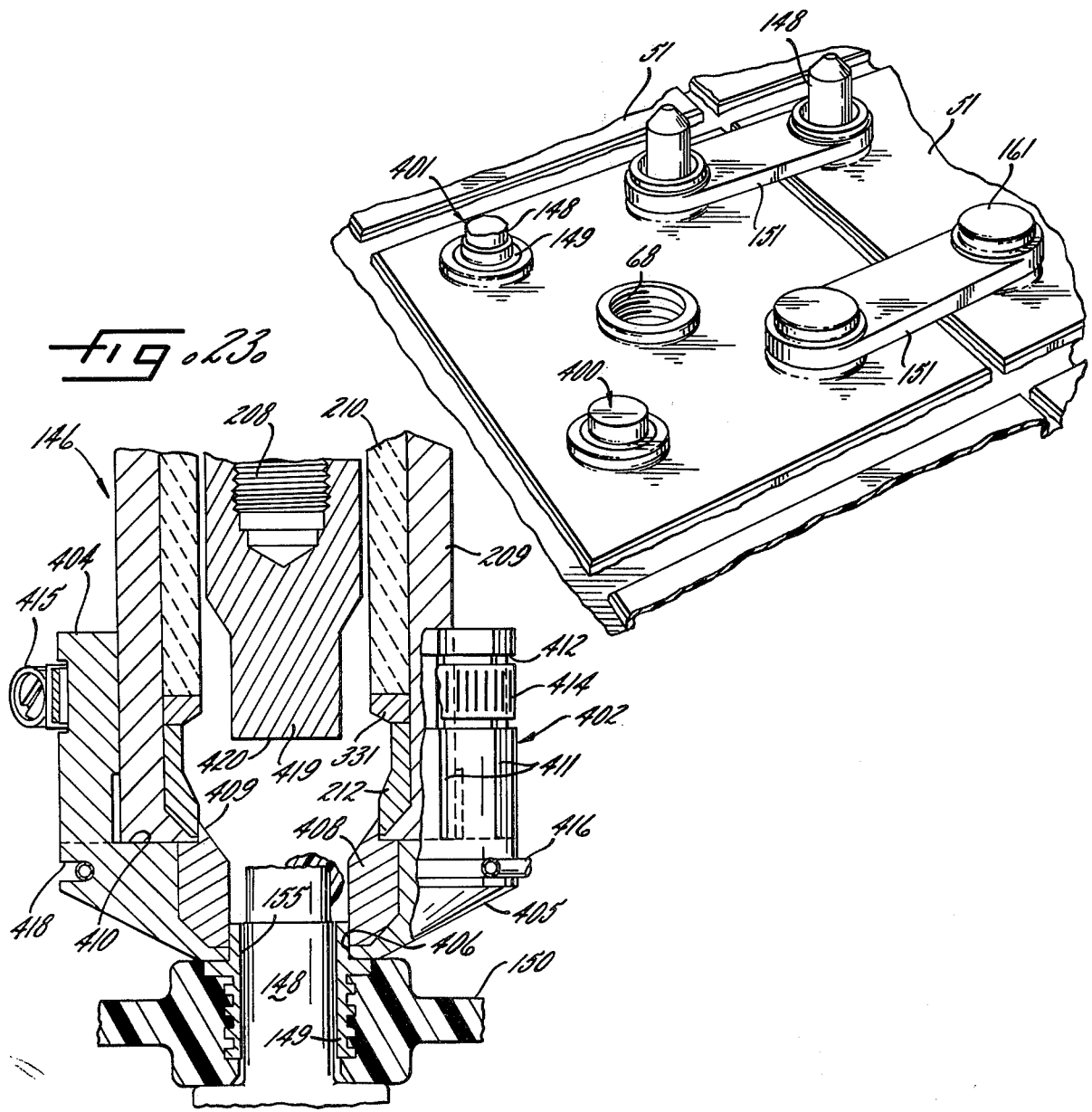

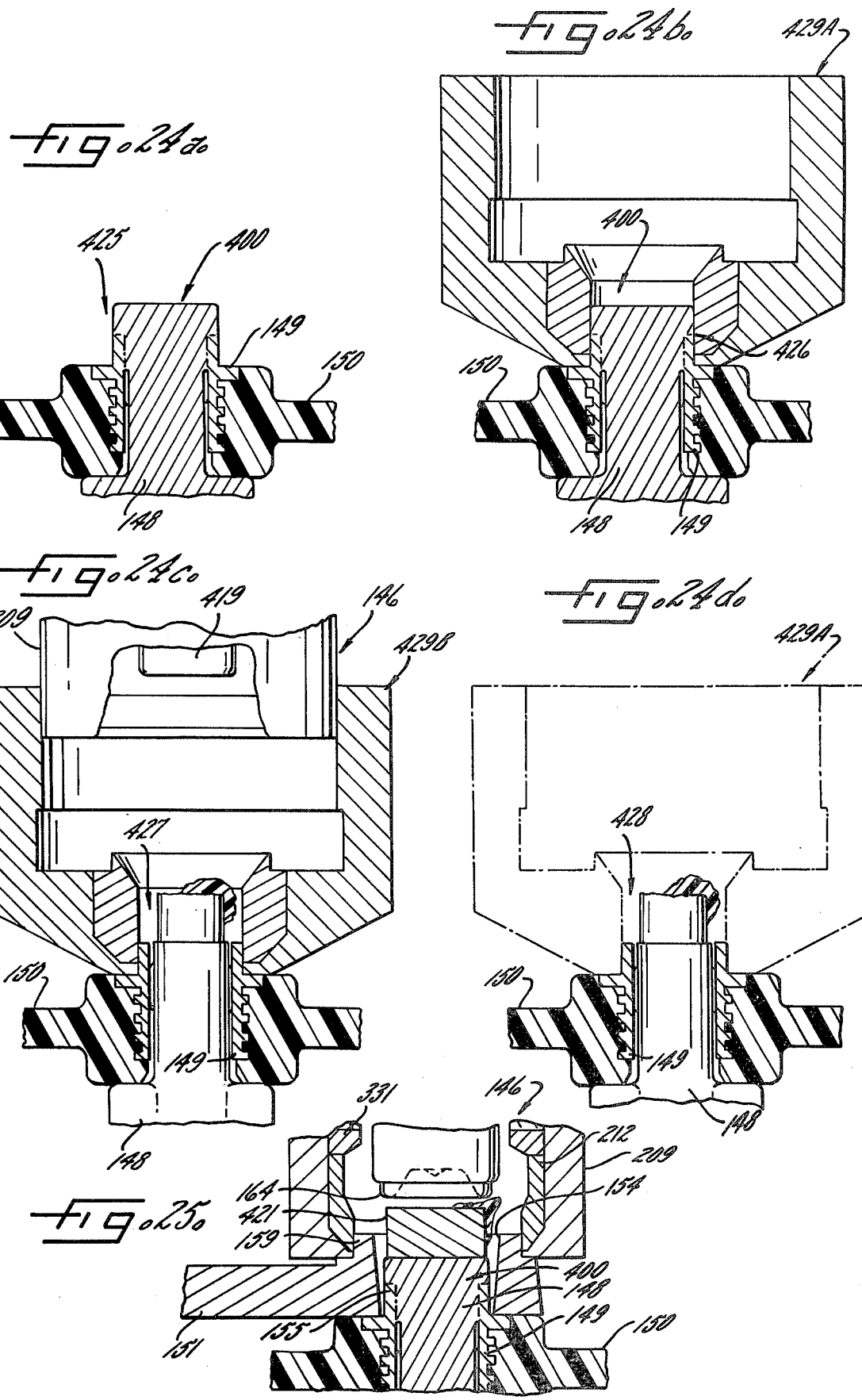

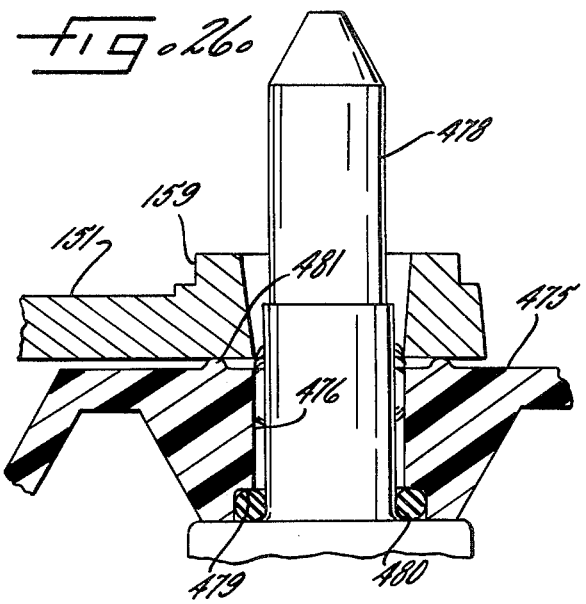
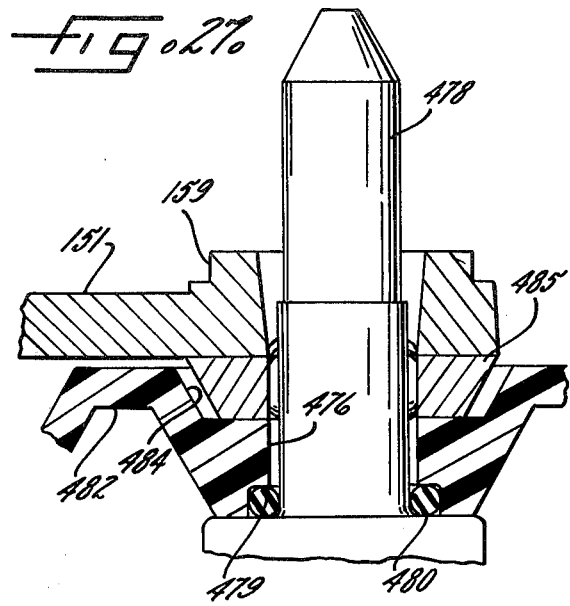
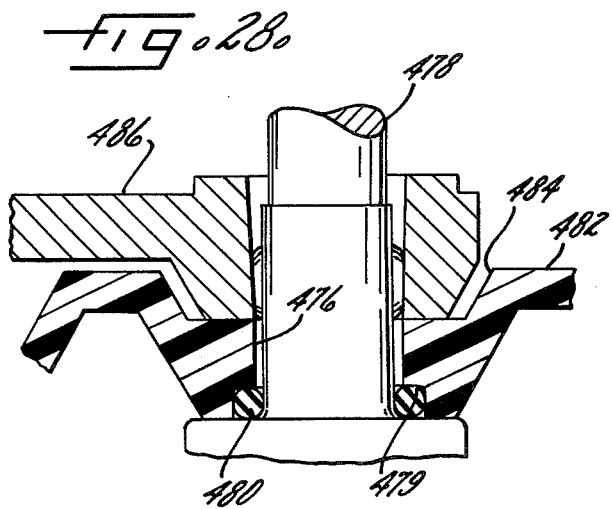
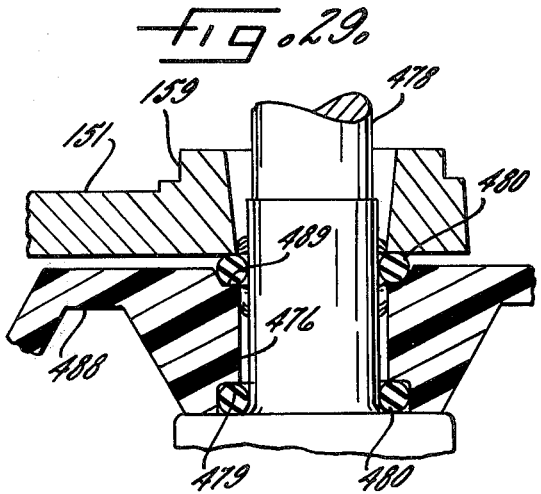
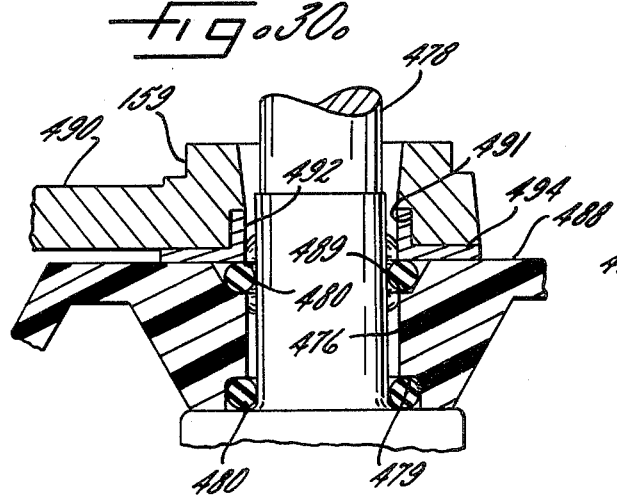
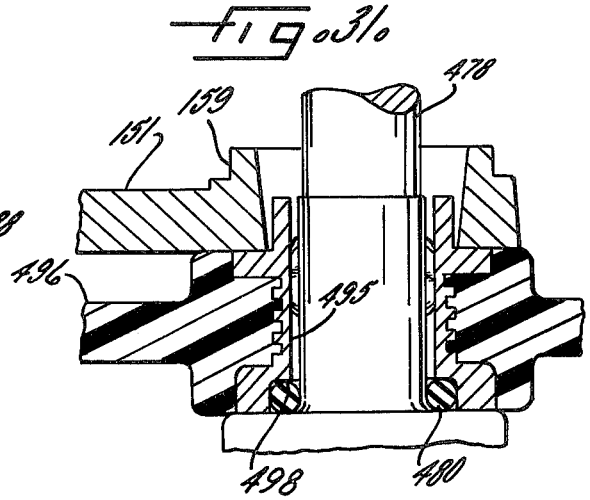

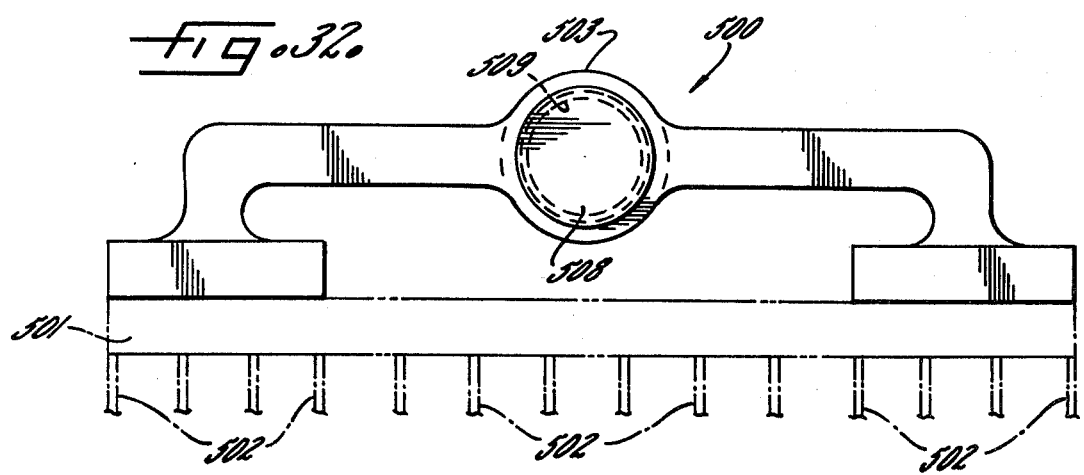

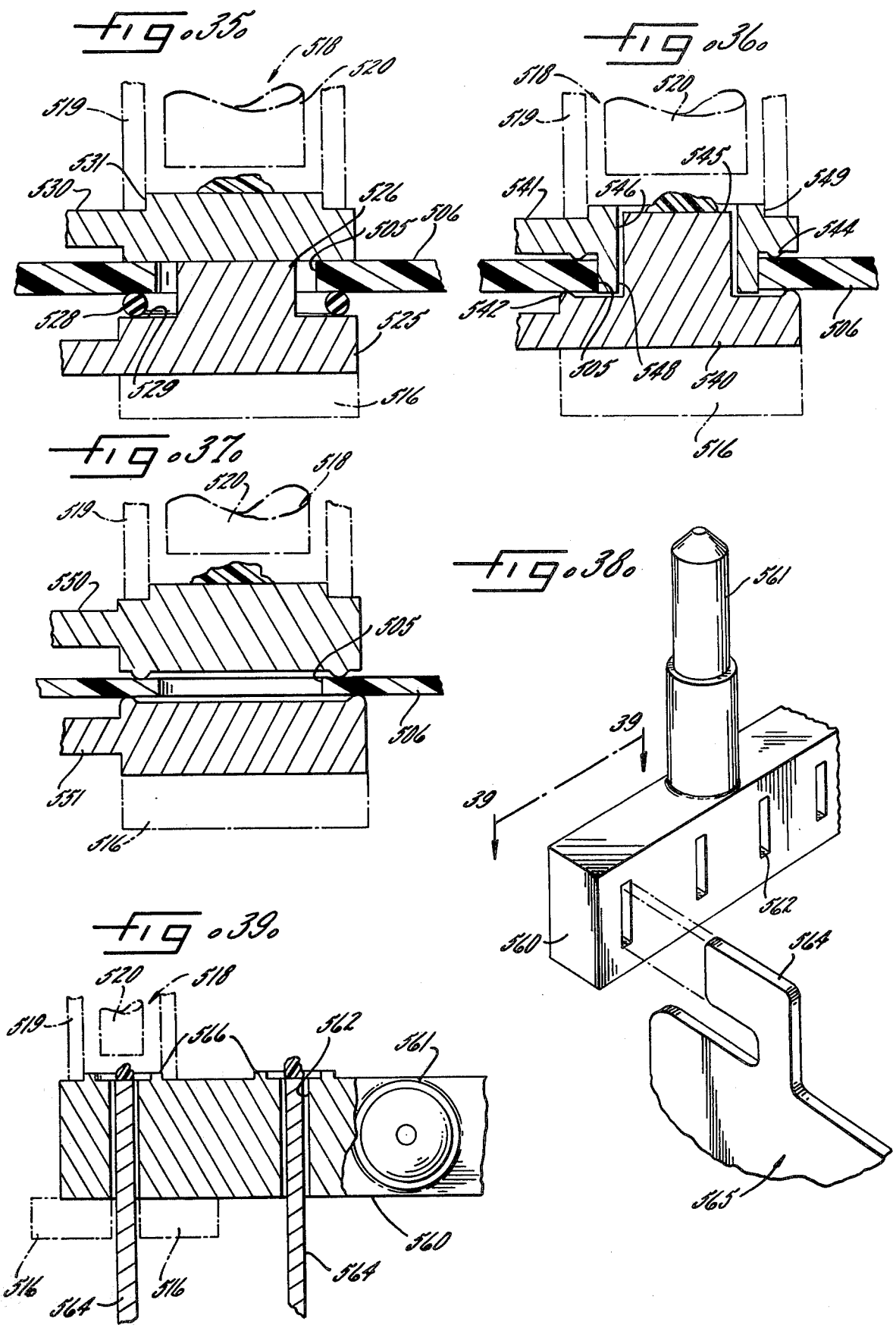

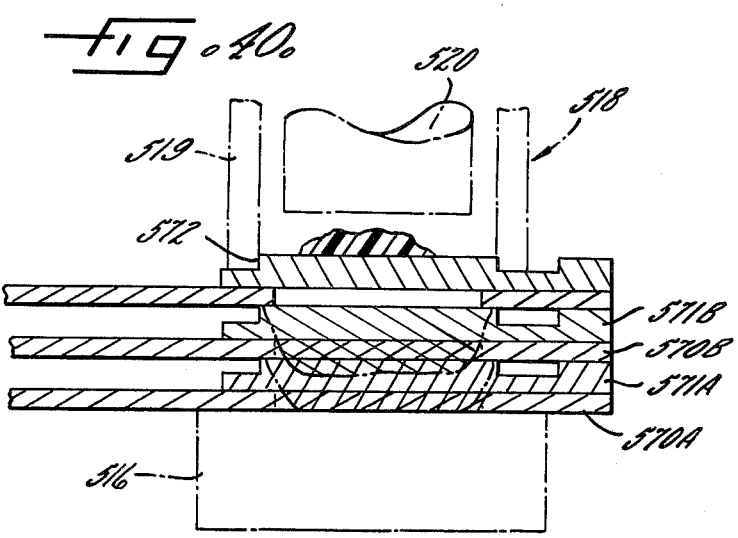
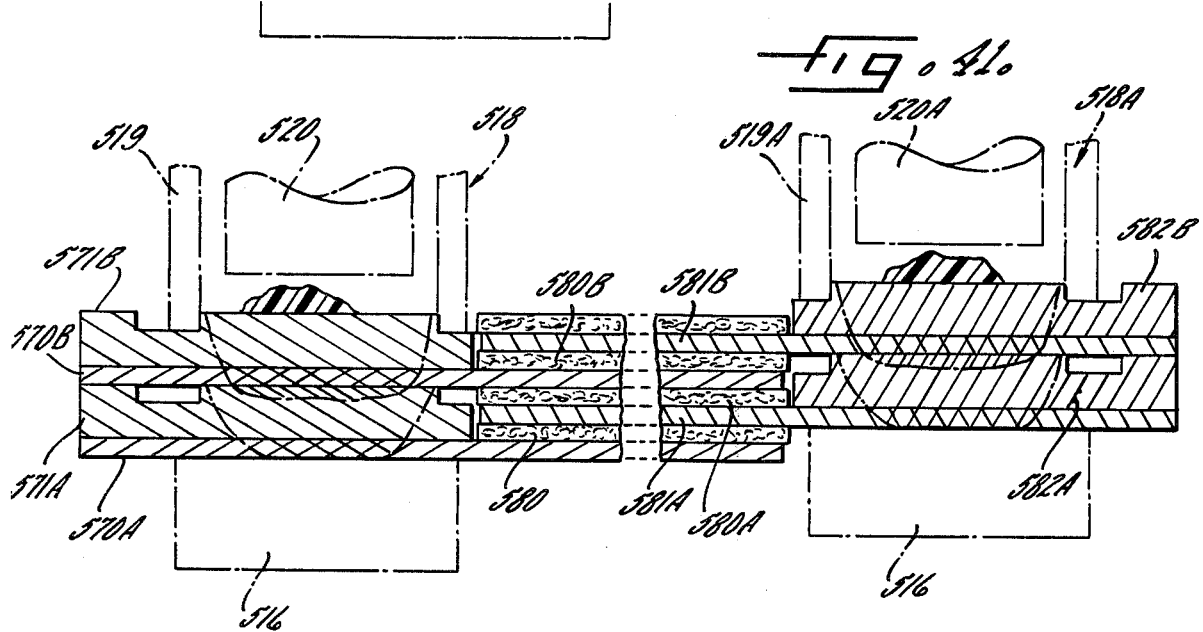
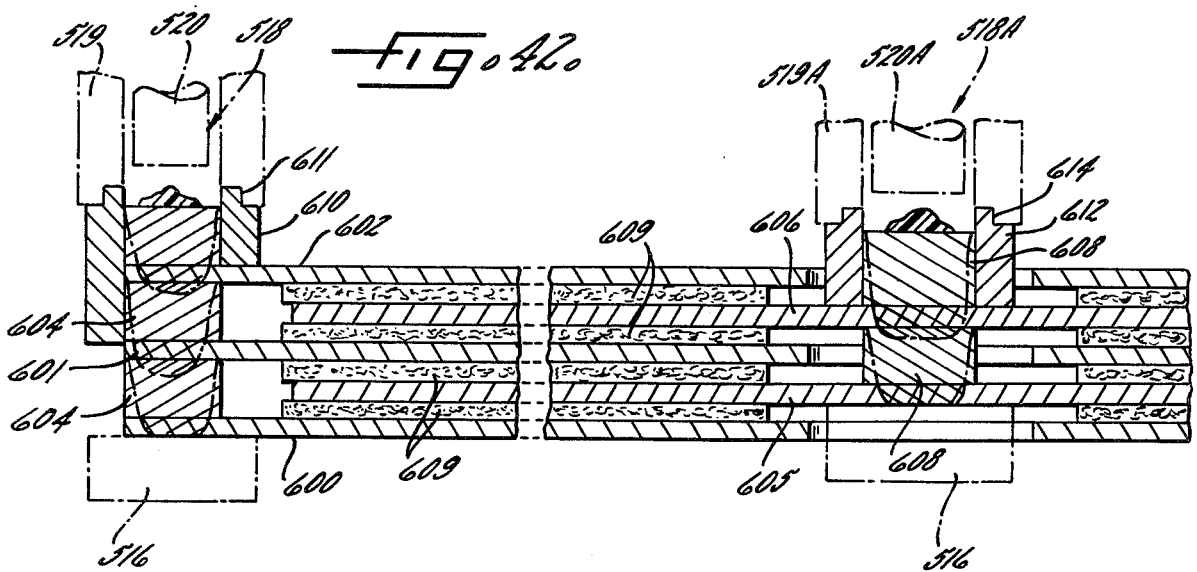

POSITIVE DISPLACEMENT BONDING

RELATED APPLICATIONS

Robert Holbrook Cushman, Ser. No. 435,157, filed Jan. 21, 1974.

Alan S. Keizer, Ser. No. 435,179, filed Jan. 21, 1974.

Robert Holbrook Cushman and Raymond L. Schenk, Jr., Ser. No. 435,169, filed Jan. 21, 1974.

Raymond L. Schenk, Jr. and Alan S. Keizer, Ser. No. 435,160, filed Jan. 21, 1974.

Raymond L Schenk, Jr., Robert Holbrook Cushman and Alan S. Keizer, Ser. No. 435,180, filed Jan. 21, 1974.

Kurt R. Stirner and Robert Holbrook Cushman, Ser. No. 435,172, filed Jan. 21, 1974.

Raymond L. Schenk, Jr. and John A. Bruzas, Ser. No. 435,181, filed Jan. 21, 1974.

Raymond L. Schenk, Jr., John A. Bruzas and William E. Coville, Ser. No. 435,182, filed Jan. 21, 1974.

John A. Bruzas and William E. Coville, Ser. No. 435,156, filed Jan. 21, 1974.

Raymond L. Schenk, Jr. and William b. Hayes, Ser. No. 435,166, filed Jan. 21, 1974.

BACKGROUND OF THE INVENTION

The present invention relates in general to fusion bonding or thermo bonding of two or more workpieces and, more particularly, to methods and apparatus characterized by their ability to automatically form, on a continuous, reproducible, high speed, production-line basis, fusion bonds devoid of structural, electrical and/or cosmetic defects between two or more workpieces by a technique hereinafter referred to as "positive displacement bonding". In its principal aspects, the invention is concerned with improved methods and apparatus for automatically moving a heated electrode through the portions of the workpieces to be bonded so as to uniformly heat and melt those portions of the workpieces to be bonded while, at the same time, displacing the molten material into a storage area or reservoir surrounding the heated electrode where such material is maintained in its uniformly heated molten state while further movement of the electrode into the workpieces creates a cavity therein and, thereafter, retracting the heated electrode so as to permit the molten material to return to the cavity formed by the electrode in the workpieces where such molten material is allowed to cool and solidify, thus forming a flawless bond between the workpieces.

In recent years, there has been an ever increasing trend toward, and demand for, automation and mechanization in virtually all branches of industry. In many industries, typically including, but not limited to, the battery making industry, it is often necessary to bond two or more workpieces together to form a unitary assembly wherein the bond is characterized by its structural strength and/or, in some instances, by excellent characteristics of electrical conductivity. Varrious methods have been devised for bonding such workpieces together including, merely by way of example, welding, thermo-compression bonding, ultrasonic bonding, percussion welding, etc.

The particular technique selected has heretofore depended upon many variable parameters, including: 1) the sizes and/or shapes of the workpieces; and, 2) various characteristics of the particular materials to be bonded which may vary widely in such areas as electrical and/or thermal conductivity characteristics, melting points, etc. Moreover, the particular technique employed has often been dictated by physical limitations in access to the region where the bonds are to be effected. Merely by way of example, in the battery industry it is often necessary to bond two or more pieces of lead together at various points, in some cases internally and in others externally of a given battery cell. Lead, of course, is characterized by having a relatively low melting point on the order of only 630°F., as contrasted with, for example, steel which has a melting point on the order of 3,000°F. Moreover, where the lead workpieces comprise battery straps, plates, terminal posts and/or intercell connectors, such as commonly employed in industrial motive-power batteries, automotive batteries, and the like, it is often difficult to gain access to the parts to be bonded. Even where access can be obtained, one is normally limited in the amount of heat that can be applied and in the types of reducing agents that can be utilized by virtue of other components present in the area of the bond to be effected such, for example, as: the battery casing or cell jar which, in the automotive battery industry, is commonly made of rubber or plastic and in the industrial motive-power battery industry is normally made of impact-resistant rubber; the electrolytic acids present in or to be added to the battery cells,; the pasted positive and/or negative plates,; the separators which are commonly made of microporous rubber,; etc.

Many efforts have been made to devise improved bonding techniques which can be universally applied for the purpose of bonding two or more workpieces together irrespective of the wide range of variable parameters mentioned above. Moreover, consistent with the demands of industry today, numerous efforts have been made to devise bonding techniques which are capable of automation so as to enable automatic bonding of multiple workpieces as an integrated part of mass-production line and/or assembly line techniques. Typical of the aforementioned approaches are those described in U.S. Pat. Nos. 3,591,755, 3,608,809 and 3,706,126 of Robert Holbrook Cushman, assigned to the Western Electric Company, and relating to mechanical-thermal-pulse continuous fusion bonding processes and apparatus which are based, at least in part, upon a combination of applied and controlled pressure and temperature to effect a desired bond.

However, despite all such prior efforts which have met with varying degrees of success, certain industries have continued to employ the more tedious, time-consuming, manual bonding techniques which have been known and utilized for many years. Typical of these is the industrial motive-power battery industry where lead-to-lead bonds are still almost universally made by hand-torching or hand-burning techniques employing oxyacetylene torches and/or carbon burning tools. These techniques require highly skilled artisans who are capable of forming satisfactory bonds only after considerable training and, even then, a relatively high percentage of the bonds formed are not capable of meeting the rigorous quality control standards set by the battery industry. Typical of the types of difficulties encountered even by such skilled artisans are: 1) non-uniform heating of the interface between the parts to be bonded resulting in no bonding at all at some locations, and/or "burn-out" of connectors and/or other parts because of "over burning", thereby destroying the connector or other parts; 2) actual damage to and/or destruction of the rubber casing or battery cover due to inadvertent direct application of the flame or carbon tip thereto; 3) lack of control over, and resultant non-uniformity of the depth of, bond penetration into the parts to be bonded, thereby resulting in bonds which are unsatisfactory from either or both of structural and/or electrical conductivity characteristics; and 4substantially complete melting of one of the two or more parts to be bonded accompanied by failure to melt the surface of a second of the pieces to be bonded, thereby resulting in a "cold-knit" between the properly and improperly melted pieces.

As a direct result of the inability of certain industries—for example, the industrial battery industry—to utilize the aforementioned known automatic and semi-automatic bonding systems, and the continued industry-wide reliance on hand-torching and/or hand-burning techniques, numerous disadvantages have continued to plaque such industries. More specifically: 1) various industries, at great expense to themselves, have had to continue to attempt to train personnel in the difficult, time-consuming hand-torching or hand-burning techniques; 2) as a result of the relatively high heat generated by such techniques, the use of low melting point, economical, lightweight plastic battery casings has, at least in the industrial motive-power battery industry, often been precluded; 3) the percentage of batteries and/or battery cells rejected because of unsatisfactory bonds has remained high; and 4) the number of batteries which have passed rigorous quality control tests and/or procedures while having latent defects in the bonds has been unacceptably high, resulting in customer dissatisfaction because of the presence of "leakers", particularly in the battery post/intercell connector, as well as an extremely objectionable phenomenon known in the art as "electro-capillary action" wherein battery electrolyte is actually pumped out of the battery cell through minute passages passing through the positive battery post/connector interface where the bond is defective, thereby not only weakening the cell affected and decreasing its life and usefulness, but often creating a direct short which drains the battery and which often causes corrosion and irreparable damage to other equipment in the immediate area.

OBJECTS OF THE INVENTION

It is a general aim of the present invention to provide improved bonding methods and apparatus which overcome all of the foregoing disadvantages and which are characterized not only by their dependability and reliability in operation, but, also by their ability to continuously reproduce successive bonds having substantially identical characteristics and which meet the rigorous quality control standards set by the industry. More specifically, it is a principal aim of the invention to provide improved methods and apparatus for forming metal-to-metal bonds which, when applied to the battery making industry, substantially eliminate, if not completely eliminate, the danger of leakers and/or electro-capillary action resulting from non-uniform bonding of the battery post/intercell connector interface.

A more particular object of the invention is the provision of improved bonding methods and apparatus which are substantially operator-failproof and which can be readily utilized even by untrained and unskilled personnel to produce high quality bonds on a continuous reproducible basis, and where each bond formed is substantially identical to every other bond formed in terms of such physical characteristics as structural strength and/or appearance, as well as in terms of electrical conductivity characteristics, and where all bonds formed compare favorably with the most perfectly formed bond heretofore obtainable from conventional hand-torching and/or hand-burning techniques.

Another of the general objectives of the present invention is the provision of improved bonding methods and apparatus which can be readily introduced into existing production and/or assembly lines with only minimum revisions to, and interruption of, such lines.

A more detailed general objective of the present invention is the provision of improved bonding methods and apparatus which are capable of bonding motive-power battery posts to intercell connectors with a high level of quality and repeatability, yet at reduced manufacturing costs.

In another of its principal aspects, it is an object of the present invention to provide improved bonding methods and apparatus characterized by their flexibility and versatility and which can be utilized to provide strong, permanent, reproducible bonds between two or more components regardless of the shape or shapes of the components being bonded. In the battery industry, for example, the flexibility and versatility of the bonding system of the present invention permits use of the system to bond intercell connectors either externally of or internally of the battery casing and, additionally, the system can be utilized to bond straps, plates and/or terminal posts to one another irrespective of the particular configurations of such battery components.

A further object of the invention is the provision of improved methods and apparatus for producing bonds between two or more components wherein each bond produced is characterized by the uniformity of the bond through any desired, preselected depth into the workpieces, thereby producing bonds which, in the battery field, are devoid of leakers and devoid of electro-capillary action.

In one of its more specific aspects, it is an object of the invention to provide improved bonding methods and apparatus which permit of facile movement of the bonding equipment relative to the workpieces so that the operator may readily and without effort position the bonding mechanism relative to the workpieces at any one of numerous selected areas thereon to be bonded.

In another of its more important aspects, it is an object of the present invention to provide improved bonding methods and apparatus which requires only minimum operating temperatures for the bonding media, thereby minimizing energy expended and, at the same time, permitting the use of more economical, lightweight material—such, for example, as plastic—in the manufacture of industrial motive-power battery and/or cell casings, covers, etc., such materials having heretofore been unsuitable because of the high temperatures involved inconventional bonding techniques.

It is one of the principal objectives of the present invention to provide a new method of manipulating adapters with respect to successive bond areas so as to enable the operator to rapidly make successive bonds with a positive displacement bonding technique without having to make special provision for cooling the adapters after each bonding operation.

An important object of the present invention is the provision of improved methods and apparatus for minimizing the presence of oxides and other contaminants in the immediate environment of the bond, as well as for minimizing the build-up of oxides on the bonding electrode.

More particularly state, it is an object of the invention to provide for minimizing oxidation and build-up of oxides in the immediate environment of the bond and/or electrode, and for removing contaminants from the area of the bond.

In another of its important aspects, it is an object of the invention to provide a suitable flux or reducing agent compatible with both the bonding equipment and the workpieces being bonded so as to increase tip life by minimizing plating out of antimony and/or other oxides. More particularly stated, the flux acts as a reducing agent which combines with oxidants present, thereby freeing lead for the bond. At the same time, it is believed that the flux acts both as a surfactant at high temperatures, surrounding and gathering oxides as they are developed, and as an insulator on the sides of the bonding electrode to establish a predetermined resistance which is maintained to keep proper electrode temperature along the sides of the top. As a result of attaining the foregoing objective of minimizing oxidation on the surface of the lead, surface tension present in the molten lead pulls the surface of the bond area smooth, thereby eliminating pits and crevices in the bond formed.

A more detailed object of the present invention is the provision of aan improved positive displacement bonding system which permits the use of improved bromide salt fluxes which would otherwise be incompatible for use with lead-acid batteries and the like. In this connection, it is an ancillary object of the invention to provide an improved bromide salt fluxing compound.

A more detailed object of the present invention is the provision of an improved battery post/intercell connector/cover assembly particularly suitable for use in a positive displacement bonding system where the battery cover and casing may be formed of plastic, yet wherein no cover bushing is required.

It is one of the principal aims of the present invention to provide improved intercell connections internally of a battery by employing positive displacement bonding techniques for effecting structurally and electrically sound bonds through cell partitions and/or through the abutting partitions of adjacent cells rather than through the covers of the batteries, Yet wherein a positive seal is effected between adjacent cells and/or between adjacent cell compartments, thereby insuring that the fluid-tight integrity of each cell and/or cell compartment is maintained irrespective of the electrical and physical bond established between adjacent cells and/or cell compartments.

These and other objects and advantages of the present invention will become more readily apparent upon reading the ensuing detailed description of the invention and upon reference to the attached drawings.

DESCRIPTION OF THE DRAWINGS

FIG. 1 is a fragmentary exploded perspective view, here illustrating the various components present in a conventional lead-acid storage battery cell of the type commonly manufactured today and for many years past in the industrial motive-power battery industry.

FIG. 2 is a fragmentary perspective view, here illustrating a conventional and well-known technique for bonding an intercell connector with the use of a hand-held carbon burning tool and a hand-held source of supplemental lead.

FIG. 3 is a vertical side elevation, partly in section, of a conventional battery cover, post, bushing and intercell connector assembly, here illustrating the parts prior to a hand-torching or hand-burning bonding operation.

FIG. 4 is a perspective view of a portion of a positive displacement bonding system embodying features of the present invention, here illustrating an industrial motive-power battery disposed on a conveyor beneath a bonding head positioned to automatically effect aa bond between a lead battery post of one battery cell and an intercell connector.

FIG. 9 is an exploded perspective view, here illustrating particularly the relationship between a battery cover, post, bushing and intercell connector embodying features of the present invention.

FIG. 10 is an elevational view, partly in section, similar to FIG. 3, but here illustrating the various components of a battery post/intercell connector assembly embodying features of the present invention, again depicting the parts prior to a bonding operation.

FIGS. 11a through 11e are fragmentary, enlarged, simplified, and somewhat diagramatic side elevational views, partly in section, here depicting the sequence of operations in a typical positive displacement bonding operation embodying features of the present invention; FIG. 11a depicting the battery components to be bonded with the bonding head disposed above such components; FIG. 11b illustrating the bonding head properly located and locked in position in readiness to initiate a bonding operation; FIG. 11c illustrating the component parts of the system with the bonding ram-like electrode partially advanced into the workpieces to be bonded, and with the molten lead formed through this stage of the procedure having been displaced into surrounding relationship to the ram; FIG. 11d illustrating the component parts of the system with the ram-like electrode fully advanced into the workpieces to be bonded and with the molten lead formed having been displaced into surrounding relationship to the ram; and, FIG. 11e depicting the component parts of the system with the bonding head still in its down position but with the ram-like electrode retracted and with the molten lead having been returned to the cavity formed by the ram in the workpieces and having cooled and solidified to form a finished bond.

FIG. 12 is a fragmentary side elevation, partly in section, taken substantially along the line 12—12 in FIG. 6, here depicting particularly the supporting rail construction for the head which permits of movement of the head from a position above one conveyor to a position above the adjacent conveyor.

FIG. 13 is an enlarged plan view, partly in section, taken substantially along the line 13—13 in FIG. 7, and depicting certain of the clamping mechanism utilized to lock the bonding head in position.

FIG. 14 is an enlarged vertical sectional view taken substantially along the line 14—14 in FIG. 13, with certain parts removed for purposes of clarity, and illustrating the general relationship of parts in the bonding head.

FIG. 15 is a vertical elevational view, partly in section, similar to FIG. 14, but here taken substantially along the line 15—15 in FIG. 13 and at right angles to the view depicted in FIG. 14.

FIG. 16 is an enlarged fragmentary vertical sectional view depicting the lower end of the apparatus shown in FIG. 14, but here greatly enlarged to show details of the component parts of the equipment including the electrode cooling system and the inert gas flow system utilized to minimize oxidation.

FIGS. 17a, 17b and 17c are simplified schematic block-and-line diagrams here depicting the interrelationship of the electrical and pneumatic controls which are provided for activating the bonding head of the present invention during the various phases of a complete bonding cycle.

FIG. 18 is a simplfied schematic block-and-line diagram illustrating particularly details of the pneumatic circuit and control valving utilized with the present invention.

FIG. 19 is a timing chart illustrating the time sequence for activating and deactivating varous pneumatic and electrical controls employed with the apparatus of the present invention.

FIGS. 20a and 20b are successive portions of a continuous strip chart depicting graphically in the upper and lower curves respectively the power output and the amperage of the system, both with respect to time, for a series of thirteen (13) successive bonds, and illustrating particularly the undesired deviations in power and amperage as oxides build up on the ram-like electrode, thus producing greater and greater arcing and, ultimately, a "burn out" of an intercell connector assembly.

FIG. 21 is a perspective view of a completed bonded assembly comprising a battery post, bushing and intercell connector but wherein the resultant bond is defective and characterized by the presence of "cold collars", cracks and crazing, and the presence of a concavity or saucer-like configuration on the upper surface of the resultant bond, all of which are undesirable characteristics for intercell connector assemblies, particularly on industrial motive-power batteries.

FIGS. 24a through 24d are schematic side elevational views illustrating the formation of bonds between a battery post and cover bushing but without an intercell connector, and illustrating particularly the manual manipulation by the operator of an adapter similar to that shown in FIG. 23 so as to permit the rapid and successive formation of such bonds without having to provide for cooling of the adapter; FIG. 24a illustrating a completed post-to-bushing bond; FIG. 24b illustrating a substantially completed bond with the adapter in place during the cooling portion of the bonding cycle; FIG. 24c illustrating an unbonded battery post/bushing combination with the adapter in place and with the positive displacement bonding apparatus in readiness to form a bond; and, FIG. 24d illustrating an unbonded battery post/bushing combination with the adapter shown in phantom.

FIG. 25 is a fragmentary vertical side elevational view, partly in section here illustrating the second stage of a two-stage bonding operation wherein an intercell connector is in position in readiness to be bonded to the previously bonded battery post/bushing combination shown in FIG. 24a.

FIGS. 26 through 30 are fragmentary vertical elevational views, partly in section, illustrating alternative types of battery post/intercell connector combinations that can be formed with the present invention and which do not require the use of a cover bushing, all such views illustrating the parts in the unbonded state.

FIG. 31 is a fragmentary vertical elevational view, partly in section, illustrating a slightly modified type of battery post/bushing/intercell connector assembly together with means for insuring a positive seal between the battery post and bushing.

FIG. 32 is a fragmentary side elevational view of a modified plate strap having positive plates bonded thereto, such strap being suitable for bonding to the negative plate strap in the adjacent cell through a cell partition internally of the battery.

FIGS. 35 through 37 are fragmentary vertical sectional views similar to FIG. 34, but here diagrammatically illustrating alternative types of intercell connections that can be effected through a cell partition within a battery casing, all such views illustrating the parts prior to a bonding operation.

FIG. 38 is a fragmentary exploded perspective view depicting a modified type of battery plate strap and plate mounting lug.

FIG. 39 is a fragmentary vertical sectional view taken substantially along the line 39—39 in FIG. 38, here illustrating the battery plate and plate strap of FIG. 38 is partially assembled form in readiness for a bonding operation by means of the positive displacement bonding technique of the present invention.

FIG. 40 is a fragmentary vertical sectional view diagramatically illustrating the formation of an assembly of plates of like polarity by means of the positive displacement bonding method of the present invention.

FIG. 41 is a view similar to FIG. 40, but here diagramatically illustrating the simultaneous bonding of a set of positive plates interleaved with a set of negative plates.

FIG. 42 is a fragmentary vertical sectional view, here diagramatically illustrating the use of a positive displacement bonding technique for forming interplate connections in an assemblage of positive and negative battery plates suitable for use in round cells.

SUMMARY OF THE INVENTION

Figure 5:
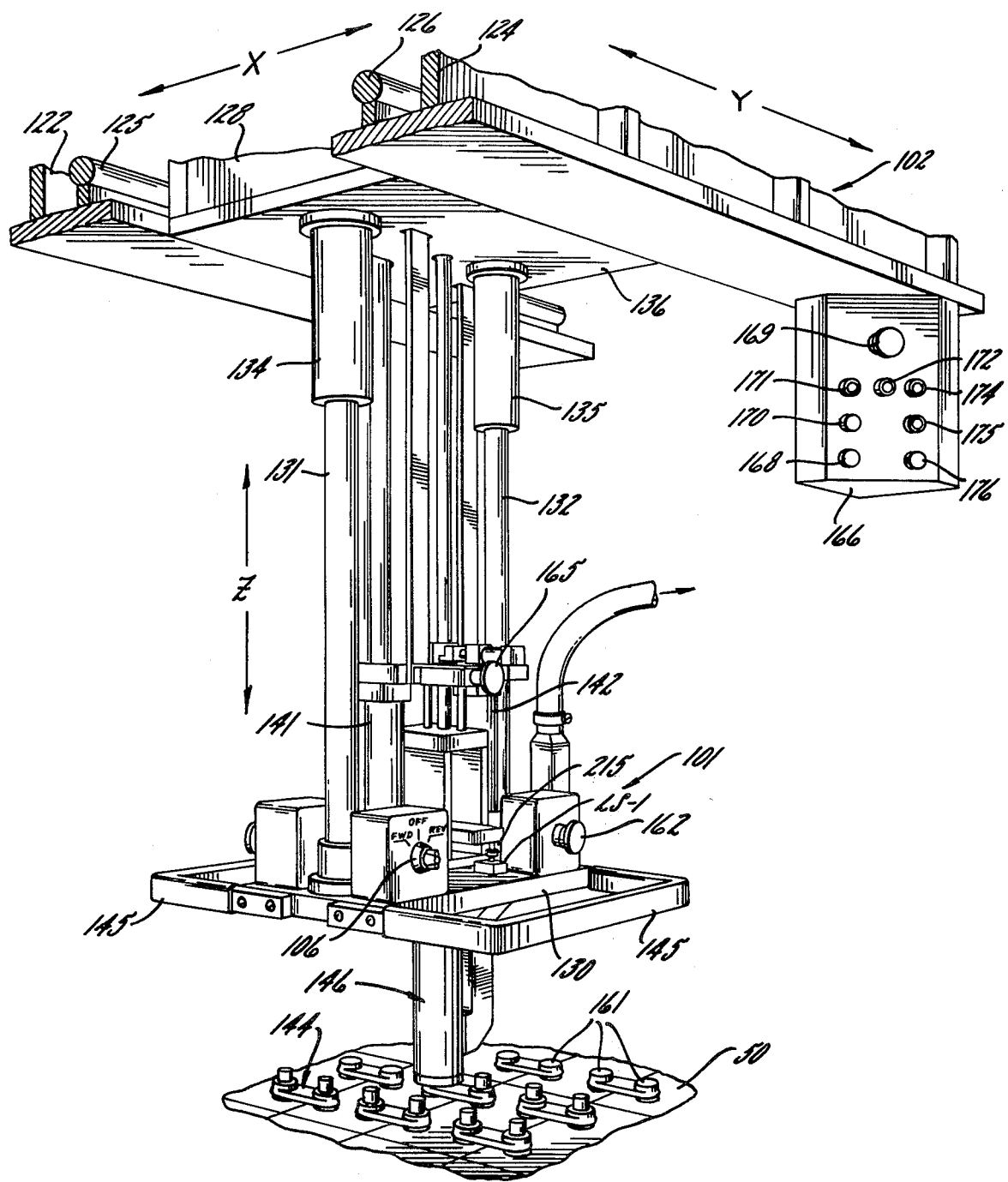
FIG. 5 is a fragmentary perspective view taken generally at right angles to the view shown in FIG. 4 and here depicting other portions of the apparatus.

The present invention pertains to methods and apparatus which are intended to overcome all of the aforementioned disadvantages and to provide a system which is capable of performing successive fusion bonding operations on a relatively high speed, mass production or assembly-line basis, yet where each bond formed is essential devoid of flows or imperfections and is comparable in quality to the most perfectly formed hand-burned or hand-torched bond heretofore attainable by even the most skilled personnel. To accomplish this, the present invention contemplates novel methods and apparatus wherein a heated ram-like electrode is moved co-axially through a reservoir defining means which, in the exemplary forms of the invention, comprises a co-axial barrel surrounding the electrode and defining therebetween an annular reservoir. The reservoir defining means—e.g., the barrel—is first bottomed on one of the elements to be bonded in a position co-axial with the axis of the bond to be formed. Thereafter, the ram-like electrode is moved axially through the reservoir defining means into engagement with the workpiece or workpieces to be bonded where the heat developed serves to convert the solid workpiece(s) to a molten state in the area selected for the fusion bond. Continued axial advance of the electrode serves to progressively melt the portions of the workpieces along the axis of the bond area, which axis, of course, coincides with the axis of the electrode, and the molten material thus formed is displaced by the electrode in an annular column surrounding the electrode and within the reservoir defined between the electrode and the selected reservoir defining means.

When the ram-like electrode reaches the limit of its advance movement, a limit that may be adjusted by the operator to provide for a bond of any desired depth, a short dwell period is provided to insure uniform heating of those portions of the workpieces immediately adjacent the cavity formed therein by displacement of molten material, as well as to insure uniform heating of the molten material surrounding the electrode and confined within the reservoir. Upon conclusion of such dwell period, the ram-like electrode is retracted from the workpieces and is moved axially through the reservoir defining means to a position out of contact with the molten material. As a result of such axial retraction of the electrode, the molten material is free to return to the cavity formed in the workpieces during the advance movement of the electrode, where such material is permitted to cool and solidify, thus forming a uniform fusion bond between the workpieces along the entire axis of electrode movement therethrough. Finally, the reservoir defining means—e.g., the barrel co-axial with the electrode—is retracted from its bottomed engagement with the workpieces, and the bond cycle is complete.

When dealing with workpieces formed of conductive metals, the activating circuit for the system is preferably from a suitable power source, through the movable electrode, through the conductive metal workpieces, through the reservoir defining means, and back to the source. The power source may be either continuous or pulsating. When dealing with non-conductive workpiece materials, the movable ram-like electrode may simply comprise or contain a suitable resistance element or the like capable of attaining and maintaining a desired temperature level sufficient to melt that portion of the workpiece material which is to be displaced and subsequently returned to effect the desired fusion bond.

The present invention further pertains to various improved intercell connections and other battery connections that can be effected by the positive displacement bonding system disclosed and claimed herein.

While the present invention is susceptible of various modifications and alternative forms, specific embodiments thereof have been shown by way of example in the drawings and will herein be described in detail. More specifically, the invention will hereinafter be described in connection with equipment for forming lead-to-lead bonds and/or for positive displacement bonding of lead, techniques that are particularly suitable for use in the industrial motive-power and/or automotive battery industries and, for that reason, the exemplary forms of the invention are described in connection with the making of such batteries. In its broadest aspects, however, it will be understood as the ensuing description proceeds that the invention may find many other applications outside of the battery making industry, outside of lead-to-lead fusion bonding techniques and, indeed, outside of metal-to-metal fusion bonding techniques. Therefore, it should be understood that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

As hereinabove explained, the present invention will be described herein in connection with methods and apparatus which find particularly, but by no means exclusive, application in the industrial motive-power battery industry. Accordingly, and as best seen by reference to FIGS. 1, 2 and 3 conjointly, there have been depicted fragmentary portions of a typical industrial battery, generally indicated at 50 in FIG. 2, which is here composed of a plurality of individual battery cells 51. Such batteries may vary widely in size, configuration and electrical characteristics, and may, merely by way of example, range upwards of several feet in length, heighth and width and weigh upwards of several tons. Conversely, such batteries may be relatively small and may be capable of being transported by hand.

Referring more specifically to FIG. 1, a conventional battery cell 51 has been depicted in partially exploded form so as to expose most of the various battery components contained therein. Such components normally include a cell casing 52, commonly called a jar, and cover 54, both of which have heretofore conventionally been formed of high impact rubber. Contained within the cell casing 52 are a group of negative plates 55, a group of positive plates 56, and a group of separators 58. The negative plates 55 and positive plates 56 of the exemplary cell 51 comprise cast lead grids into which selected chemical pastes, or active materials, are inserted. Generally, a negative plate 55 may contain a paste consisting of a spongy lead material containing an expander to maintain the spongy condition, while the positive plates 56 may contain a plaste consisting of lead oxide, sulfuric acid and water mixed to a putty-like consistency. After the pastes have been applied to the respective grids, the grids are dried. The positive plate 56 are normally wrapped with fiberglass or the like (not shown) to insure retention of the active materials, and each positive plate is then inserted into a plastic protective envelope, as best indicated at 59 (FIG. 1). The separators 58 are preferably formed of microporous rubber which is temperature and acid resistant, and are generally flat on the side adjacent the negative plate and grooved on the side adjacent a positive plate. Such separators 58 serve as insulators between the interleaves positive and negative plates, although they are sufficiently porous to permit free passage of electrolyte therethrough.

After casting of the positive and negative plates, application of the active materials thereto, drying, and wrapping of the positive plates, positive and negative groups or assemblies of plates are formed, commonly by welding the lug portions 55a, 56a of the plates to battery straps and/or battery posts. As here shown, the negative plate lugs 55a are welded to a battery strap 60 integral with a pair of vertically upstanding, negative battery posts 61, while the positive plate lugs 56a are welded to a similar battery strap 62 integral with a pair of vertically upstanding positive battery posts 64. The thus assembled negative and positive plate groups are then interleaved with one another, there being a separator 58 between each positive and negative plate, and the entire assembly is inserted into the cell casing or jar 52 on top of a sediment bridge (not shown). A protective element 65, which may be made of plastic, is placed on top of the plate assembly so as to prevent: 1) foreign materials from entering the cell; 2) damage to the internal cell components by careless use of hydrometers or thermometers; and 3) moss shorts between the positive and negative plates. The high impact rubber cover 54 is then positioned on top of the jar or casing 52, with the posts 61 and 64 passing through lead bushings 66 molded in place in the cover, and the cover is secured to the jar by means of a hot, pliable, asphalt based compound. Normally at this stage of the assembly operation, the battery posts 61, 64 are bonded to the respective bushing inserts 66 by a hand-burning or hand-torching technique, electrolyte is added to the battery cell through a fill opening 68 adapted to be closed by a screw-threaded tap 69, and the cell is then repetitively charged and discharged to assure proper capacity and quality.

Once the cells 51 have been assembled, charged and inspected, they are then ready to be assembled in various configurations to provide a complete battery 50 to meet specific requirements of a customer or ultimate user. In such assembly, multiple cells are inserted into a steel battery casing 70 (FIG. 2) and interconnected in accordance with the requirements and specifications of the customer or user. Such interconnections commonly entail the use of lead intercell connectors 71 which bridge the space between battery posts of opposite polarity in adjacent cells—i.e., the positive posts of one cell are coupled to the negative posts of an adjacent cell. Referring to FIGS. 2 and 3, it will be observed that each intercell connector 71 is designed so that one end thereof sits on and surrounds a bushing 66 associated with a negative post 61, while the opposite end thereof sits on and surrounds a bushing 66 associated with a positive post 64. The workman then bonds the connector 71 to the post/bushing combination by a conventional hand-burning or hand-torching technique. Thus, referring to FIG. 2, it will be observed that the workman is utilizing a hand-burning technique in which he is holding a carbon burning tool 72 in his right hand and a rod of lead bar-stock 74 in his left hand. The arrangement is such that the carbon burning tool 72 (which could, of course, be an oxyacetylene torch) is used to melt the inner rim 75 of the opening in the connector 71 surrounding the post/bushing combination and, at the same time, to melt the exposed surface of the previously bonded post/bushing combination, with the molten lead thus formed being mixed or puddled by the hot tip of the tool 72. Additional lead is similarly melted by the tool 72 from the lower end of the supplemental lead rod 74 so as to provide sufficient molten lead to fill the entire cavity within the connector 71 defined by the edge 75 and surrounding the post/bushing combination. Indeed, the workman will commonly place a conventional mold (not shown) about the work area so as to permit the formation of a raised, button-like bond, as best indicated at 76 in FIG. 2.

It should be understood, that while it would be possible to create the aforementioned bond 76 in a single hand-burning or hand-torching operation by applying the tool 72 or torch to the assemblage of parts as shown in FIG. 3, the operation is most normally conducted in two stages—first bonding the post/bushing combination and later bonding the connector 71 to the previously bonded post/bushing combination. One reason for such two-stage bonding or torching procedure is simply that it is desirable that a permanent bond be created between the post 61 (64) and bushing 66 immediately after assembly and prior to introduction of electrolyte into the cell so as to prevent acid or other foreign materials from becoming lodged in the interface between the post and the bushing.

It will be immediately recognized by those skilled in the art that the hand-burning and/or hand-torching operations herein described have many disadvantages and are frought with dangers. Such procedures are slow, and require skilled personnel to carry them out. As lead is melted and puddled, it tends to cover the surfaces of the parts to be bonded, and extreme care must be taken to insure that all of the mating surfaces or interfaces to be bonded are uniformly heated and rendered molten—otherwise, molten lead contained within the puddle will tend to adhere to a surface which has not been raised to a sufficiently high temperature level, thereby producing an undesirable cold knit rather than a sound molecular fushion bond. Moreover, failure to obtain uniform heating and melting may result in undesirable crevices or minute passages passing through the interface of the parts being bonded, thus creating leakers and giving rise to the danger of electro-capillary pumping action at the positive post. And, of course, if extreme care is not taken, it is relatively easy to overheat the parts. When this occurs, the entire peripheral portion or rim 78 (FIG. 3) of the connector 71 may be rendered molten, permitting the puddle of lead to spill over the top of the cell, thereby destroying the connector parts and/or permitting burning of, and consequent damage to the rubber cover 54. Finally, because of the problems associated with such overheating, it has heretofore been impractical to use more economical and lightweight materials such as plastic in the formation of cell casings and/or covers for industrial motive-power batteries because such materials commonly have much lower melting points than the hard impact rubber heretofore used.

POSITIVE DISPLACEMENT BONDING IN ACCORDANCE WITH THE INVENTION

A. General Organization of Exemplary Apparatus

Referring now to FIGS. 4 through 8 inclusive, there has been illustrated an exemplary apparatus, generally indicated at 100 in FIGS. 4 – 7, for carrying out the present invention. As here shown, the exemplary apparatus 100 includes a positive displacement bonding head, generally indicated at 101, carried by an overhead suspension system, generally indicated at 102, for movement over and with respect to one or more batteries 50 carried on a pair of parallel, spaced apart, floor-mounted conveyors 104, 105. The conveyors 104, 105 may be power driven by any suitable means (not shown) and, to permit of ready control thereover, the bonding head 101 is provided with a pair of operator controls 106, 108 (best illustrated in FIGS. 4 and 50 by which the operator can activate the conveyor driving means to move a selected conveyor 104, 105 in either a forward or reverse direction, or to stop a selected conveyor in a desired location with a battery 50 disposed beneath the bonding head 101. Preferably the operator control 106 forms part of a suitable activating circuit (not shown) for conveyor 104, while control 108 forms part of an activating circuit for conveyor 105. To facilitate placement of batteries 50 on, and removal from, the conveyors, the batteries may be positioned on pallets 109 or the like which can be readily moved from place to place by conventional fork-lift trucks.

A-1. X-Oriented Movement

Figure 6:
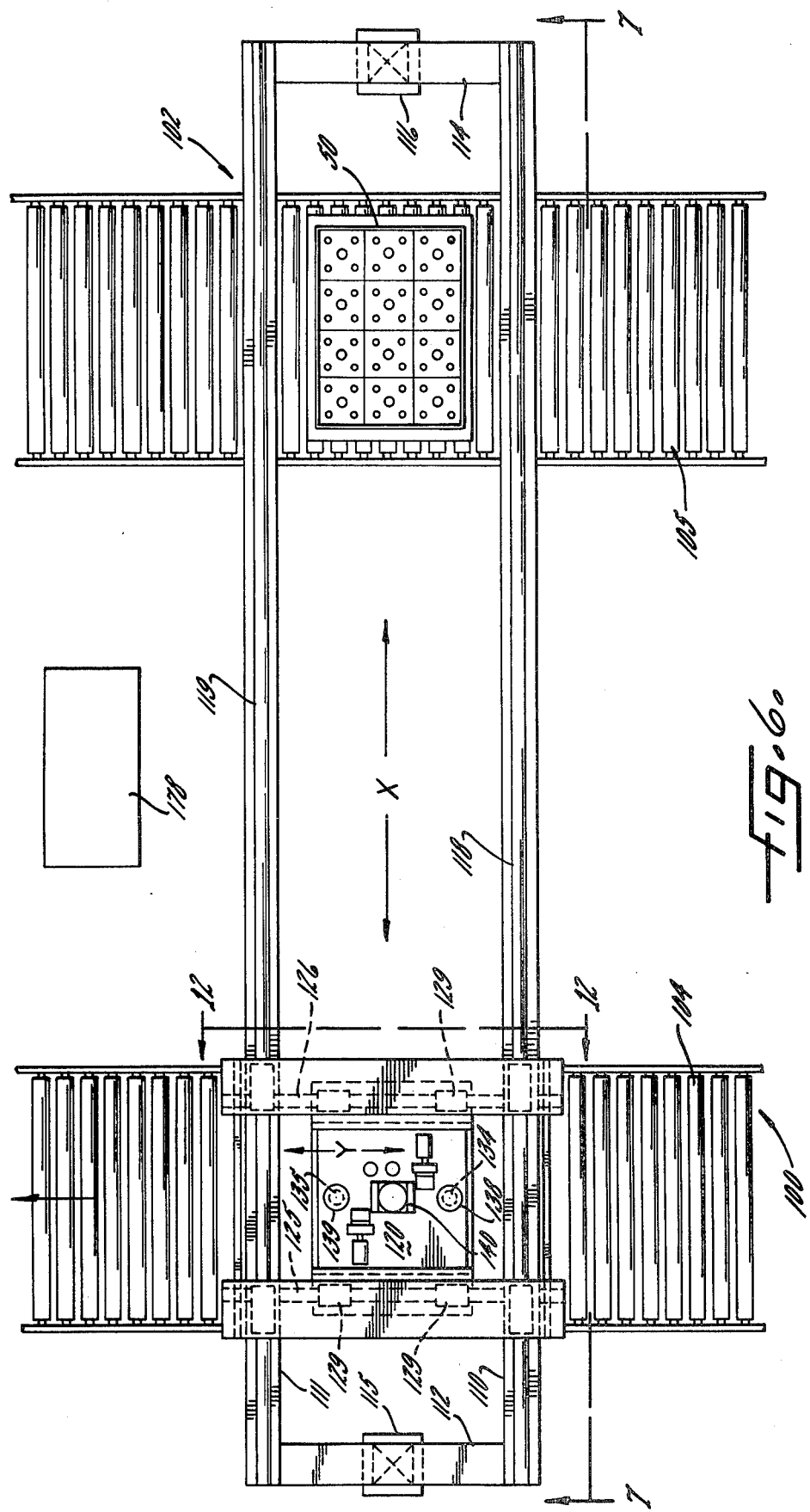
FIG. 6 is a plan view of the exemplary apparatus shown in FIG. 4, here depicting the bonding head over one conveyor belt and a battery positioned on the adjacent conveyor belt in readiness for a bonding operation.
Figure 7:
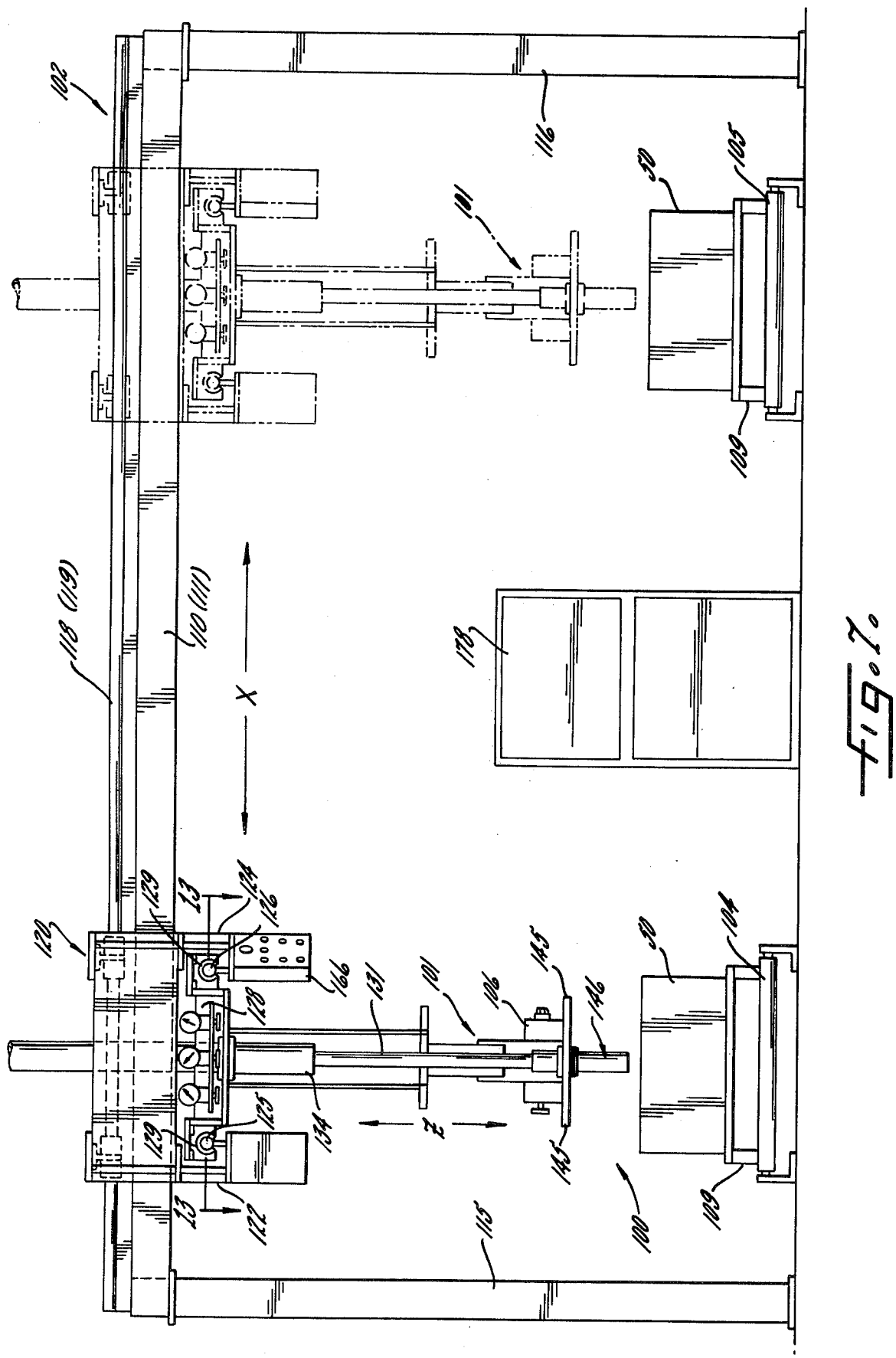
FIg. 7 is an elevational view taken substantially along the line 7—7 of FIG. 6, here depicting the bonding head in solid lines disposed over a battery carried by the left-hand conveyor and in phantom lines over a battery carried by the right-hand conveyor.

In accordance with one of the important aspects of the invention, and to permit facile movement of the bonding head 101 over a stationary battery 50 so as to enable the formation of successive bonds at multiple battery post locations on a rapid, production-line basis, the overhead suspension system 102 is preferably designed to permit of movement of the bonding head in both an X-oriented direction (transversely of the conveyors as indicated by the arrows in FIGS. 4 – 7) and a Y-oriented direction (along the line of conveyor movement as indicated by the arrows in FIGS. 4 – 6). To accomplish this, the overhead suspension system 102 includes a pair of parallel, spaced apart beams 110, 111 (best illustrated in FIGS. 4 and 12) which extend transversely across both conveyors 104, 105 and which are connected at their opposite ends by cross beams 112, 114 (FIG. 6); the beams 110, 111, 112 and 114 defining a generally rectangular support structure (FIG. 6). Vertically disposed, upright stanchions 115 and 116 are permanently affixed at their upper ends to the cross beams 112, 114 respectively, and are mounted on the floor outboard of the conveyors 104, 105. The beams 110, 111 respectively support guide rails or tracks 118, 119 which are parallel to the beams and also extend transversely across the conveyors 104, 105. A carriage assembly, generally indicated at 120 in FIGS. 4 and 7, is provided with suitable bearing sleeves 121 (FIGS. 4 and 12) mounted in surrounding relation to the rails 118, 119, thereby permitting slidable movement of the entire carriage assembly 120 in an X-oriented direction along the rails. Suitable lubricating means (not shown) may be provided so as to minimize friction and thereby permits ease of movement of the carriage assembly 120 along the rails.

A-2. Y-Oriented Movement

For the purpose of permitting movement of the bonding head 101 in a Y-oriented direction—i.e., along the path of movement of the conveyors 104, 105—the carriage assembly 120 is, in accordance with the present invention, provided with a pair of depending support beams 122, 124 (best illustrated in FIG. 4) which here serve to support Y-oriented tracks or guide rails 125, 126, respectively. A sub-carriage assembly, generally indicated at 128, is slidably supported on the guide rails 125, 126 by means of bearing sleeves 129. Again, suitable lubricating means (not shown) may be provided for minimizing frictional resistance between the rails 125, 126 and bearing sleeves 129 so as to permit relatively easy movement of the sub-carriage assembly 128 along the Y-oriented guide rails 125, 126.

A-3. Z-Oriented Movement

In carrying out the present invention, provision is made for enabling vertical movement of the bonding head 101 along a Z-oriented axis as viewed in FIGS. 4, 5 and 7. To this end, the various operating parts of the bonding head 101 are carried by a base plate 130 which is secured to the lower ends of a pair of vertically disposed support shafts 131, 132, such shafts passing upwardly through respective ones of a pair of bearing sleeves 134, 135 rigidly secured to a plate 136 which forms the undercarriage of sub-carriage assembly 128. The upper ends of the shafts 131, 132 have enlarged collars 138, 139 (FIG. 6; best illustrated in FIG. 14) respectively affixed thereto which serve as stops engageable with plate 136 to limit downward movement of the bonding head 101.

For the purpose of permitting the bonding head 101 to float during periods between bonding cycles and during movement of the head by the operator, and to further permit automatic movement of the operating parts of the bonding head during a bonding cycle, the illustrative apparatus is provided with a series of fluid-operated, preferably pneumatic, piston/cylinder combinations 140, 141, 142, the specific functions of which will hereinafter be described in considerably greater detail in connection with the description of the operation of the apparatus. For the purpose of the present description of the general organization of parts for the exemplary apparatus, it will suffice to say that the opposite sides of the piston within piston/cylinder combination 140 are pressurized so as to balance the weight of the components carried by base plate 130 and which comprise the bonding head 101, thereby permitting the head to float at whatever height or lever it is positioned in.

A-4. Operator Controlled Positioning of Bonding Head

The arrangement is such that when the operator wishes to move the bonding head 101 into a position in readiness to initiate a bonding cycle—for example, in readiness to bond a battery post/intercell connector combination such as generally indicated at 144 in FIGS. 4 and 5—it is merely necessary that he first activate the control 106 for conveyor 104 (or, alternatively, control 108 for conveyor 105) to generally locate a battery 50 beneath the bonding head 101. Having generally located a battery relative to the head, the operator next grasps one of the handles 145 projecting laterally from the base plate 130 and shifts the bonding head 101 laterally in either or both of an X-oriented and/or Y-oriented direction until the bonding ram assembly, generally indicated at 146 in FIGS. 4, 5 and 7, is accurately centered over the particular battery post/intercell connector combination 144 to be bonded. The operator then needs only push downwardly on the handle 145 so as to urge the bonding head 101 and ram assembly 146 downwardly from the position shown in FIG. 7 to the position such as shown in FIGS. 4 and 5 where the particular battery post to be bonded projects co-axially upward into the bonding ram assembly 146 when the latter is bottomed on the intercell connector to be bonded. The operator is now ready to initiate a bonding cycle for the particular post/connector combination 144 located under the bonding ram assembly 146 and, when the bond is completed, the bonding head 101 will automatically move upward to the position shown in FIG. 7. The operator then again grasps the handle 145 and moves the bonding head 101 in either an X-oriented or Y-oriented direction to a position over the next post/connector combination 144 to be bonded, and again repeats the foregoing operation.

A-5. Typical Battery Post, Bushing and Intercell Connector to Be Bonded

Referring next to FIGS. 9 and 10, there have been illustrated details of a typical organization of battery components particularly suitable for bonding in accordance with the present invention. More specifically, there is depicted a battery post/intercell connector combination 144 which consists of an upstanding lead battery post 148, a lead cover bushing 149 adapted to be molded directly into a battery or cell casing 150 (which may conveniently be made of plastic, hard impact rubber, or any other suitable material), and a lead intercell connector 151. The lower end of battery post 148 is, as heretofore described, affixed to, or integral with, a battery plate strap 152 which serves to interconnect a plurality of battery plates of like polarity—either positive plates or negative plates. The arrangement is such that, when assembled prior to bonding as shown in FIG. 10, the battery post 148 passes co-axially upward through the lead bushing insert 149 and cover 150. The opposite ends of the lead intercell connector (one such end being visible in FIGS. 9 and 10) are each provided with a vertically disposed opening or passage 154 having a diameter sufficiently large to permit the connector 151 to be positioned in co-axial surrounding relation to an upstanding flange 155 formed on the bushing 151, with the lower surface of the connector in direct lead-to-lead contact with a horizontal or radial flange 156 formed on the bushing.

To insure concentricity of the parts and, at the same time, to provide for sound electrical contact therebetween, the lead battery post 148 may be provided with two or more slightly raised locating ribs or projections (one such rib having been illustrated at 158 only in FIG. 9), which ribs have a slightly larger diameter than the inside diameter of the bushing 149. However, because of the characteristic of softness inherent with lead, the battery post may be relatively easily "force-fit" into the bushing 149, and the presence of such ribs thus serves to insure good electrical contact between the post 148 and bushing 149 while, at the same time, serving to center the post within the bushing.

In accordance with one of the important aspects of the invention, provision is made for enabling facile locating of the bonding head relative to the post/connector assembly. To this end, the intercell connector is provided with an upstanding peripheral collar 159 surrounding each opening 154, and a radially disposed external peripheral shoulder 160. The peripheral shoulder 160 defines the surface upon which the ram assembly 146 bottoms when the operator moves the bonding head 101 into position to effect a bond, while the upstanding collar 159 on the connector serves as a locating means to insure proper positioning of the ram assembly 146 relative to the post/connector combination 144 to be bonded and, also, the collar 159 serves as a source of lead for the bond and as a dam to confine the molten lead formed initially in the bonding operation.

In keeping with the invention, the battery post 148 is designed to provide all of the surplus lead required to effect a completed bond such, for example, as the bond shown at 161 in FIG. 5. To this end, it will be observed that the illustrative battery post 148 projects upwardly substantially above the upper surface of the connect locating collar 159 and, when the lead defining the upwardly projecting portion of the post is melted during a bonding cycle, such lead provides all of the molten material necessary to fill the annular cavity within the connector opening 154 and defined between the post 148 and connector 151. The particular height of the post 148 may vary since the amount of lead supplied will be a function of both the height and the diameter of the post 148, while the amount of lead required to form a desired bond will be a function of the size of the connector opening 154 and the desired height of the finished bond. However, it will be readily a parent to those skilled in the art upon comparison of a conventional post/bushing/connector combination such as shown in FIG. 3 with one embodying the features of the invention such as shown at 144 in FIG. 10, that the novel assemblage of parts provided by the invention will eliminate the need for any separate source of lead such, for example, as the hand-held lead bar-stock 74 (FIG. 2) which has heretofore been required in hand-burning and/or hand-torching operations.

A-6. Operator Controls

In order to facilitate an understanding of the ensuing description, the various controls that are provided for the operator and the location of such controls will be briefly described. During a normal series of bonding operations on a given battery or series of batteries, the operator will be required to handle only a few controls. These controls are, for the most part, mounted on either the bonding head 101 or on the carriage assembly 120. Thus, as best illustrated in FIG. 5, there are two operator controls mounted on the bonding head 101 in addition to the conveyor controls 106, 108 previously described. These two additional controls include a control button 162 which serves to activate a number of conventional pneumatically actuated clamps (not shown) that are mounted on the carriage assembly 120 and which serve to engage the X-oriented and Y-oriented rails 118, 119 and 125, 126 respectively, to lock the carriage assembly 120 and sub-carriage assembly 128 in position during a bonding cycle. At the same time, actuation of control button 162 serves to increase the pressure on the upper end of piston/cylinder combination 140 so as to move the electrode 154 (FIGS. 11a – 11d) contained within the ram assembly 146 downwardly into engagement with the top of a battery post 148. The second control mounted on the bonding head 101 is indicated at 165 in FIG. 5 and serves only to pressurize the bottom side of the piston/cylinder combination 140, thereby allowing the operator to rapidly move the bonding head 101 upwardly in a Z-oriented direction in the event that rapid removal of the head from the battery is required for any reason.

Depending from the carriage assembly 120 is a small control console 166 which is provided with a number of additional controls and indicator lights. These controls include a bond initiate button 168, actuation of which is required in order to turn bond power to the electrode 164 ON, and an emergency stop control 169 which may be actuated by the operator in the event of some emergency such as a broken water line, severe arcing, fire or other similar emergency which requires turning the entire system OFF quickly. Similarly, there is provided a current abort switch 170 which permits the operator to turn the power supplied to the electrode 164 OFF at any time he desires and for any reason. Indicator lights 171, 172, 174 and 175 serve various functions: light 171 indicates simply that the a) the system is in condition for locating movement of the carriage and/or sub-carriage assemblies 120, 128 and b) the operator can move the bonding head 101 in X-, Y- and/or Z-oriented directions to locate the head relative to the next post to be bonded; light 172 indicates when the electrode 164 is locked in its down position in readiness to bond; light 174 indicates that power is ON to the electrode 164 and a bonding cycle is underway; and, light 175 is simply a fault indicating light used to indicate that some fault has been detected by the monitoring portion of the system. When such a fault is detected, the monitoring portion of the system will serve to render the system inoperative until such time as the operator ascertains what the problem is. At that time the operator can activate control button 176 which is simply a reset control that serves to clear the memory of the computers (not described in detail) and permit continued operation of the system. Once the system has been reset, the operator may take whatever steps are required to correct the fault before proceeding with the next bonding cycle. Referring to FIG. 4, it will be observed that, for the convenience of the operator, the controls 162, 165 and the small control console 166 are all duplicated on the opposite side of the equipment, thereby enabling the operator to handle the bonding head 101 from either side of the conveyor.

Figure 8:
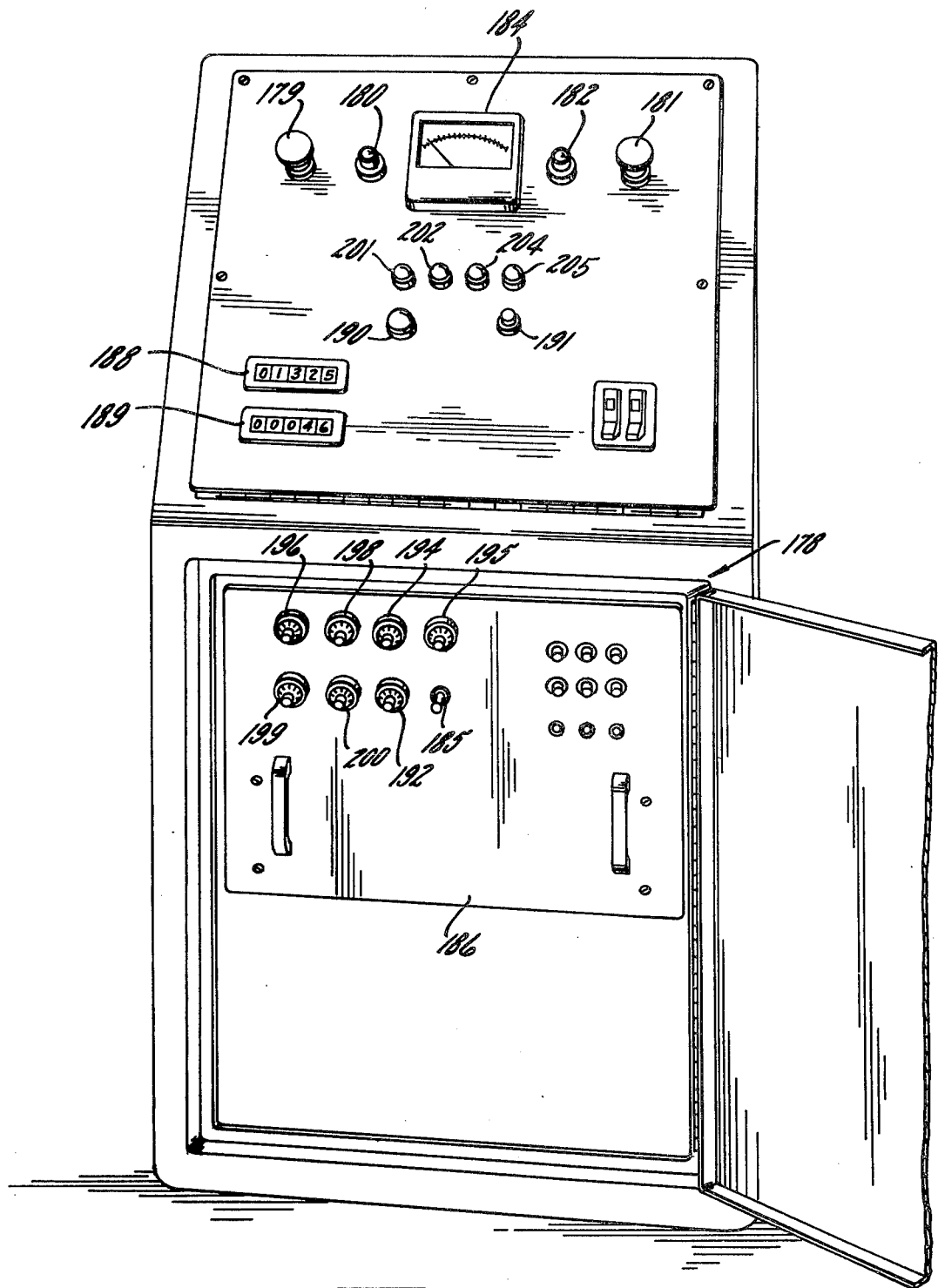
FIG. 8 is a perspective view of the front of a control console utilized with the apparatus of the present invention, here depicting the console with its lower door open to expose the drawer containing certain of the electrical controls for the system.

The computer memory banks and related electronic equipment are contained within a mobile control panel and electronic console 178, best illustrated in FIG. 8. The particular electronic controls do not form an essential part of the present invention and, therefore, will not be described herein in detail. Rather, it should suffice for purposes of an overall understanding of the general organization of the apparatus and control functions available, to simply point out certain of the controls provided. Thus, the console 178 includes a power OFF switch 179 and a power ON switch 180 which includes an ON indicator light. Similarly, there is provided a bond power OFF switch 181 and bond power ON switch 182, the latter again including an indicator light. Disposed between these two sets of power switches is a conventional milliammeter 184 capable of displaying either power readings in watts or temperature, or current readings in amperes, dependent upon the position of toggle switch 185 mounted on the front of the lower console drawer 186. Conventional resettable digital display counters 188, 189 are provided for indicating, respectively, the total number of bond cycles effected by the apparatus, and the total number of bond cycles completed in a given period of time such, for example, as per shift, per day or per week. The mobile console 178 further includes a fault indicating light 190 and reset button 191 which correspond to and duplicate the controls 175, 176 shown in FIG. 5.

In order to permit presetting of the system so as to enable operation thereof within selected parameters, the mobile control console includes a number of rheostat type switches on the front of drawer 186. These include: a switch 192 for setting the amount of power to be provided to the system; a switch 194 which sets the dwell period during which the heated electrode remains heated after it reaches its maximum penetration into the bond area; a switch 195 for setting the length of the cool period during which the molten material is permitted to cool after the electrode 164 has been retracted but before the ram assembly 146 is raised; and switches 196, 198, 199 and 200 for setting such other variable parameters as the length of a bond cycle and the current setting for the electrode. These latter switches comprise part of the monitoring system and are related to indicator lights 201, 202, 204 and 205 on the console which serve to indicate when a fault condition has arisen requiring the operator to reset the system.

B. Positive Displacement Bonding Sequence of Operations

Referring next to FIGS. 11a – 11e, there will be described a typical sequence of steps in movement of the ram assembly 146 during a typical positive displacement bonding operation.

Figure 11B:
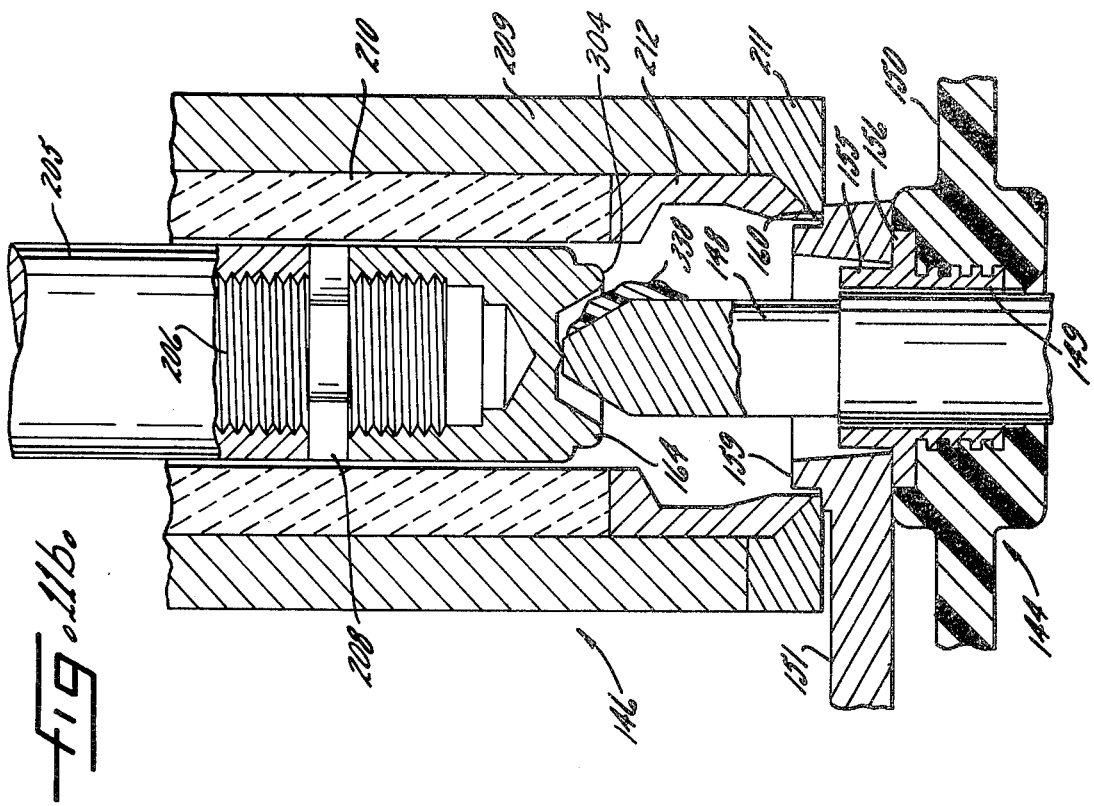

In keeping with the invention, provision is made for establishing a reservoir surrounding the area to be bonded, advancing the heated electrode 164 through the reservoir and into and through the area of the workpieces to be bonded so as to melt those portions of the workpieces to be bonded and to displace the molten material formed into the reservoir, thereby insuring accurate control of the depth of penetration into the bond area, uniform heating of the surrounding unmelted parts of the workpieces, and uniform heating of the displaced molten material contained within the reservoir, and for thereafter retracting the electrode so as to permit the displaced molten material stored in the reservoir to return to the cavity formed by the electrode in the workpieces, where the material is permitted to cool and solidify. To accomplish this, and as best illustrated in FIGS. 11a and 11b, the lower end of the ram assembly 146 includes a central ram 205 having an internal threaded bore 206 in which is threaded an adapter 208.

The adapter 208 serves to removably support the electrode 164 which is threaded thereon. Preferably the ram 205 is formed of highly conductive material such as copper, while the adapter 208 and electrode 164 can be formed of various materials, some of which are hereinafter described.

In order to form a reservoir into which the molten material formed can be displaced, the lower end of the ram assembly 146 includes a barrel 209 formed of conductive material and which forms the outer member of the ram assembly. The arrangement is such that the ram 205 and electrode 164 are capable of axial movement through the barrel 209 and are insulated from the barrel by means of a ceramic liner or sleeve 210. The lower end of the barrel 209 has affixed thereto a suitable conductive locating and retaining ring 211 which can be readily removed and replaced when the need arises—for example, in the event of wear. Excellent results have been attained with the present invention by forming the locating and retaining ring 211 from a beryllium copper alloy. A suitable annular insulating collar 212, preferably made of phenolic plastic, is positioned within the lower end of the barrel 209 and ring 211 and, together with the ceramic sleeve 210, prevents direct current flow from the electrode 209 and/or ram 205 through the molten material to the barrel 210 and ring 211. The locating and retaining ring 211 serves a number of functions. Thus, the ring 211 is provided with an inwardly extending tapered radial flange that serves to retain the stacked annular insulator 212 and ceramic sleeve 210 in position. In addition, the lower surface of the ring 211 serves as a locator to facilitate in accurate positioning of the ram assembly 146 about the upright flange 159 on the connector 151. Finally, the ring serves to complete a current path from the lead parts back through the conductive barrel 209.

Referring now more specifically to FIG. 11a, it will be observed that the ram assembly 146 is shown in solid lines somewhat above the post/connector combination 144—i.e., in a position comparable to that shown in FIG. 7—and, in phantom lines in a downard position engaging the intercell connector 151—i.e., in a position comparable to that shown in FIGS. 4 and 5. Thus, it will be understood that in order to move the ram assembly 146 from the solid line position of FIG. 11a to the phantom position shown therein (at which point the electrode 164 will still be positioned well above and out of engagement with the battery post 148), it is simply necessary for the operator to press downwardly on the handle 145 (FIG. 5) of the bonding head 101 in the manner previously described, thus forcing the head down and causing the locating ring 211 to pilot about the upright flange portion 159 of the connector. When the locating ring is properly positioned with respect to the connector, it will engage the radial shoulder 160 on the connector and complete an electrical connection therebetween. Because of the presence of the locating collar 159 on the connector, in the event that the ram assembly is misaligned with respect to the post/connector combination 144, the ring 211 will engage the top of the collar and will not seat properly, a condition that will be readily apparent to the operator. In this event, the operator need only shift the bonding head 101 slightly in an X- and/or Y-oriented direction(s) until proper concentricity is achieved, at which point the opening in the ring 211 will permit further downward movement of the ram assembly until it reaches the proper downward position.

At this point in the operating cycle, the operator, having manually positioned the bonding head 101 and ram assembly 146 in proper orientation with respect to the battery post/connector combination 144 to be bonded and having observed that such proper orientation has been achieved, is now ready to initiate a bonding cycle. To this end, the operator will first engage the clamp button 162 (FIG. 5) on the bonding head, thereby serving to activate the pneumatic clamps (not shown) which will lock the carriage and sub-carriage assemblies 120, 128 in position with respect to the rails 118, 119 and 125, 126, thereby preventing further X or Y movement of the bonding head. After a short time delay, pressure will be applied to the upper end of the piston/cylinder combination 140 (FIG. 4) which will serve to move the ram 205 and electrode 164 downwardly into the position shown in FIG. 11b where the electrode 164 engages the top of the battery post 148. At this point, the indicator light 172 on control console 166 (FIG. 5) will be illuminated to indicate that the ram 205 is in position and the operator can initiate the next step of the bonding cycle.

When the operator observes that light 172 is illuminated indicating a "bond ready" condition, he then will engage the "bond initiate" button 168 which serves to complete an energizing circuit for the electrode 164. Referring to FIG. 11b, current will be supplied to the ram 205 from a suitable power source (not shown) and will be transmitted from the ram 205 through the adapter 208 to the electrode 164 which serves as a resistance element that is heated to a level sufficient to rapidly melt those portions of the lead components that it comes into engagement with. The current path passes from the electrode through the battery post 148, the lead bushing 149, the intercell connector 151, the beryllium copper locating and retaining ring 211, and back through the conductive barrel 209 to the power source.

Figure 11C:
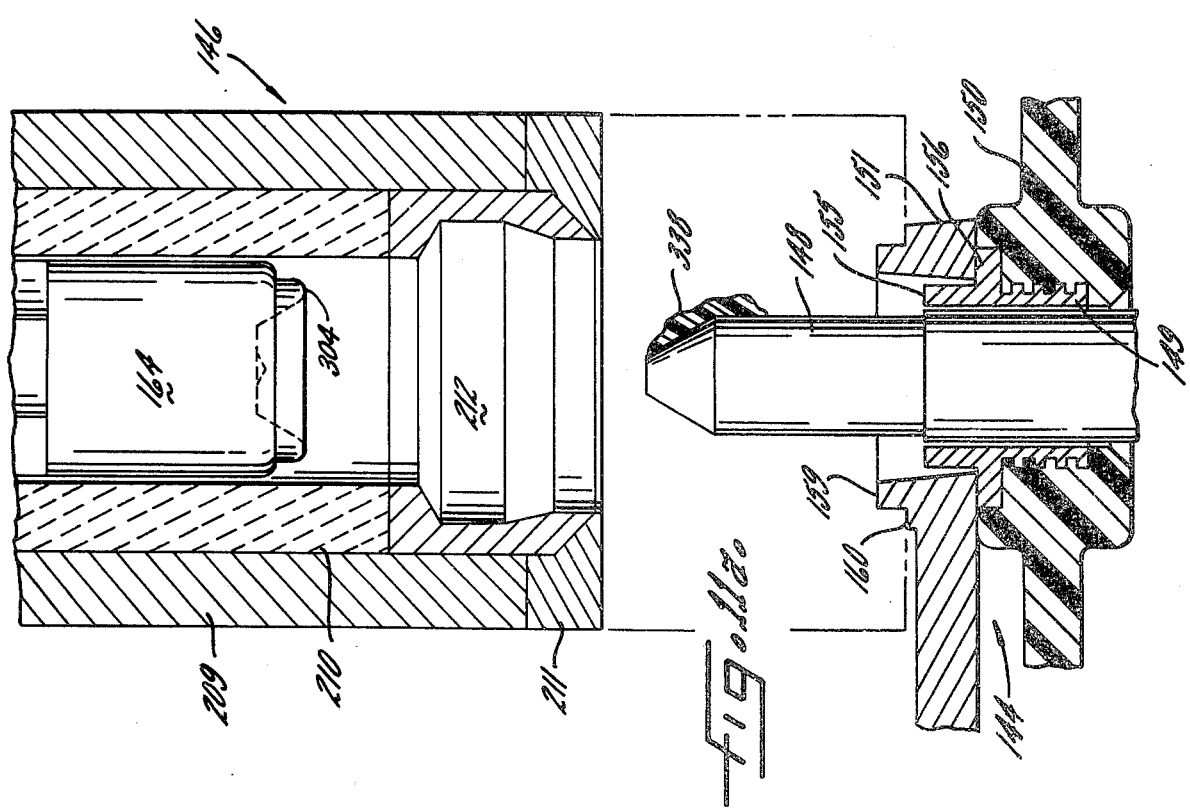

As current begins to flow through the foregoing circuit, the electrode 164 is heated to a level sufficient to melt the lead battery post and, as a consequence, the ram 205 will start to move downwardly through the ram assembly 146 under the influence of the pressurized piston/cylinder combination 140. Referring next to FIG. 11c, it will be observed that the electrode 164 has moved downwardly a sufficient distance to melt all of the upwardly projecting portion of the battery post 148 and, at this stage of the cycle, the electrode has begun to melt the inner peripheral edge of the raised locating collar 159 on the connector. Moreover, the molten lead thus formed has been displaced laterally into an annular upstanding column as best indicated at 214 in FIG. 11c with the molten lead being disposed in the annular reservoir surrounding the electrode and defined by the insulating sleeve or collar 212 mounted within the lower end of the barrel 209. However, because of the presence of the insulating collar 212, a direct electrical path from the electrode 164 to the barrel 209 or ring 211 through the molten lead 214 is precluded.

Further downward movement of the ram 205 and electrode 164 now serves to melt the remainder of the upstanding locating collar 159 on connector 151, as well as the upper portion of flange 155 on bushing 149, thus creating a condition as best illustrated in FIG. 11d.

The system may be readily adjusted (in a manner to be hereinafter explained) to provide for penetration of the electrode 164 through the bond area to any desired and preselected depth within the workpieces. When the desired depth has been reached, a limit switch LS-1 (FIG. 5) will be actuated by means of an actuator 215 carried by the ram, and such actuation will serve to initiate a short time delay period during which the electrode 164 will dwell in its advanced position as shown in FIG. 11d with bond power ON, thereby insuring that the unmelted portions of battery post 148, bushing 149 and connector 151 are uniformly heated, and at the same time serving to insure that the molten lead 214 maintained within the reservoir is also uniformly heated. At the conclusion of the time delay period, the ram 205 and electrode 164 are retracted, while the barrel 209 of the ram assembly 146 is left in its downward position as best shown in FIG. 11e. In this position, the molten lead 214 is permitted to return to the cavity formed in the workpieces by advance movement of the electrode, and such molten material is thereafter permitted to cool and solidify during a preset cooling cycle. Upon completion of the cooling cycle, the barrel 209 of the ram assembly is retracted and the bonding cycle is complete.

C. Carbon-Graphite Electrode

In the practice of the present invention it has been found that the electrode 164 may be made of a wide variety of materials and in various configurations dependent upon the nature of the material being bonded and the desired characteristics of the finished bond. Merely by way of example, it has been found that satisfactory results can be obtained in some applications by utilizing an electrode formed of stainless steel or the like. However, when utilizing the positive displacement bonding system of the present invention to form battery post/connector bonds, stainless steel has proven less than desirable in a number of respects. The difficulties that have been encountered are believed to be related to the particular material being bonded—viz., lead-to-lead bonds. That is, it is generally known that lead has a particular tendency to oxidize, and this problem is rendered even more serious by the fact that it is common practice in the battery industry to use antimony-lead and, in some instances, calcium-lead, materials. For example, antimony is commonly added to the lead to impart greater strength. It has been found that when bonding, for example, antimony-lead with the present invention, there is a tendency for the antimony to oxidize and plate out on the electrode 164, particularly where the electrode is made of stainless steel. Such plating out of antimony, and/or accumulation of other lead oxides on the electrode, tends to significantly decrease the useful life of the electrode, necessitates continual removal and cleaning of the tip, and leads to undesirable arcing as the oxides accumulate on the electrode, often leading to destruction of the lead battery components.

In carrying out the invention, provision is made for taking advantage of the unique properties of carbon-graphite as an electrode material. Thus it is known that carbon-graphite is characterized by combining high thermal conductivity characteristics with high electrical resistivity characteristics, thereby permitting lower current flow and attainment of a more uniform temperature profile for an electrode of given geometry than heretofore possible. However, prior to the present invention, carbon-graphite has not proven satisfactory for a bonding electrode material, primarily because such prior systems have normally depended upon a combination of elevated temperatures and pressure to achieve a desired bond, and carbon-graphite simply was not suitable for withstanding the repetitive impacts involved between workpieces and the electrode, particularly at the high pressures imparted between the parts.

With the present invention, however, it is now possible to obtain sound electrical and structural bonds between lead workpieces or the like without having to exert great pressure—indeed, the present invention contemplates a combination of elevated temperature and displacement of molten material, as contrasted with prior techniques which relied in great part upon pressure. Accordingly, excellent results have been achieved in effecting positive displacement bonds of the type here described by the use of an electrode 164 formed of carbon-graphite. Such carbon-graphite electrodes have been found to be substantially self-cleaning in that whatever material tends to coat the electrode surface on a given bond will tend to dissolve in the ensuing bonding operation, thereby preventing the build-up of oxides thereon. Moreover, considerably lower temperature levels can be maintained with carbon-graphite tips than with tips made of steel alloys—for example, temperatures on the order of 1,800°F. have been encountered with steel alloy tips, thus producing undesirable hot spots, while maximum temperatures encountered with a carbon-graphite tip are generally on the order of only 800°F.

D. Detailed Construction of Exemplary Bonding Apparatus

Referring now to FIGS. 13 through 16, the specific construction of the exemplary bonding apparatus has been illustrated and will here be described in detail. As best illustrated in FIGS. 14 and 15, it will be observed that the piston/cylinder combination 140 is bolted directly to plate 136 which forms the undercarriage of sub-carriage assembly 128. The piston/cylinder combination 140 includes a piston 140P coupled directly to a table 220 and having a lower piston portion 140P' extending downwardly from the table 220. The lower end of the piston portion 140P' passes through a U-shaped bracket 221 welded to base plate 130 and is rigidly affixed to the upper end of ram 205, thus providing a direct connection between the piston/cylinder combination 140 and the ram 205. The barrel-like reservoir defining means 209 is, in turn, bolted directly to the lower surface of base plate 130 in concentric surrounding relation to the ram 205 and lower piston portion 140P'.

In order to provide an adjustable fixed mechanical stop which limits the advance movement of the ram 205 and, thus, to controllably limit the degree of penetration of electrode 164 into the workpieces, a threaded sleeve 222 (FIG. 14) is affixed to the lower surface of table 220 in concentric surrounding relation to the piston 140P', and is threadably engaged with a thumbwheel screw 224 slidably mounted on the piston 140P'. The arrangement is such that when the operator initiates a bonding cycle and the piston/cylinder combination 140 is actuated to move the piston downwardly, the table 220 will move downward until such time as the adjustable thumbwheel screw 224 engages the top of U-shaped bracket 221. That bracket is, of course, stationary by virtue of the fact that it is welded to base plate 130 which, in turn, is bolted to the barrel 209 that is seated on the stationary battery post/connector combination 144 being bonded. Consequently, when the thumbwheel screw 224 engages the bracket 221, further downward movement of the ram is precluded. The operator may, therefore, adjust the degree of electrode penetration into the workpieces by the simple expedient of threading the screw 224 into the sleeve 222 to extend bond penetration, or threading the screw 224 out of the sleeve 222 to decrease bond penetration.

In order to initiate a dwell cycle with the electrode 164 in its most advanced position, the limit switch LS-1 (FIGS. 5 and 15) mounted on base plate 130 is positioned to be actuated by the switch actuator 215 which is carried on a bracket 226 welded directly to the ram 205. Preferably, the switch actuator 215 is also adjustable to accomodate for variations in bond penetration as determined by the position of the thumbwheel screw 224. Thus, at about the same time as the screw 224 bottoms on bracket 221 to prevent further advance of the ram, the actuator 215 engages and activates the limit switch LS-1 which serves to initiate a suitable time delay for maintaining bond power on the electrode during a preselected dwell period, after which current to the electrode is turned OFF.

During the "float" portion of an operating cycle while the operator is moving the bonding head 101 from one battery post position to another, provision must be made for maintaining the table 220 and base plate 130 in spaced apart relation with respect to one another, yet with freedom for closing movement with respect to one another during the bonding cycle when base plate 130 is stationary and table 220 is moving downwardly. To this end, and as best illustrated in FIG. 14, the cylinders of piston/cylinder combinations 141, 142 are bolted to the underside of table 220, while the pistons 141P, 142P are connected to the base plate 130. Referring to FIG. 15, it will be observed that a pair of vertically upstanding pins 228, 229 are mounted on bracket 221 and positioned for slidable movement within and through a pair of bearing sleeves 230, 231 mounted on table 220. During a bonding cycle, the piston/cylinder combinations 141, 142 are depressurized and, therefore, the table 220 is free to move downwardly toward the base plate 130 until engagement of the adjustable stop 224 with bracket 221. When this closing movement occurs, the pins 228, 229 are free to slide upwardly through sleeves 230, 231 where they project above the upper surface of the table 220. However, during the float portion of the bonding cycle and the "head retract" cycle, a slide 232 (FIG. 15) mounted on table 220 is moved to the right as viewed in the figure by means of a pneumatically actuated piston/cylinder combination 234, thus serving to move vertical bores formed in the slide out of alignment with the sleeves 230, 231, thereby blocking the sleeves. In this condition, the pins 228, 229 engage the slide 232, and further closing movement of the table 220 with respect to the base plate 130 is precluded.

During operation of the system, and considering first the float cycle when the operator is positioning the bonding head 101, the lower ends of piston/cylinder combinations 140, 141 and 142 are all pressurized. A sufficient amount of pressure is maintained in piston/cylinder combinations 141, 142 to tend to lift the base plate 130 towards table 220, thus holding the pins 228, 229 in engagement with slide 232. At the same time, sufficient pressure is maintained on the lower side of piston/cylinder combination 140 to balance the total weight of the system carried by piston rod 140P.

Once the operator has properly located the bonding head 101 with respect to a particular battery post/connector combination 144 to be bonded—viz., when the head is in the position shown in FIGS. 4 and 5—the operator will depress the clamp button 162 (FIG. 5), thus setting the pneumatic clamps (not shown) to lock the carriage and sub-carriage assemblies 120, 128 in a fixed position where further X- or Y- oriented movement is precluded. At the same time, the lower ends of piston/cylinder combinations 141, 142 are depressurized so as to relieve the force tending to separate the stationary base plate 130 and table 220, thereby permitting the side 232 to move to the left as viewed in FIG. 15 without interference by the pins 228, 229. Piston/cylinder combination 234 is simulataneously activated to move the slide 232 to the left so as to align the slide openings with respect to the bearing sleeves 230, 231. Sufficient pressure is now applied to the upper side of piston/cylinder combination 140 to overcome the float pressures theretofore established, thus permitting table 220 to move downwardly along with piston 140P and ram 205 until the electrode 164 engages the top of the battery post disposed within the ram assembly 146. During such downwardly movement, pins 228, 229 are free to move upwardly through bearing sleeves 230, 231 respectively, and through the openings in the slide 232 which are now aligned with the bearing sleeves.

The operator will next depress the "bond initiate" button 168 (FIG. 5), thereby initiating current flow through the electrode 164 in the manner previously described. As the electrode 164 is heated and the lead in engagement therewith is melted, the ram 205 and electrode 164 are free to move downwardly following the melting post until such time as the thumbwheel stop 224 engages bracket 221. At this point in the operating cycle, activation of limit switch LS-1 initiates a dwell period of predetermined duration, after which the bond power is turned OFF and the pressure on piston/cylinder combination 140 is reversed to retract the ram 205. While sufficient pressure is established on the lower end of the piston/cylinder combination 140 to move the ram 205 upwardly, not enough pressure is supplied to lift the weight of the bonding head 101 itself and, consequently, the barrel 209 remains in its lowermost position in engagement with the connector 151 being bonded.

In carrying out the present invention, provision is made for automatically lifting the bonding head 101 off the bonded battery post/connector combination upon completion of a bond cycle and after sufficient time is allowed for the molten lead to cool and solidify. To accomplish this, when the ram 205 is retracted, a suitable time delay is established which controls the cooling cycle. At the same time, a pair of pneumatically actuated clamps 240, 241 (FIG. 13) mounted on plate 136 of sub-carriage assembly 128 are actuated so as to clamp onto the upper ends of a pair of upstanding posts 242, 244 which are rigidly connected at their lower ends to table 220, thus locking the table 220 in a fixed position relative to plate 136 and preventing further upward movement of the table 220. When the time delay device times out, indicating completion of the cooling cylce, the piston/cylinder combination 234 (FIG. 15) is again actuated to reset slide 232 in position blocking pins 228, 229 and the lower ends of piston/cylinder combinations 141, 142 are pressurized so as to lift the base plate 130 up relative to the table 220 which is locked in position by clamps 240, 241 and posts 242, 244. As a result, the base plate 130 and ram assembly 146 "hop" upwardly a short distance until the pins 228, 229 again engage the slide 232 and, continued pressure on the lower ends of cylinders 141, 142 then serves to urge the base plate 130 upwardly with the plate 130 and table 220 being held apart by pins 228, 229 which are in engagement with slide 232. At this point, the pneumatically actuated clamps 240, 241 are released, piston/cylinder combination 140 is repressurized to establish to the balanced float condition, and the pnuematic clamps (not shown) which serve to lock the carriage and sub-carriage assemblies 120, 128 to the rails are released, thereby permitting the operator to relocate the bonding head 101 in position to bond the next battery post/connector combination 144.

E. Electrical and Pneumatic Control Circuits

Referring next to FIGS. 17a – 17c, 18 and 19 conjointly, a typical bonding cycle embodying the features of the present invention will be briefly described. For purposes of an understanding of the ensuing description, it will be assumed that the operator has properly located the bonding head 101 in the position shown in FIGS. 4 and 5 and is now ready to depress the "clamp" button 162, the first of the two specific "operator actions" indicated in FIG. 19.

E-1. Clamp and Engage Cycle

Depression of the clamp button 162 serves a number of different functions. Thus, when the button is depressed, a signal is passed through NAND gate 245 (FIG. 17a) and is simultaneously presented on the set terminal of the brake, retract, and turn-on bistable flip-flops 246, 248 and 249 respectively, and, at the same time, on the input terminals of a pair of monostable flip-flops 250, 251 which respectively form parts of preset time delay devices TD-1 and TD-2. Application of a set signal on brake flip-flop 246 completes an activating circuit for the energizing coil of a conventional solenoid controlled valve V-1 (FIGS. 17a and 18), thus completing a flow path in the pneumatic system shown in FIG. 18 from a pressure source (not shown) through a filter and main drain device 252 and pressure regulator 254 to the brake valve V-1 so as to provide a source of pressure for the pneumatically actuated clamps (not shown) which serve to lock the carriage and sub-carriage assemblies 120, 128 (FIGS. 4 and 5) to their respective sets of rails 118, 119 and 125, 126, thus preventing further X- and/or Y-oriented movement until such time as the brake flip-flop 246 is reset and the brakes released.

In order to shift the slide 232 (FIG. 15) to the left to the position shown in the figure so as to align the bores in the slide with the bearing sleeves 230, 231, thereby permitting the ram 205 to move downwardly into engagement with the battery post to be bonded, two actions take place automatically when the operator depresses the clamp button 162. First, the signal applied on the set terminal of retract flip-flop 248 (FIG. 17a) serves to activate the energizing coil for a solenoid controlled valve V-2 (FIGS. 17a and 18) by coupling a controlled pressure level to the lower ends of piston/cylinder combinations 141, 142 through pressure regulator 255, thus serving to decrease the pressure at the lower ends of such piston/cylinder combinations and relieving the forces theretofore created which tended to urge the base plate 130 and table 220 (FIG. 14) together. As a result, the forces urging the pins 228, 229 into engagement with the slide are relieved. When the signal is presented at the set terminal of the retract flip-flop 248, it is also simultaneously presented at the input terminal of the monostable flip-flop 250 which forms part of the time delay device TD-1. After a short delay established by the device TD-1—a delay sufficient to permit decrease of the pressure on the lower ends of piston/cylinder combinations 241, 242—a signal is passed through the device TD-1 to the set terminal of a lock bistable flip-flop 256, thereby energizing the coil of a solenoid controlled lock valve V-3 (FIGS. 17a and 18). Energization of the valve V-3 applies sufficient pressure through pressure regulator 254 (FIG. 18) to energize the piston/cylinder combination 234 (FIG. 15), thus pulling the slide 232 to the left as viewed in the figure, aligning the bores in the slide with the bearing sleeves 230, 231, and permitting movement of the pins 228, 229 through such sleeves.

Finally, the signal passed through the NAND gate 245 and presented on the input terminal of monostable flip-flop 251 serves to provide an input signal for the set terminal of a float bistable flip-flop 258 (FIG. 17a) after a delay determined by the time delay device TD-2—a delay which is somewhat longer than that established by device TD-1 as best illustrated in the timing chart (FIG. 19). Such longer delay is provided to insure movement of the slide 232 to the left-hand position shown in FIG. 15. When delay device TD-2 times out, a signal is simultaneously presented on the set terminal of the float flip-flop 258 (FIG. 17a) and on the input terminal of a monostable flip-flop 259 (FIG. 17b). Driving of the bistable flip-flop 258 to its set state completes an activating circuit for the energizing coil of a solenoid controlled valve V-4, thereby positioning the valve so that pressure is supplied to the upper end of piston/cylinder combination 140 (FIG. 14) through a pressure regulator 260 and flow control valve 261 (FIG. 18). The pressure is increased to a point sufficient to overcome the float pressures theretofore established in the lower end of the cylinder (which is permitted to bleed through a conventional double-acting quick exhaust valve 262), thus permitting the piston 140P, table 220 and ram 205 (FIG. 14) to move downwardly—the pins 228, 229 now being free to slide through the bearing sleeves 230, 231 and the aligned bores in slide 232 (FIG. 15)—until the electrode 164 on the end of the ram engages the battery post 148 in the position shown in FIG. 11b. The apparatus is now ready to initiate a bonding operation, and such condition is indicated by a signal passed through the monostable flip-flop 259 (FIG. 17b) to the set terminal of a ready flip-flop 264 which serves to activate an energizing circuit for the bond ready indicating lights 172 on the control consoles 166 which depend from the carriage assembly 120 (FIGS. 4 and 5).

E-2. Bonding Cycle

Referring for the moment to FIG. 19, it will be noted that there is a time interval between the point when delay device TD-2 times out (at which time it will be observed that the brakes are applied, the lock retract is actuated, and bond force is being applied) and the time when the next operator action takes place. This interval serves only to permit the operator sufficient time to: 1) remove his hand from the clamp button 162; 2) check the control console 166 (FIGS. 4 and 5) to ascertain whether the bond ready indicator light 172 is illuminated, thereby confirming that the electrode 164 on ram 205 is in engagement with the battery post 148; and 3) to reach up to the control console 166 and depress the bond initiate button 168.

At this point, the second operator action shown in FIG. 19 takes place—viz., the operator depresses the bond initiate button 168 (FIGS. 5 and 17b), thereby providing one of two required input signals for an AND gate 265. The second input signal to AND gate 265 is derived from the bond ready flip-flop 264 which serves to activate the energizing circuit for the bond ready indicating light 172. Assuming both input signals are presented at the AND gate 265, an output signal is transmitted from the gate to the set terminal of a bond bistable flip-flop 266 (FIG. 17b). When the flip-flop 266 is driven to its set condition, an output signal is presented at terminal 268 which is coupled to a suitable power switch (not shown) that is in the energizing circuit for the electrode 164 (FIGS. 11b, 14 and 16), thereby establishing current flow through the ram 205, electrode 164, battery post 148, bushing 149, connector 151, retaining ring 211, barrel 209, and back to the power source. As the electrode 164 is heated, it serves to melt those portions of the lead components with which it is in engagement (initially the battery post 148, and later the connector 151 and bushing 149—FIGS. 11b, 11c and 11d), and the electrode 164 moves downwardly with the melting components under the influence of the slight positive bond force provided by the pressure level at the upper end of piston/cylinder combination 140.

At the same time that bond power is turned ON, several monitoring functions are enabled. First, the signal presented to the power switch terminal 268 (FIG. 17b) is also presented at one input terminal of an AND gate 269 (FIG. 17c). The second input signal for gate 269 is derived from a comparator network, generally indicated at 270 in FIG. 17c, which serves to compare the actual current level in the electrode 164 with the maximum permissible level preset for the system by operator adjustment of the rheostat type switch 200 (FIGS. 8 and 17c) and, when the comparator 270 indicates that the current is excessive, a second signal is presented at the AND gate 269, thereby producing an output signal from the gate which serves to set the bond over current bistable flip-flop 271 and illuminates the bond over current indicator light 205.

At the same time that a signal is presented on the power switch terminal 268, a signal is passed directly from the flip-flop 266 (FIG. 17b) to the bond on indicator light 174 (FIGS. 5 and 17b) to provide a visual indication to the operator that a bonding cycle is underway, as well as to the input terminals of three time delay devices TD-3, TD-4 and TD-5 (FIG. 17c). Time delay device TD-3 provides one input to an AND gate 272 which derives its second input from a comparator network, generally indicated at 274 in FIG. 17c, which serves to compare the actual current level in the electrode 164 with the minimum current level previously established for the system when the operator set rheostat control switch 199 (FIGS. 8 and 17c) and, when the comparator 274 determines that the current did not reach the desired minimum level in the short time delay set (cf., FIG. 19) by delay device TD-3, a second signal is presented at AND gate 272, thereby producing an output signal from the AND gate which serves to set a bond under current bistable flip-flop 275 (FIG. 17c) and to illuminate the bond under current indicating light 204.

Time delay devices TD-4 and TD-5 (FIG. 17c) are simply provided for monitoring specific functions of the system and to provide a visual indication for the operator when some irregularity is detected. To this end, time delay device TD-4 is a variable time delay which may be adjusted by the rheostat controlled switch 198 (FIGS. 8 and 17c) to set a minimum time period required to bond a battery post 148 of a given length, while time delay device TD-5 is a variable device which may be adjusted by the rheostat control switch 196 to set a maximum time period required to bond a battery post of a given length. The arrangement is such that if a battery post is, for example, too long, then under the fixed parameters set for the system by the operator, more time will be required for the melt cycle, and the electrode 164 will not reach its maximum penetration position until some time after device TD-5 times out. Consequently, by the time limit switch LS-1 (FIGS. 5, 15 and 17b) is actuated to indicate that the electrode is down, the delay device TD-5 will have already timed out, thus driving a bond long bistable flip-flop 276 to its set condition and illuminating indicator light 201 (FIGS. 8 and 17c) to indicate that the bond cycle took too much time, thereby indicating that the post 148 was probably too long or that some other fault had occurred to delay the operation. Similarly, if the battery post 148 is too short, the limit switch LS-1 (FIGS. 15 and 17b) will be closed too early in the cycle, thereby providing an input signal at AND gate 278 (FIG. 17c) which derives its second input signal from the time delay device TD-4. When both input signals are presented at the gate 278 (a condition that can only occur when the bonding cycle is completed too quickly and the electrode tip gets to a position of full penetration earlier than the time set for device TD-4), a signal is passed from the gate 278 to the set terminal of a bond short bistable flip-flop 279, thereby setting the latter and illuminating the bond short indicating light 202.

All of the foregoing fault conditions will create output signals that cause energization of the activating circuit for bond fault indicating lights 175 (FIGS. 5 and 17c) and 190 (FIGS. 8 and 17c) and, at the same time, will provide for the transmission of an error signal from the respective one of the bistable flip-flops 271, 275, 276, 279 (FIG. 17c) through amplifier 280 (FIG. 17b) and back to both the reset terminal of the bond flip-flop 266 (FIG. 17b) and the NAND gate 245 (FIG. 17a). Resetting of the bond flip-flop 266 serves to turn the system OFF, while the signal presented on the NAND gate 245 prevents initiation of a new bonding cycle until such time as the operator takes the necessary corrective action. To this end, when the operator ascertains the nature of the fault, he simply depresses one of the reset control switches—viz., either switch 176 (FIGS. 5 and 17c) or switch 199 (FIGS. 8 and 17c), thus resetting the particular one of the bistable flip-flops 271, 275, 276 or 279 which is set, and removing the signal theretofore provided at NAND gate 245

(FIG. 17a). The operator may then take whatever corrective action is required and initiate a new bonding cycle. It should be noted that, if desired, a resettable digital counter, generally indicated at 281 in FIG. 17c, may be provided in the bond fault indicating circuit to provide for continuous recording and/or display of the total number of reject bonds that have occurred.

Assuming, however, that the monitoring portion of the system does not detect the presence of a fault during the bonding cycle, then when the electrode 164 approaches its lowermost position of maximum penetration into the workpieces—viz., the position shown in FIG. 11d—the limit switch LS-1 (FIGS. 15 and 17b) will be closed by the actuator 215, thus presenting an input signal to a delay device TD-6 which may be adjusted by operator control of rheostat switch 194 (FIGS. 8, 17b and 19). The purpose of this delay device is simply to provide the short dwell period previously described during which current continues to flow through the electrode so as to heat saturate the molten lead and uniformly heat the surrounding unmelted lead components. When the device TD-6 times out, and as best indicated by reference to FIGS. 17b and 19 conjointly, a signal is passed from the device to the reset terminals of the bond ready and bond flip-flops 264, 266, resetting such flip flops, turning the bond on indicator light 174 OFF and opening the power switch (not shown) coupled to terminal 268. A signal is also transmitted to one of the input terminals for NAND gate 245 (FIG. 17a), thereby preventing initiation of another bonding cycle.

Finally, the signal emanating from delay device TD-6 is transmitted to the set terminal of a cool bistable flip-flop 282 (FIG. 17b), setting the latter and initiating a cooling cycle. When the flip-flop 282 is set, an energizing circuit is completed for the coil of a solenoid controlled valve V-5 (FIGS. 17b and 18), thus energizing the valve and completing a flow path from the pressure source through pressure regulator 283 and the valve V-5 to pressurize the upper ends of the piston/cylinder combinations 141, 142 (FIGS. 14 and 18). When this occurs, the base plate 130 (which is, of course, stationary due to the bottomed engagement between the ram assembly 146 and the battery connector 151) and the table 220 (FIG. 14) are urged apart, thus moving the table upwardly and retracting the ram 205 and electrode 164 so that the parts occupy the positions shown in FIG. 11e. At the same time, the output signal from delay device TD-6 is transmitted to the reset terminal for the float flip-flop 258, deactivating the energizing circuit for the solenoid controlled float valve V-4 (FIG. 17a) which serves to shift the valve back to its original position wherein the upper end of piston/cylinder combination 140 is connected to exhaust through flow control valve 261. When this occurs, pressure in the lower end of piston/cylinder combination 140 is restored to the float condition by application of pressure thereto through pressure regulator 287, a solenoid controlled valve V-6 (FIG. 18) and the double-acting quick exhaust valve 262.

In order to cause retraction of the ram assembly 146 (FIGS. 11e and 14) from the finished bonded connection 161 after a suitable cooling period, provision is made for clamping the table 220 in position so that the base plate 130 may be automatically moved upward in closing relationship with respect thereto upon the completion of the cooling cycle. To this end, when the cool flip-flop 282 (FIG. 17b) is set, a signal is passed through a delay device TD-7 to the set terminal of a clamp bistable flip-flop 284, setting the latter and transmitting an output signal to a delay device TD-8 which may be set by the operator to provide any desired delay period by suitable positioning of the rheostat control switch 195 (FIGS. 8 and 17b). Thus, the adjustable delay device TD-8, together with fixed delay device TD-7, determine the length of the cooling cycle.

At the same time that the output signal from delay device TD-7 (FIG. 17b) is applied to the set terminal of flip-flop 284, it is also applied to the reset terminal of the lock flip-flop 255 (FIG. 17a), thereby resetting the latter. Resetting of the flip-flop 255 serves to deactivate the solenoid controlled valve V-3 (FIGS. 17a and 18), thereby reversing the pressure conditions as applied to piston/cylinder combination 234 (FIG. 14) and shifting the slide 232 to the right as viewed in the figure to again block the upper ends of the bearing sleeves 230, 231 and to prevent passage of the pins 228, 229 therethrough.

When the clamp flip-flop 284 is driven to its set condition, energizing circuits are simultaneously completed for the coils of the two digital display counters 188, 189 (FIGS. 8 and 17b) to cause the same to step, thereby recording the completion of a successful bond cycle. As previously indicated, counter 188 may provide a continuous record of the total number of bonds while counter 189 may be reset to "zero" after selected time units such as the completion of a shift or the end of a day. At the same time, an energizing circuit is completed for the coil of a solenoid controlled valve V-7 (FIGS. 17b and 18), thereby energizing the latter and positioning the valve so as to couple the pressure source (not shown) through pressure regulator 254 and valve V-7 to the piston/cylinder combinations 241, 242 (FIG. 13), thereby clamping the shafts 242, 244 (FIGS. 13 and 14) and locking the table 220 to the plate 136 on subcarriage assembly 128.

Upon completion of the cooling cycle of operation—viz., when delay device TD-8 times out as best illustrated in FIGS. 17b and 18—a signal is transmitted from delay device TD-8 to the reset terminals for the cool flip-flop 282 (FIG. 17b) and the retract flip-flop 248 (FIG. 17a). When flip-flop 282 is driven to its reset state, an output signal is transmitted which serves to deactivate the energizing circuit for solenoid controlled valve V-5 (FIGS. 17b and 18), thereby shifting the valve back to its original position and removing the source of air pressure theretofore supplied to the upper ends of piston/cylinder combinations 141, 142 and which had served to shift the table 220 upwardly during retraction of electrode 164—i.e., movement of the electrode from the position shown in FIG. 11d to the condition shown in 11e. At the same time, the signal from delay device TD-8 is also applied to the reset terminal of the retract flip-flop 248, resetting the latter and completing an activating circuit for the energizing coil of the clamp-retract solenoid controlled valve V-2 (FIGS. 17a and 18). This serves to complete a flow path from the pressure source (not shown) through pressure regulator 285, valve V-2, and a double-acting quick exhaust valve 286, so as to pressurize the lower ends of piston/cylinder combinations 141, 142. As a result, the base plate 130 and table 220 (FIG. 14) are urged to close with respect to one another and, since the table 220 is locked to the sub-carriage assembly 128 by the pneumatically actuated clamps 240, 241 (FIG. 13) acting upon shafts 242, 244 (FIGS. 13, 14), the base plate 130 and ram assembly 146 carried thereby hop upwardly a few inches, thus removing the ram assembly 146 from the completed bond. Continued upward movement of the base plate 130 is prevented by engagement of the pins 228, 229 (FIG. 14) with the slide 232 which has now been returned to its blocking position (i.e., the slide 232 is moved to the right from the position shown in FIG. 14).

Driving of the retract flip-flop 248 to its reset state also serves to transmit a signal to delay device TD-9 (FIGS. 17*a*, 18) which provides a time delay sufficient to insure retraction of the ram assembly 146. Upon completion of that delay period, a signal is transmitted from delay device TD-9 to the reset terminal of the clamp flip-flop 284, resetting the latter and deactivating the energizing circuit for the coil of solenoid controlled valve V-7 (FIG. 17*b*), thereby reversing the high and low pressure sides of piston/cylinder combinations 240, 241 (FIG. 13) and releasing the clamp shafts 242, 244. Moreover, resetting of the clamp flip-flop 284 also serves to transmit a signal through a monostable flip-flop 286 (FIG. 17*b*) which is applied to the reset terminal of the brake flip-flop 246 (FIG. 17*a*), resetting the latter and deactivating the energizing circuit for the solenoid controlled valve V-1 (FIGS. 17*a* and 18), thus releasing the pneumatic clamps (not shown) which have served as brakes to prevent X- and/or Y-oriented movement of the bonding head 101 during a bonding cycle.

The bonding cycle is now complete, and the bonding head 101 is returned to its original float condition, thus permitting the operator to relocate the head over the next battery post/connector combination to be bonded and to initiate the next bonding cycle.

E-3. Manual Jog

As previously indicated, occurrences may arise when it is desirable or essential to effect rapid upward movement of the bonding head so as to clear the same from the area of the top of the battery. To accomplish this, and as illustrated in FIG. 18, the exemplary apparatus is provided with a pair of jog control switches 165 carried by the bonding head 101 (FIGS. 4 and 5). When one of these switches is depressed by the operator, one or the other of solenoid controlled valves V-8 or V-9 are actuated so as to position valves V-4 and V-6 in such a manner that a surge of pressure is applied to the lower end of piston/cylinder combination 140. When this occurs, an unbalanced condition is created which overcomes either the balanced float condition or the unbalanced bond force condition theretofore established, thus permitting easy and, substantially instantaneous, upward vertical movement of the bonding head 101.

F. Gas Flush System

Referring for the moment to FIG. 21, there has been illustrated a portion of a completed battery post/connector bond, generally indicated at 300, which depicts, in somewhat exaggerated manner, some of the problems that can occur when care is not taken by workmen engaged in either hand-burning and/or hand-torching operations and, moreover, which can occur even to some extent with apparatus and/or methods as heretofore described. Such bonds are defective from a number of standpoints and simply will not meet quality control standards common in the industry today. Thus, it will be noted that the bond 300 shown at the visible end of connector 151 is somewhat concave or saucer-shaped in configuration, as opposed to the desirable smooth, generally flat bond 161 shown by way of example in FIG. 5. Such concavity is due, in large part, to the natural shrink tendencies that are present when the molten lead cools and solidifies. It will further be noted that numerous cracks or fissures 301 and general crazing are clearly visible in the upper concave surface of the bond 300. Such cracks or fissures are believed to result from the effect of undesirable oxides present in the area of the bond or which have accumulated on the electrode itself, and/or to arcing conditions which result because of such oxidation. As indicated above, the use of a carbon-graphite electrode has tended to minimize the problem of oxidation which is so prevalent in the battery industry but, unfortunately, this has not provided a complete solution which can be relied upon to satisfy even the most rigorous quality control standards that might be set.

One of the principal reasons for dissatisfaction with the type of defective bond shown at 300 in FIG. 21 is the fact that when such bond is present on a battery post/connector combination disposed upon the top of a battery cover, the concavity will tend to serve as a well that will retain battery acid, thus tending to corrode the parts and to permit spillage of acid onto other components in the area, perhaps leading to a direct short. Moreover, when the crack or fissure 301 projects downwardly to a depth greater than the depth of bond penetration, a condition which commonly occurs in the peripheral region of the bond where the post and connector interface have been, the danger of leakers and/or electro-capillary action is even greater. And, of course, the condition is even more objectionable in those instances where the crack or crevice is so minute that it is overlooked during quality control inspections.

In order to illustrate the type of problems that can occur in the battery making industry when steps are not taken to minimize the effect of oxidation, a strip chart recorder was connected to the illustrative apparatus of the invention in such a manner as to provide a strip chart record of system power (in wattage) and electrode current (in amperage)—viz., the strip chart record corresponds to the data visually presented on the milliammeter 184 shown in FIG. 8. As here portrayed, the upper curve 302 in FIGS. 20*a* and 20*b* comprises a record of the power curve—i.e., the current that would be visible on milliammeter 184 when toggle switch 185 (FIG. 8) is in the up position—while the lower curve 304 comprises a record reflecting the amperage curve—i.e., the curve that would be visible on milliammeter 184 when toggle switch 185 is in the down position.

Assuming no arcing or other undesirable deviation, the amperage curve 304 should appear as a succession of hills and valleys, with each hill having a relatively sharp leading and trailing edge (i.e., when current to the electrode is turned ON and OFF respectively) connected by a relatively flat crest. The crest should be maintained relatively flat because of the computer monitoring functions which tend to continuously monitor and readjust the current as required. The power curve 302, on the other hand, will normally have some degree of chatter at the outset due to the extent of contact between the electrode and the lead post 148 (FIG. 11*d*). However, about midway through a normal bonding cycle when the electrode first begins to engage the connector 151 and then the bushing 149, molten lead will be rising in the reservoir and will begin to contact the electrode, thus decreasing the power required and, as the rising column of molten lead 214 begins to fill the reservoir surrounding the electrode, the power curve falls off quite sharply.

With the foregoing in mind, it will be observed that for the first three bonds formed, the power and current readings appear to be reasonably normal and well within the limits that would normally be set. However, it will be noted that at time T-21 the power curve 302 has begun to exhibit a deviation, generally indicated at 305. The particular reason for the deviation is not known, but it appeared as if a severe change in resistance had been encountered and corrected by the system computer. Such severe increase in resistance may have been due to a poor electrical contact between, for example, either the connector or bushing or the post and bushing, but, whatever the cause, sufficient lead was melted to permit the bonding operation to proceed.

Rather pronounced deviations 306, 308 appear in the power and amperage curves 302, 304, respectively, during bond number 5. In this instance, the deviations occur at about the midpoint of the bonding cycle—viz., between time T-26 and T-27—when the electrode would normally be about to contact the advancing annular column of molten lead 214 (FIG. 11c). It is not known whether there was actually a slight accumulation of oxides present on the electrode or, alternatively, whether oxides had accumulated on the surface of the molten lead pool, but in either event, mild arcing did occur which resulted in the deviations shown.

Bond numbers 6, 7 and 8 appear to be fairly normal, perhaps as a result of the electronic monitoring portions of the system which were trying to stabilize the bond cycle. However, very minor deviations are indicated at 309, 310 and 311 in the amperage curve 304 for bond numbers 6, 7 and 8 respectively.

By the time that the system was proceeding with bond number 9, the problems had become quite severe, indicating that progressive build-up of oxides had occurred. Thus, the power curve 302 portrays extensive chatter at the outset, and rather pronounced arcing occurred at time T-55 as indicated by deviation 312 in the power curve and deviation 314 in the amperage curve 304. Bond number 10 was progressively worse than the prior bonds, with severe arcing occurring at the beginning of the bonding cycle before a molten pool of lead had been formed, as indicated by deviations 315, 316 in the power and amperage curves 302, 304 respectively.

Bond number 11 continued to display severe arcing conditions as indicated by deviations 318, 319 in the power and amperage curves, although once again the system appeared to be trying to stabilize. By the time of bond number 12, the accumulated oxides had reached a point where mild arcing occurred at the outset of the bond cycle as indicated by deviations 320, 321 in the power and amperage curve and, by the midpoint of the bond cycle for bond number 12, the system had degenerated to a point where severe arcing was occurring as indicated by deviations 322, 324 in the power and amperage curves respectively.

Finally, during bond number 13, arching was so severe, as indicated by deviations 325, 326 in the two curves, that there resulted a cataspheric bond in which so much heat was generated by the arc that the lead connector was destroyed and the molten lead spued out from beneath the ram assembly over the top of the battery, thus requiring complete replacement not only of the lead components, but also of the electrode tip.

In accordance with one of the important aspects of the present invention, provision is made for continuously flushing the region where bonding takes place with an inert gas such, for example, as nitrogen, so as to minimize the effect of oxidants present and to entrain such oxidants and remove them from the region of the bond. To accomplish this, and as best illustrated in FIG. 16, the illustrative apparatus is provided with a gas inlet port, generally indicated at 328, which is coupled to a source of nitrogen (not shown). The gas supply line in the exemplary form of the invention is connected to a fitting 329 which is threaded into the upper end of the barrel assembly 209 and which communicates with a vertical bore 330 formed in the barrel 209. As here shown, the lower end of the supply bore 330 is coupled directly to a gas diffusion ring 331 which is positioned at the lower end of ceramimc sleeve 210 and interposed between the sleeve 210 and the insulator 212. The gas diffusion ring 331 is preferably formed of a phenolic material or any other suitable insulating material, and is provided with a series of peripherally disposed inlet ports 332 which permit of the introduction of a plurality of inert gas streams into the reservoir and towards the axis thereof.

For the purpose of positively withdrawing the gas introduced into the reservoir together with all contaminants entrained therein, a suitable vacuum type extractor (not shown) is coupled to an exhaust manifold 334 which is positioned to surround aligned radial bores 335, 336 formed in the lower ends of the barrel 209 and ceramic sleeve 210 respectively. The arrangement is such that inert nitrogen gas is continuously supplied to the reservoir through the gas diffusion ring 331 so as to neutralize and entrain oxidants and other contaminants present in the region of the bond which are then removed from the area of the bond by the extractor through the ports 335, 336 and the manifold 334.

G. Use of Reducing Agents to Minimize Oxidation

In an effort to further minimize the effect of oxidation, an important aspect of the present invention involves the application of a suitable reducing agent or flux 338 (FIGS. 11a and 11b) to the parts to be bonded. Such agents have been found to have a marked effect on the cosmetic appearance of the bond and, this is believed to result from the fact that the flux acts as a surfactant, thereby enhancing the surface tension of the molten lead. Severe limitations are present when selecting materials to be used as a reducing agent in battery bonding operations because many of such materials are known to be incompatible with the electrolytic acid present in, or to be added to, the battery. It has been found, however, that excellent results are achieved when utilizing pitch (a common asphalt based, bituminous battery sealing compound) as a flux. Indeed, experiments have shown that the use of pitch as a reducing agent in a positive displacement bonding system utilized in the formation of lead-to-lead bonds in the battery industry has resulted in substantially complete release of contaminants present, thereby creating a substantially uninterrupted, smooth lead surface in the finished bond.

In accordance with another important aspect of the present invention, an improved salt-based reducing agent has been developed and utilized with the positive displacement bonding system herein described and which finds excellent results even in the battery making industry where salts have heretofore generally been considered to be incompatible with lead-acid batteries. Thus, in the aforementioned application of Bruzas and Coville, Ser. No. 435,156, filed Jan. 21, 1974 and assigned to the assignee of the present invention, there has been disclosed a method of positive displacement bonding of lead-acid batteries which utilizes a conventional chloride-salt as a flux even though such salts have heretofore been thought to be incompatible with the battery components. It is there suggested that the reason for this is that the action of the advancing ram 164 as it penetrates into the workpieces and the heating and/or converting of lead to a molten state occurs so rapidly and uniformly that the salt flux 338 simply does not have an opportunity to penetrate into the internal portions of the battery through the interfaces between the lead components.

In carrying out this aspect of the invention, an improved bromide-salt compound has been developed which has proven to be even more effective in combining with and neutralizing oxidants than other materials heretofore used, including conventional chloride-salts. Thus, it has been found that a blend of 10% hydrazine monohydrobromide and 90% petroleum jelly produces truly improved results when compared with chloride-salts—this despite the fact that the salt content of the resulting compound is substantially less with such bromide-salt fluxes—viz., approximately 10% of a bromide salt is present as contrasted with chloride-salts comprising on the order of 16% of the flux compound.

Considerable difficulty was experienced when attempting to introduce the hydrazine monohydrobromide into the petroleum jelly. Thus, efforts to make a slurry of the salt with a solution comprising 50% salt, 25% water and 25% alcohol proved unacceptable since the resultant slurry would not blend with the petroleum jelly. It has, however, been found that excellent results can be obtained, and an effective fluxing agent produced, by grinding the hydrazine monohydrobromide compound and then mechanically blending the ground salt and the petroleum jelly in proportions of 10% and 90% respectively to form a relatively uniform mixture. It is further believed that the use of this improved reducing agent for the purpose of making lead-to-lead bonds in the lead-acid battery making industry will, in many applications, make it unnecessary to utilize gas flushing systems of the type heretofore described, although extraction systems are still desirable for the purpose of removing the noxious fumes produced by the fluxing agent during bonding cycles.

H. Improved Shaped Electrode

It has been found that an electrode in a positive displacement bonding system will produce structurally and electrically sound bonds despite a wide range of variations in the particular shape of the electrode face. For example, structurally and electrically sound bonds have been produced when utilizing electrodes having a generally flat end surface which engages the workpiece to be melted during a casting or bonding operation. However, referring for the moment to FIG. 21, it will be noted that the defective bond 300 there illustrated includes a plurality of irregular, upstanding peripheral projections, generally indicated at 339, which are commonly known in the art as cold collars. It has been found that cold collars commonly occur when the apparatus used during the bonding cycle employs a flat-ended electrode, probably as a result of the tendency of the molten lead to adhere to the electrode during retraction thereof, as well as due to the inherent shrink characteristics of the lead. Such cold collars are highly objectionable because the appearance of the finished bond 300 (FIG. 12) simply does not begin to compare with the relatively smooth flat bonds 76 (FIG. 2) heretofore obtainable with conventional hand-burning and/or hand-torching techniques.

Accordingly, provision has been made for shaping the electrode 164 so as to insure that relatively smooth, flat bonds (such as the bond 161 depicted in FIGS. 5 and 22) are obtained in virtually every lead-to-lead bonding operation. To accomplish this, and as best illustrated in FIGS. 11a – 11d and FIG. 16, the electrode 164 is preferably formed with an annular downwardly depending ring 340 which is co-axial with the electrode. Preferably, the ring is dimensioned to have a median diameter approximately equal to that of the upstanding flange 155 on the bushing 149 to be bonded (FIG. 10), thereby insuring that the ring 340 will engage and penetrate substantially into the entire periphery of the bushing flange 155. Moreover, it has been found that the provision of the annular ring 340 on the tip of the electrode 164 serves to reduce the total amount of lead that has to be converted to the molten state in order to achieve a satisfactory bond and, additionally, the change in the shape of the electrode serves to improve the shrink characteristics of the molten lead, thereby insuring that all bonds created meet even the most rigorous standards from a cosmetic standpoint, and are substantially devoid of cold collars, pits, crevices and the like.

I. Cooling and Power Supply Systems

In order to couple the power supply (not shown) for the electrode 164 to the ram 205 and, as best illustrated by reference to FIGS. 13 and 15 conjointly, a pair of tubular conduits 341, 342 are provided which are respectively secured at their lower ends to bracket 226 and base plate 130 of the bonding head 101. The upper ends of the conduits 341, 342 (which are preferably made of stainless steel or other self-supporting material) pass upwardly through openings 344 formed in plate 136 on sub-carriage assembly 128, with the upwardly projecting portions of the tubes passing through and being engaged by a series of guide rollers 345. The arrangement is such that as the ram assembly 146 and, therefore, bracket 226 and base plate 130, move up and down in a Z-oriented direction, the tubes 341, 342 also move up and down between the guide rollers 345.

In carrying out this aspect of the invention, the power supply cables (not shown)—which normally comprise limp, hollow rubber tubing containing the copper conductors—are fed downwardly through the tubes 341, 342. The cable passing through tube 341 is electrically connected to the bracket 226 and is, therefore, electrically connected to the ram 205 to which bracket 226 is welded. Similarly, the power cable passing downwardly through tube 342 is electrically connected directly to a flange 346 (best illustrated in FIG. 16) which is integral with the barrel 209.

In order to provide suitable cooling for an overall positive displacement bonding system of the type herein disclosed, including cooling of the power cables which pass through the tubes 341, 342, a continuous circulatory coolant fluid system is provided. To this end, and as best illustrated by reference to FIGS. 15 and 16 conjointly, it will be observed that a coolant fluid inlet conduit 350 is disposed within tube 341 and is coupled at its lower end to a horizontal bore 351 formed in bracket 226. The inboard end of bore 351 is, in turn, coupled to the upper end of one leg of a vertically disposed U-shaped cooling bore 352 formed in the ram 205, with the upper end of the other leg of the U-shaped bore 352 being coupled to a second transverse bore 354 formed in bracket 226. The coolant fluid for the system is then fed through a fitting 355 into a flexible conduit 356 having its opposite end connected to a similar fitting 358 on a manifold 359 mounted on the bottom of base plate 130. A coolant tube 360 passes from the manifold 359 around the flange portion 346 of barrel 209 so as to provide for cooling of the upper end of the barrel. The opposite end of the conduit 360 is connected back to the manifold 359 and, from there, to a coolant fluid outlet conduit 361 passing upwarly through tube 342. Thus, coolant fluid fed through the inlet conduit 350 (FIG. 16) first serves to cool the power cable in tube 341. The coolant then passes through the ram 205 for the purpose of cooling the upper end of the ram and, from there, to the conduit 360 surrounding the upper end of the barrel 209 so as to insure cooling of the upper end of the barrel. Finally, the continuously circulating coolant is then returned upwardly through conduit 361 disposed within the tube 342, thereby serving to cool the power cable contained therein.

In some instances, it may be desirable to circulate coolant fluid to other portions of the system. To enable this, and as best illustrated in FIG. 15, a second fitting 362 is provided on the lower surface of manifold 359.

J. Two-Stage Positive Displacement Bonding

To this point, the positive displacement bonding system of the present invention has been described in connection with the formation of a fusion bonded connection between three battery components—viz., a battery post 148, a bushing 149, and an intercell connector 151—in a single bonding operation. There are, however, some instances where it is desirable to form such a bond in two separate stages. For example, when assembling individual cells 51 (FIG. 22) to form a battery, one will commonly bond intercell connectors 151 to the posts 148 and bushings 149 so as to couple the positive posts of one cell to the negative posts of an adjacent cell, thus producing bonds of the type shown at 161. However, in a typical battery assembly process, not all of the battery posts will be bonded to intercell connectors since the final connections may vary somewhat dependent upon the particular specifications of the customer. Consequently, it is sometimes desirable to effect a bond such as indicated generally at 400 in FIG. 22, wherein the components bonded together comprise only a bushing 149 and a battery post 148 as more clearly illustrated at 401 in FIG. 22. When forming this type of a bond—viz., one not including an intercell connector 151—less lead is required and, consequently, the upwardly projecting portion of the battery post 148 may be cut off by suitable lead snips or the like.

Figures 22, 23:
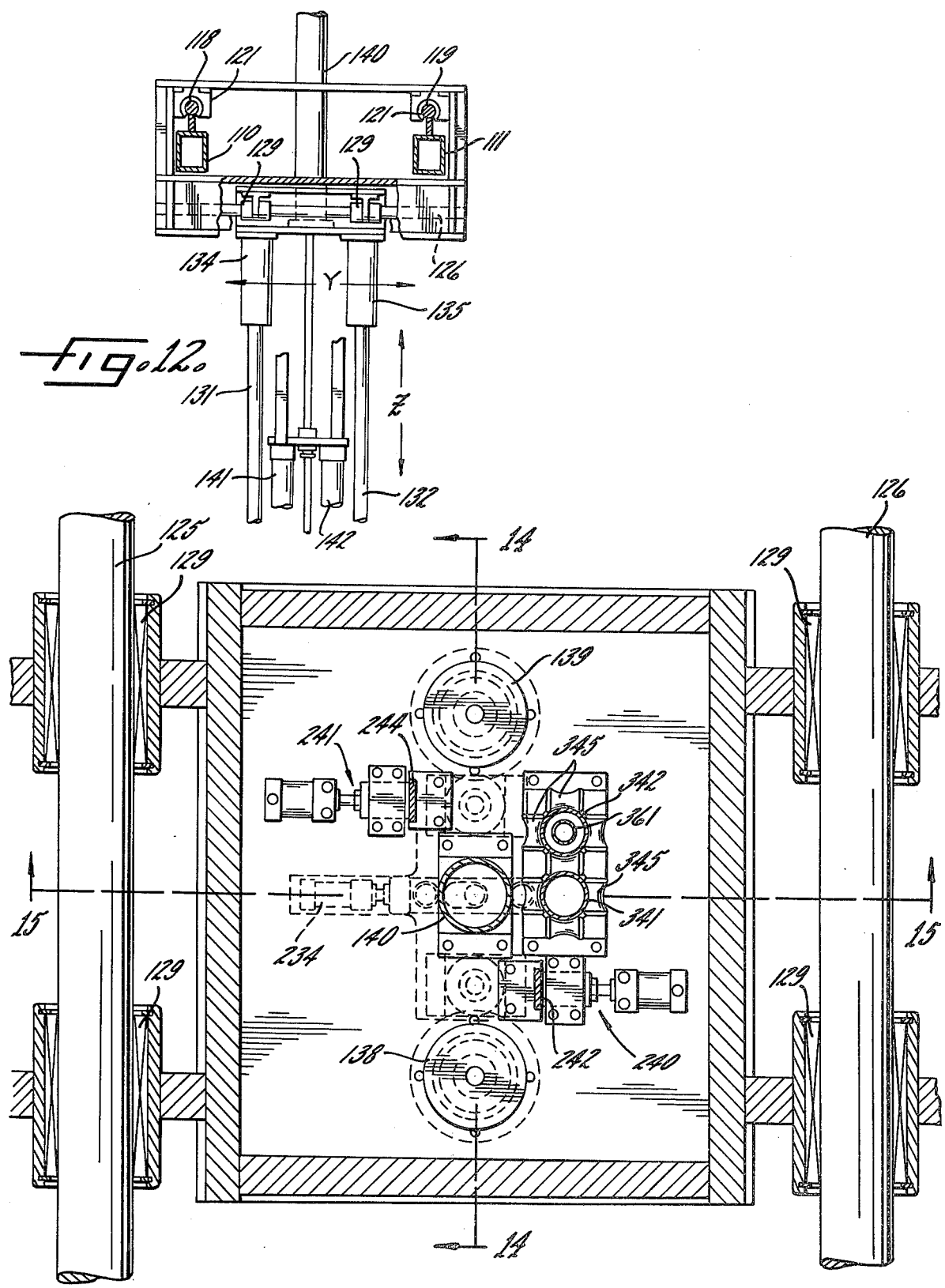
FIG. 22 is a fragmentary perspective view of a portion of a battery, here depicting, in both the bonded and unbonded states, battery post/bushing combinations both with and without intercell connectors.
FIG. 23 is a vertical sectional view, here illustrating an adapter mounted on the lower end of a positive displacement bonding apparatus embodying the features of the present invention; the adapter enabling the formation of a bond in accordance with the invention between a battery post and bushing in the absence of an intercell connector.

In carrying out this aspect of the invention, provision is made for readily converting an exemplary bonding head 101 (FIGS. 14-16) of the type heretofore described, so that it may be utilized to form a bond of a type shown at 400 in FIG. 22. To accomplish this, an adaptor assembly, generally indicated at 402 (FIG. 23), has been provided for mounting on the lower end of the ram assembly 146. To this end, the adapter assembly 402 comprises a generally annular or cylindrical housing member 404, preferably made of beryllium-copper and having its lower end 405 shaped in the form of a truncated cone with a vertical opening 406 extending co-axially therethrough to provide a space which will accept and receive the upwardly projecting portion of the battery post 148 and the flange 155 formed on bushing 149. In order to provide continuity of insulating linear material, the lower end of the adaptor assembly 402 is shaped to receive a generally cylindrical insulator 408, which may be made of phenolic insulating material or the like. The upper surface of the insulator 408 is provided with an upwardly projecting annular lip 409 that is dimensioned to be snuggly received within the lower extremity of insulator 212.

In order to provide for releasable mounting of the adaptor on the lower extremity of the ram assembly 146, the annular member 404 is provided with an internal diameter which is slightly larger than the external diameter of the barrel 209, thus permitting the adaptor assembly 402 to be slipped on the lower end of the ram assembly with the latter projecting downwardly and bottomed on a radial shoulder 410 formed on the floor of the adaptor. The upstanding annular wall portion of the member 404 is provided with a plurality of co-axially extending radial slots 411, and a recessed annular chamber 412 is machined in the outer surface of the member 404. The arrangement is such that a conventional clamping ring 414 adapted to be tightened by a screw threaded fastener 415 can be positioned within the channel 412 and, when the adaptor assembly 402 is properly seated on the lower end of the ram assembly 146, tightening of the screw threaded fastener 415 permits the beryllium-copper wall 404 to be deformed into clamped engagement with the ram assembly, thus securely locking the two parts together. In order to insure adequate cooling of the adaptor assembly 402 and to assist in cooling the molten lead following a bonding operation, a continuous cooling conduit 416 is positioned within an annular groove 418 formed in the lower end of the adaptor assembly 402, which conduit 416 may be connected to the fitting 362 shown at the bottom of manifold 359 (FIG. 15).

When utilizinig an adaptor assembly of the type shown in FIG. 23, it will be observed that the lower end of the ram assembly 146 is actualy raised above the top of the bushing by a considerable distance as compared with, for example, FIG. 11b where no adaptor is used. Because of this, provision must be made for adjusting the ram and electrode assembly so as to insure complete and adeqate penetration of the electrode through the post and into the flange 155 on the bushing. This could, of course, be accomplished by manual adjustment of the thumbwheel screw 224 previously described and shown in FIG. 14. However, the same result can be achieved by simply removing the electrode 164 (FIG. 16) from the lower end of the adaptor 208 and substituting therefor a modified electrode 419 (FIG. 23) having a longer shank portion dimensioned to accommodate for the difference in the efffective length of the ram assembly 146 resulting from the addition of the adaptor assembly 402. Moreover, since the bond 400 shown by way of example in FIG. 22 will ultimately have some type of intercell connector or other terminal bonded thereto, it is not necessary that the finished bond 400 have a cosmetically clean and smooth surface. Consequently, the modified electrode 419 may have a flat end surface as indicated at 420 and, any cold collars that might be formed in the bond 400 will be remelted when the bonded post/bushing combination is subsequently bonded during a second bonding operation to an intercell connector or the like, simply by utilizing apparatus during the second bonding operation having a shaped electrode such as the electrode 164 (FIG. 16).

Thus, it will be appreciated that the modifications shown by way of example in FIG. 23, permit the operator to quickly and easily convert the apparatus of FIG. 16 for completing a structurally and electrically sound bond 400 between just a battery post 148 and bushing 149.

Referring to FIG. 25, there has been illustrated an exemplary system for permitting the subsequent bonding of an intercell connector 151 to a completed battery post/bushing bond 400 of the type shown in FIG. 22. To accomplish this, it is merely necessary for the operator to remove the adaptor assembly 402 (FIG. 23) from the lower end of the ram assembly 146 and replace the electrodes 419 (FIG. 23) with the conventional shaped electrode 164 depicted in FIG. 16. In order to provide the necessary lead to fill the cavity within the opening in the connector, a slug of lead 421 is positioned on the bond 400 prior to the locating and clamping cycles previously described for the ram assembly 146. Of course, in some instances the upper portion of the battery post 148 (FIGS. 22 and 23) may not have been cut-off prior to forming the bond 400, in which event the bond 400 will have a substantially greater height than shown in FIG. 25 and no lead slug 421 will be required. Once the lead slug 421 is positioned, assuming such slug is required, the operator will then initiate the conventional locating, clamping, bonding, cooling and retracting cycles heretofore described and, when the shaped electrode 164 moves downwardly it will serve to melt the lead slug 421, the inner peripheral edge 154 of flange 159 on the connector 151, the upper surface of the first stage bond 400, and the upper end of the flange portion 155 of the bushing 149 in the same manner as heretofore described. The molten lead thus formed will be displaced upwardly into the reservoir defining means surrounding the electrode 164. When the electrode 164 is retracted, the molten lead will return to the cavity formed in the workpieces, cool and solidify, thus forming a bond identical to the bond 161 shown in FIG. 22.

K. Improved Method for Rapid Formation of Successive Post/Bushing Bonds

Occasionally it is necessary for the operator to form a multiplicity of battery post/bushing bonds of the type shown at 400 in FIG. 22 in rapid and successive order—for example, on a large industrial motive-power battery or on a series of such batteries. Where speed is a factor, it is desirable that the operator be able to accomplish this without having to make substantial changes to the existing apparatus and/or without having to provide a positive coolant system for the adaptors being utilized.

In accordance with another of the important aspects of the invention, and as best illustrated by reference to FIGS. 24a through 24d conjointly, there has been illustrated a simplified system which permits of manual manipulation of multiple adapters similar to the adapter assembly shown at 402 in FIG. 23. To enable a better understanding of the manipulative process to be hereinafter described, let it be assumed that the operator has four adjacent battery post/bushing combinations, generally indicated at 425 (FIG. 24a), 426 (FIG. 24b), 427 (FIG. 24c), and 428 (FIG. 24d), as to each of which he wishes to form a bond of the type shown at 400 in FIG. 22. Such post/bushing combinations 425, 426, 427 and 428 may, of course, be on a single battery or on successive batteries located on one of the conveyors 104, 105 shown in FIGS. 6 and 7. To carry out the novel manipulative process, the operator need merely position two identical adapters 429A (FIG. 24b) and 429B (FIG. 24c) about two different ones of the four post/bushing combinations to be bonded. Preferably the adapters 429A, 429B are similar to the adapter assembly 420 previously described in connection with FIG. 23 although, as the ensuing description proceeds, it will become apparent that they do not require the use of either a clamping mechanism or a separate positive coolant system.

As here shown, the first post/bushing combination 425 (FIG. 24a) has already been bonded in the manner previously described to form a finished bond 400. Similarly, the second post/bushing combination 426 (FIG. 24b) has also gone through a complete bonding cycle, with the bonded connection 400 thus formed still disposed within the lower end of adapter 429A.

The operator is now ready to initiate a bonding cycle for the third post/bushing combination 427 (FIG. 24c) and, to this end, he has positioned the adapter 429B about the post/bushing combination 427 and located the bonding head in a properly oriented and clamped position suitable for effecting the third post/bushing bond. Thus, it will be noted that the ram assembly 146 has been moved into the bore of the adapter 429B in readiness to initiate the third bonding cycle. During this third bonding cycle, adapter 429A may be left on the second bonded connection for post/bushing combination 426 (FIG. 24b) where the heat generated in the adapter 429A during the second bonding operation is allowed to dissipate. Just prior to the time that the operator completes the third bond for the post/bushing combination 427 (FIG. 24c), he will simply remove the adapter 429A from the position shown in FIG. 24b, and manually shift it to the position indicated in phantom lines in FIG. 24d. Thus, he can now move the ram assembly 146 from the third battery post/bushing combination 427 (FIG. 24c) to the fourth battery post/bushing combination 428 (FIG. 24d) where the ram assembly 146 will be inserted into adapter 429A. While the fourth bonding cycle is continuing, the heat stored in adapter 429B (FIG. 24c) will be dissipated, thereby enabling the operator to manually shift the adapter 429B to the fifth post/bushing combination (not shown) upon completion of the fourth bonding cycle.

L. Improved Post/Connector Bonds

It will be appreciated from the foregoing description, that positive displacement bonding methods and apparatus embodying the features of the present invention are particularly suitable for use in forming lead-to-lead bonds in the area of the connection between a conventional battery post and an intercell connector. Moreover, because of the complete uniformity of the bonding procedure, and the low heat levels generated, it is possible to form such connections in the covers of industrial motive-power batteries, thus permitting such covers to be formed of lightweight plastic materials having relatively low melting points.

In accordance with one of the important aspects of the invention, there are illustrated in FIGS. 26 through 30 various battery post/intercell connections wherein the connection passes through a plastic battery cover and where a positive seal is effected between the various interfaces without having to utilize a lead bushing or other insert molded into the plastic cover. To this end, and referring first to FIG. 26, it will be observed that the plastic cover 475 is provided with a vertical opening 476 through which a conventional battery post 478 is passed. The lower end of the cover 475 is provided with an annular groove 479 in which is seated an O-ring seal 480. An intercell connector 151 (which may be identical with connector 151 shown in FIG. 9) is positioned in surrounding relationship to the battery post 478 and seated on an annular upraised ridge 481 molded integrally in the plastic cover.

The arrangement is such that when a positive displacement bonding system embodying the features of the present invention is properly located about the battery post 478 and with respect to the locating collar 159 on connector 151, the weight of the bonding head will be supported by the post/connector combination, thus placing the O-ring seal under compression and 475 and the battery post 478. Moreover, when the bonding electrode is advanced into the workpieces to melt and displace the upwardly projecting part of the post 478 and the upper internal periphery of the connector locating collar 159, the molten lead thus formed will be displaced in the manner previously described and, when the electrode is retracted, such molten lead will be returned to the cavity within the connector 151 to form a uniform fusion bond between the battery post 478 and connector 151, thus insuring that the O-ring seal 480 is maintained under compression in the finished bond.

Referring to FIG. 27, there has been illustrated a slightly modified plastic cover/battery post/connector assembly similar to that shown in FIG. 26. Because of the similarity of parts, those that are identical in the two figures are referred to by the same reference numbers. As here shown, the plastic cover 482 is provided with a frustoconical recess 484 in its upper surface surrounding the battery post 478. Positioned within the recess 484 is a complementary frustoconical lead collar 485 which serves to support the intercell connector 151. Once again, when the parts are assembled and the bonding head properly located with respect to the locating collar 159 on connector 151, the O-ring seal 480 will be placed under compression prior to the time that the bonding operation is initiated. However, in this instance, because of the provision of the lead collar 485 which projects downwardly beneath the upper plane of the plastic casing 482, it is possible to achieve a finished bond in which the depth of bond penetration is considerably greater than that shown in FIG. 26.

Yet another modified post connector assembly has been illustrated in FIG. 28. In this case, the intercell connector 486 has been somewhat modified to provide a lower profile than the connectors previously described. In addition, the connector 486 is here shown as having an integral frustoconical portion 488 adapted to be positioned in the frustoconical recess 484 formed in cover 482.

Turning next to FIG. 29, a still further variation has been illustrated which, in this instance, provides for the inclusion of a pair of vertically spaced O-ring seals 480 to further insure the creation of a positive seal between the battery post/plastic cover interface. As here shown, the plastic casing 488 is provided with an annular groove 489 on its upper surface in addition to the annular groove 479 at its lower surface—both grooves being co-axial with the vertical bore 476 passing through the cover. An O-ring seal 480 is positioned in both the groove 479 and the groove 489 and, as a result of this construction, both O-ring seals 480 will be placed under compression during the bonding operation, thereby providing an effective post/cover seal.

A still further arrangement has been depicted in FIG. 30 for providing an effective seal in a battery post/connector assembly passing through the plastic cover of a motive-power battery wherein no lead bushing is required. As here shown, an intercell connector 490 is provided with a counter bore 491 in its lower surface adapted to receive an upstanding flange portion 492 integral with a lead collar or disk 494. Preferably, the collar 494 is positioned to sit on top of the upper O-ring seal 480 disposed in cover groove 489 and project outwardly over the top of the plastic cover 488. Thus, when the bonding head is activated, both the upper and lower O-ring seals are placed under compression and the electrode is then advanced a sufficient depth to provide an integral fusion bond between the battery post 478, connector 490 and collar 494.

Referring next to FIG. 31, there is illustrated yet another type of battery post/intercell connector combination employing an O-ring seal. In this instance, however, the assembly is substantially identical to the assembly shown in FIG. 10, differing therefrom primarily in that the lead bushing 495 passes entirely through a plastic cover 496. Moreover, the bushing 495 is provided with an annular groove 498 at its innermost end and an O-ring seal 480 is positioned within the groove 498 in sealing engagement between the battery post 478 and the bushing 495. Once again, such O-ring seal will be placed under compression prior to actual initiation of a bonding cycle, and maintained in its compressed state by the resulting fusion bonded components.

It will be appreciated from the foregoing that positive displacement bonding methods and apparatus have been described which not only are capable of forming structurally and electrically sound bonds between two or more parts, but, moveover, which are also highly suitable for use in forming intercell and terminal connections in industrial motive-power and automotive batteries having lightweight covers and containers formed of plastic materials with relatively low melting points. Moreover, because of the very nature of the bonding process, it is possible to simultaneously provide positive seals at either the interface between the battery post and the plastic cover or the interface between the post and bushing utilizing only the forces applied by the equipment during the bonding operation to effect such seals, thereby further eliminating the possibility of leakers and/or electro-capillary action irrespective of whether the bonded connection includes or fails to include a bushing or other insert.

M. Internal Battery Intercell Connections Through Cell Partitions

Thus far, the present invention has been described in connection with the formation of electrically and structurally sound molecular fusion bonds particularly suited for forming intercell connections passing through the covers of industrial motive-power batteries and the like, thereby providing a number of desirable manufacturing advantages including, inter alia, the ability to use lightweight plastic materials for the formation of industrial motive-power battery covers through which the bonded connections pass. However, it should be understood that the present invention is not limited to effecting intercell connections passing through a battery cover and located generally externally of the battery, nor is the invention limited to use in making industrial motive-power batteries. To the contrary, the present invention may also be used to form intercell connections internally of a battery casing and passing through relatively thin-wall partitions formed of plastic or the like which separate adjacent cells, as well as terminal connections which pass through either the external wall or the cover. Those skilled in the battery making art will understand that it is common practice to form containers and/or intercellular partitions in, for example, automotive batteries or the like, of plastic or other types of sheet material having a thickness of approximately 0.060 inch at the thinnest sections to approximately 0.090 inch to 0.100 inches at the thickest portion and, it is in this sense that the phrase relatively thin-wall partitions has been used herein. Moreover, it will also be understood that the terms wall, partition, and/or thin-wall partition as used herein are not intended to be used in a limiting sense, but, rather, such terms have been used in their broadest sense and each are intended to embrace a battery cover, wall, intercell partition, and/or container.

In keeping with this aspect of the present invention, reference is made to FIG. 32 where there has been illustrated a modified type of battery strap 500 to which a second strap 501 having an integral group of battery plates 502 of like polarity may be welded. As best illustrated by reference to FIGS. 32 and 33 conjointly, it will be noted that the battery strap 500 is provided with a cylindrical, laterally projecting, connector member 503 designed to pass through a gasket 504 positioned within an opening 505 formed in a relatively thin-wall intercell partition 506. The partition can be made of any suitable material such, for example, as plastic. The connector member 503 is provided with a raised locating collar 508 at the end remote from the partition 506, and includes a slightly tapered bore 509 projecting coaxially from its opposite end at least partially through the connector.

Figure 33:
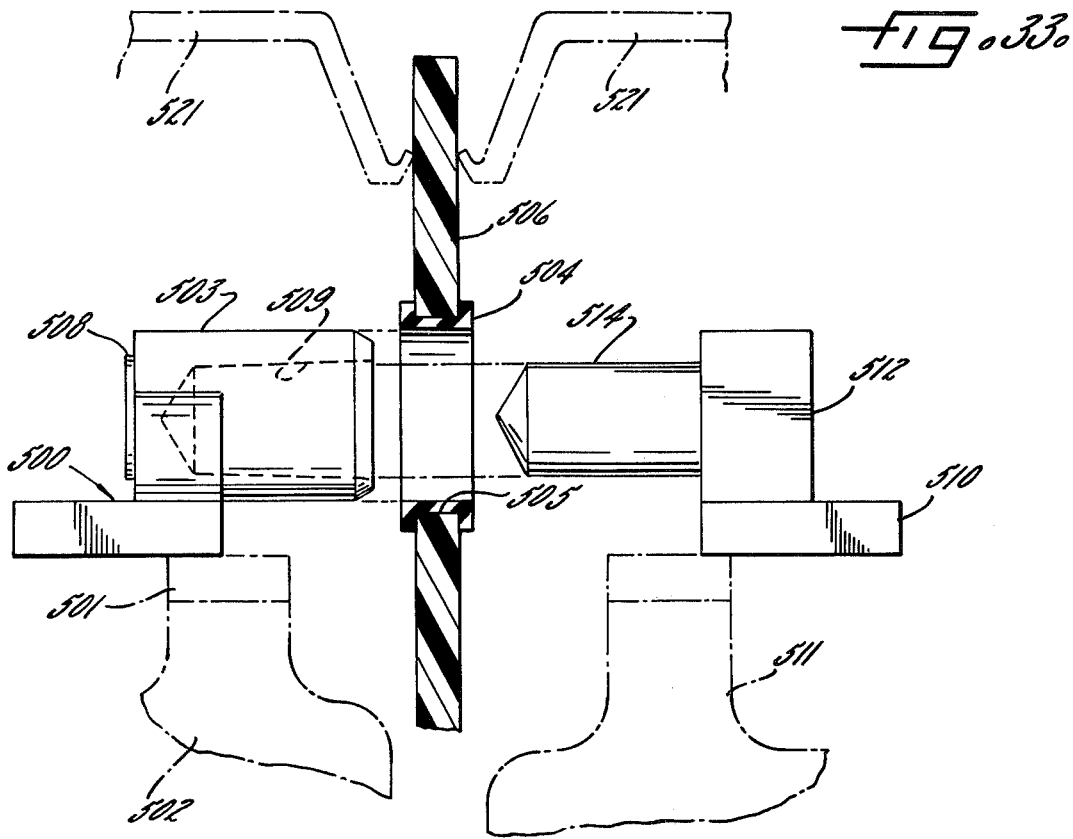
FIG. 33 is an exploded fragmentary sectional view here illustrating one possible arrangement of parts for effecting an intercell connection through a cell partition internally of the battery casing.

A similar battery strap 510 (to which a group of battery plates of opposite polarity may be bonded—viz., plates 511 shown in FIG. 33), is positioned within the adjacent cell on the opposite side of the thin-wall partition 506 in overlying relation to the plates 511. In this case, the battery strap 510 is provided with a connector member 512 having a projecting cylindrical bayonet-type lug 514 adapted to be received within the tapered bore 509 in connector member 503. Preferably, the bayonet-type lug 514 on connector member 512 is cylindrical and has a diameter somewhat larger than the minimum diameter of the tapered bore 509 in connector member 503.

When assembling the parts as shown in FIG. 33, the connector member 503 is first passed through the gasket 504. At this point, the bayonet-type lug 514 on connector member 512 is positioned within the tapered bore 509 of connector member 503, and the two connector members are then urged together to force the lead bayonet-type lug 514 to fully seat in the bore 509 of connector member 503, thus tending to expand the soft lead wall of the member 503 into intimate sealing engagement with the sealing gasket 504 and placing the gasket under compression between the thin-wall partition 506 and the connector member 503.

Figure 34:
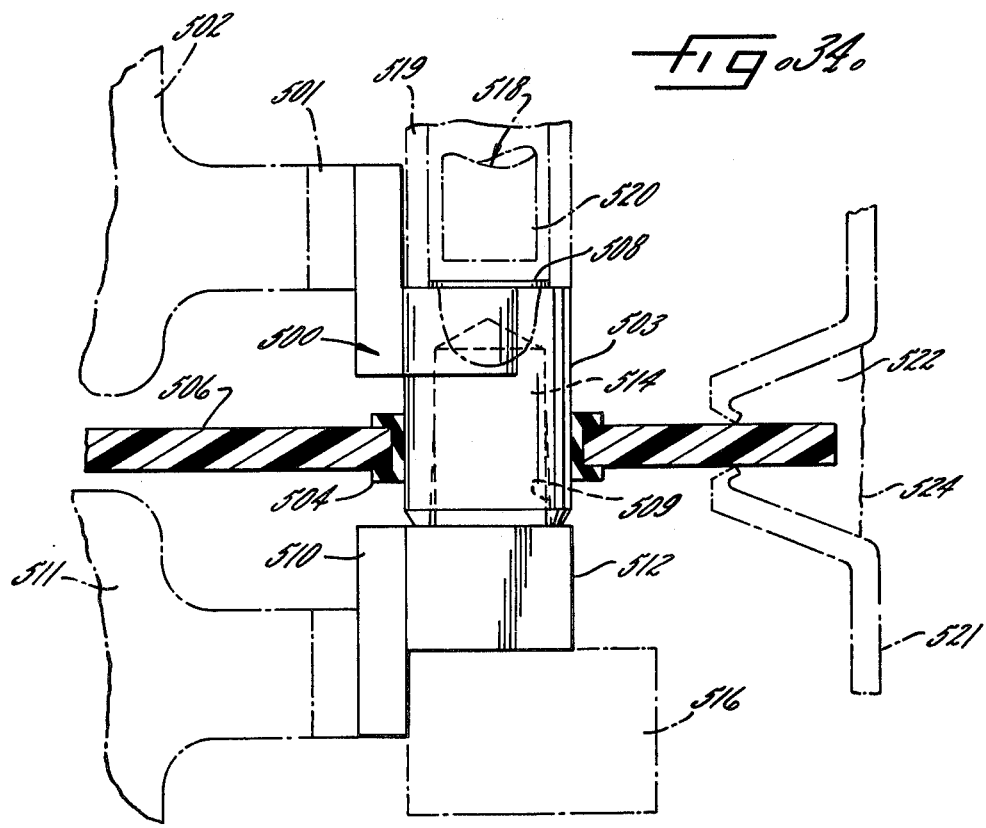
FIG. 34 is a fragmentary sectional view illustrating the components of FIG. 33 partially bonded together with the positive displacement bonding technique of the present invention.

In carrying out the present invention, the assembled parts shown in FIG. 33 are preferably turned through an angle of 90°, as best illustrated in FIG. 34. The connector member 512 is then seated on a stationary compression member illustrated in phantom at 516, and a positive displacement bonding head having a ram assembly, generally indicated in phantom at 518, is positioned with its barrel 519 properly located about the locating collar 508 formed on connector member 503. The electrode 520 in the ram assembly 518 is then advanced axially through the barrel 519 and into the connector member 503 so as to melt and displace the portions of lead with which the electrode 520 comes in contact. The electrode 520 is advanced a sufficient distance to penetrate substantially into the bayonet-type lug 514 in connector member 512, thus melting the projecting tip of the lug and displacing the molten lead formed. Thereafter, the electrode 520 may be retracted in the manner previously described and the molten lead will return to the cavity formed in the telescoped parts 503, 514 where it can cool and solidify to form an electrically and structurally sound intercell connection passing through the thin-wall partition 506. It will, of course, be appreciated that the barrel 519 of the ram assembly 518 and the compression member 516 may, if desired, be interconnected by a conventional scissors-type linkage (not shown) so as to provide the necessary force to urge the connector components 503, 512 into telescoping relationship with respect to one another.

Once the bond has been completed in the manner described above, the battery casing may be turned to its upright position, the straps 500, 510 may be bonded to the underlying groups of plates (e.g., the strap 500 may be bonded to strap 501), and a suitable cover may be applied to the battery casing, for example, as indicated in phantom at 521 in FIGS. 33 and 34. It will, of course, be understood that when the individual cell covers are applied to the respective cells, the partitions 506 will project upwardly therebetween, thus defining a generally W-shaped trough 522. Such trough is commonly filled with a conventional bituminous battery sealing compound 524 (FIG. 34).

When an intercell or terminal connection of the type illustrated in FIGS. 32 – 34 is formed on smaller batteries such, for example, as an automotive battery, the telescoping parts of the connector members will, of course, be considerably smaller. Moreover, in many instances, particularly in automotive batteries, the gasket 504 will not be required and a suitable seal can be effected simply by expanding the soft lead wall of the member 503 into intimate sealing engagement with the thin-wall member such as partition 506.

Slightly modified types of intercell connections for use internally of a battery in combination with a thin-wall partition separating adjacent cells are shown by way of example in FIGS. 35 through 37 inclusive. Referring first to FIG. 35, it will be observed that the connector member 525 associated with the battery strap for one group of battery plates (not shown) is seated on a compression member shown in phantom at 516, and is provided with an upstanding projecting portion 526 adapted to pass through the opening 505 in a thin-wall intercell partition 506. In this case, an O-ring seal 528 is interposed between the thin-wall partition 506 and a shoulder portion 529 on the connector member 525. A second connector member 530 associated with the battery strap for a group of battery plates in the adjacent cell has a generally planar face in direct engagement with both the raised projection 526 on member 525 and with the thin-wall cell partition 506. The connector member 530 is further provided with a locating shoulder or collar 531 which serves to locate the end of the barrel 519 associated with a ram assembly 518. In this case, the ram 520 is advanced entirely through the solid connector member 530 and into the upstanding raised projection 526 on connector member 525, thus melting those portions of the lead components in the path of electrode movement and displacing the molten lead formed into the reservoir defined by the barrel 519. The O-ring seal 528 will automatically be placed under compression prior to initiation of the bonding cycle by the pressures exerted between barrel 519 and back-up compression member 516, which components may again be interconnected by a suitable scissors-type linkage (not shown) to effect the desired compression forces. Thus, the O-ring seal 528 will serve to prevent spilling of any molten lead formed in the area between the partition 506 and the connector member 525. When the electrode 520 is retracted, the molten lead formed will return to the cavity in the work parts, thus providing an effective molecular fusion bond therebetween which will serve to maintain the O-ring under compression. The resulting intercell connection is, therefore characterized not only by the structurally and electrically sound connection established between the two cells but, also, by the creation of an effective seal therebetween.

Referring next to FIG. 36, it will be observed that the connector members 540, 541 are here provided with annular ribs 542, 544 respectively, which sealingly engage the thin-wall partition 506 when the two parts are placed under compression. As here shown, the lower connector member 540 is again seated on a back-up compression member 516 and is provided with an upstanding portion 545 that projects entirely through the partition 506 and through a bore 546 formed in connector member 541. Connector member 541 is provided with an annular flange 548 co-axial with the bore 546, the flange 548 having an internal diameter slightly larger than the external diameter of the portion 545 of connector member 540. The external diameter of radial flange 548 on connector member 541 is dimensioned to fit snuggly within the opening 505 formed in the thin-wall partition 506. Finally, connector member 541 is provided with a locating collar 549 which serves to locate the barrel 519 of a ram assembly 518 utilized with a bonding head embodying the present invention. Thus, when the operator wishes to effect an intercell connection passing through the thin-wall partition, he merely positions the parts as shown in FIG. 36, locates the barrel 519 and ram assembly 518 with respect to the locating collar 549, urges the members 519 and 516 towards one another in the manner previously described and, then initiates a bonding cycle by advancing the electrode 520 any desired distance into the concentric parts 545 and 548 to melt and displace the lead which is latter permitted to return to the cavity formed in the workpieces when the electrode is retracted. Urging of the members 516, 519 together tends to force the ribs 542, 544 into intimate sealing engagement with the thin-wall partition 506, thus establishing an effective seal between the parts.

An arrangement quite similar to that shown in FIG. 36 has been illustrated in FIG. 37. In this case, however, the connector components 550, 551 are not provided with telescoping portions projecting through the opening 505 in thin-wall partition 506. Rather, a sufficient mass of lead is provided in the upper connector member 550 so that when the electrode 520 is advanced through the connector member 550, enough molten lead is created to fill the opening 505 in the thin-wall partition 506 when the electrode 520 is subsequently retracted. It will, of course, be appreciated that the arrangement shown in FIG. 37 will leave a substantial dimple or concavity in the surface of the connector member 550 which is first engaged by the electrode 520 due to the recasting of the parts--i.e., molten lead from the members 550, 551 will have to fill the opening 505 in the partition. This, however, is not detrimental since the connector component 550 is disposed internally of the battery cell. Other configurations, with and without the annular ribs as shown in FIGS. 36 and 37, may also be used to obtain an effective seal for intercell connectors as well as through-the-wall terminal connectors.

N. Battery Plate/Strap Positive Displacement Bonding

The present invention will also find advantageous application in the bonding of battery plates to battery straps to form groups of battery plates of like polarity. Thus, in carrying out this aspect of the invention, and as best illustrated in FIG. 38, it will be observed that there has been provided a battery strap, a fragmentary portion of which is illustrated at 560, which is integral with an upstanding battery past 561. As here illustrated, the strap 560 is provided with a plurality of generally rectangular openings 562 which extend entirely through the strap and which are adapted to receive complementary shaped mounting lugs 564 on battery plates 565. The opposite side of the battery strap 560 is provided with raised locating collars 566 surrounding the ends of the slots 562. Thus, the arrangement is such that the battery strap 560 may be positioned upon one or more stationary compression members 516 with the locating collars 566 facing upwardly (FIG. 39). After the mounting lug 564 on each battery plte 565 is positioned within a slot 562 in the strap 560, the barrel 519 of a positive displacement bonding ram assembly 518 is properly located about the locating collar 566, and the electrode 520 is then advanced into the battery strap 560 so as to melt the portions of the strap forming the upper end of the slot 562 and, at the same time, to melt that portion of the mounting lug 564 on plate 565 that is engaged by the electrode as it advances. When suitable penetration has been achieved, the electrode is retracted, thus permitting the molten lead displaced into the reservoir defined by the barrel 519 to return to the cavity formed in the workpieces where it is permitted to cool and solidify.

Those skilled in the art will appreciate that a single positive displacement bonding ram assembly 518 may be actuated in any desired number of successive operations so as to bond multiple battery plates 565 to the strap 560 in separate bonding operations. Alternatively, multiple ram assemblies 518 (not shown) may be utilized to effect more than one bond at a time. Moreover, it will further be apparent upon inspection of FIGS. 38 and 39 that the barrel 519 and electrode 520 of the ram assembly 518 may have a rectangular configuration complementary to the shape of the rectangular openings 562 and mounting lugs 564, thereby defining an annular reservoir having a rectilinear configuration.

Referring next to FIG. 40, yet another method is shown for bonding lead battery plates of like polarity to one another. As here depicted, a battery plate 570A is positioned on a stationary compression member 516 and a lead spacer 571A is positioned on top of the plate 570A. The lead spacer 571A is provided with a locating collar 572. The arrangement is such that the barrel 519 of a positive displacement ram assembly 518 can be positioned about the locating collar 572 on spacer 571A, and the electrode 520 advanced through the two components to melt the lead in the path of electrode movement and to displace the molten lead into the reservoir defined by the barrel 519. Thus, when the electrode 520 is retracted, the molten lead formed will return to the cavity formed in the work parts where it may cool and solidify. A second battery plate 570B (identical to the plate 570A) may then be placed upon spacer 571A and a second spacer 571B positioned on top of plate 570B. The operation is then repeated to bond spacer 571B and plate 570B together and to the previously bonded spacer 571A and plate 570A. The foregoing procedure can be repeated as many times as desired so as to enable the formation of a stack of plates 570A – 570N of like polarity.

In carrying out this aspect of the invention, and as best illustrated in FIG. 41, it will be appreciated that the procedure described above in connection with FIG. 40 may also be utilized to simultaneously bond both positive plates to one another and negative plates to one another in a single bonding operation; a procedure which, when completed, will result in the formation of stacked and interleaved battery plates of alternate polarity with all of the positive and negative plates having suitable separators therebetween. To accomplish this, a positive plate 570A and spacer 571A may be bonded by the positive displacement ram assembly 518 in the manner previously described. However, in this instance, a separator 580 is first positioned on top of the plate 570A adjacent to and inboard of the spacer 571A, and a negative plate 581A and spacer 582A are then positioned in stacked relation on top of the separator 580. A second positive displacement bonding ram assembly 518A is located over spacer 582A and synchronized to operate simultaneously with the ram assembly 518. Thus, when the electrodes 520, 520A associated with the ram assemblies 518, 518A, respectively, are advanced, the electrode 520 penetrates spacer 571A and positive plate 570A, while electrode 520A penetrates spacer 582A and negative plate 581A, thereby simultaneously bonding the spacer 571A to the positive plate 570A and the spacer 582A to the negative plate 581A. A second separator 580A is then positioned on top of negative plate 581A inboard of spacer 582A, a second positive plate 570B is positioned on top of spacer 571A and separator 580A, a spacer 571B positioned on top of positive plate 570B, a separator 580B is positioned on top of positive plate 570B inboard of the spacer 571B and, a negative plate 581B and spacer 582B are then positioned on top of separator 580B and spacer 582A. At this point, a second simultaneous positive displacement bonding operation takes place in which the spacer 571B and positive plate 570B are bonded to one another and to the previously bonded positive plate 570A and spacer 571A while, at the same time, spacer 582B and negative plate 581B are bonded together and to the previously bonded negative plate 581A and spacer 582A. In the course of such bonding operation, the separators are properly positioned between respective plates of opposite polarity, thus forming a composite battery plate cellular structure consisting of interleaved plates of opposite polarity having separators disposed therebetween.

The present invention also finds advantageous application in the assembly of multiple battery plates of opposite polarity for use in round cells. To this end, and as best illustrated in FIG. 42, there has been depicted a fragmentary portion of a series of round positive battery plates 600, 601, 602 which are separated by spacers 604 located at the outer periphery of the respective positive plates. Similarly, a series of round negative plates 605, 606, etc. are interleaved with the positive plates 600, 601, 602. The round negative plates 605, 606 are preferably separated by spacers 608 disposed on the axis of the round plates.

In carrying out this aspect of the invention, a positive plate 600 is first positioned on a suitable stationary work surface 516 and three or more (but commonly four) spacers 604 are positioned symmetrically about the periphery of the plate 600. A round separator 609 is then deposited on top of the round positive plate 600 co-axial therewith. At this point, a round negative plate 605 is positioned on the separator 609 and a spacer 608 is positioned on the round negative plate on the axis thereof. A positive displacement bonding ram assembly 518 is then positioned over each of the spacers 604 (only one such ram assembly being visible in FIG. 42), there being a confining mold 610 positioned about the spacer 604 and having an upstanding locating collar 611. Similarly, a confining mold 612 having an upstanding locating collar 614 is positioned about the spacer 608 disposed on the axis of the assemblage, and a positive displacement bonding ram 518A is disposed thereover. At this point in the assembly procedure, the ram assembly 518A is properly located and clamped in position with respect to locating collar 614 on confining mold 612 and, at the same time, all of the ram assemblies 518 are properly located and clamped in position with respect to the locating collars 611 on confining molds 610. Once proper location and clamping has been achieved, the electrode 520A and all of the electrodes 520 are simultaneously advanced into and through the underlying spacer and the battery plate positioned immediately below the spacer so as to melt the lead of those components in the path of electrode movement and displace the same into the reservoirs defined by the respective different ram assemblies. The electrodes may then be retracted, at which point the molten lead will return to the cavities formed in the workpieces to form structurally and electrically sound bonds between the negative plate 605 and spacer 608 on the one hand, and between the positive plate 600 and all spacers 604 on the other hand. This process is then repeated as many times as desired with the resultant formation of a stack of interleaved round battery plates of opposite polarity having suitable separators positioned between each set of plates of opposite polarity.

I claim as my invention:

1. Apparatus for bonding $n$ (where $n$ is equal to two or more) meltable component parts together by a positive displacement molecular fusion bonding process, said apparatus comprising, in combination:
   a. means for supporting said $n$ meltable component parts on a work axis;
   b. a frame;
   c. a bonding head carried by said frame in a position overlying the component parts and with freedom for movement relative thereto along x and y coordinates;
   d. a barrel carried by said bonding head for movement along said work axis into sealing engagement with the component parts to be bonded;
   e. a ram carried by said bonding head for movement along said work axis, said ram being coaxial with said barrel and capable of axial movement therethrough;
   f. means for shifting said head in $x$ and/or $y$ oriented directions so as to align said coaxial ram and barrel with said work axis;
   g. means for relatively advancing said barrel and said ram along said work axis into engagement with said component parts;
   h. means for heating said ram to a temperature sufficiently high to melt and form a cavity in those portions of the component parts in the path of ram movement;
   i. ram advancing means for positively displacing the molten material formed by engagement of said heated ram with the component parts into said barrel and storing the molten material therein in heat transfer relation with said heated ram;
   j. means for axially retracting said ram from said component parts so as to enable the displaced molten material stored in said barrel to flow back to said cavity where said material is permitted to cool and solidify to form a uniform molecular fusion bond between said component parts with said bond being coextensive with the degree of penetration of said ram into said component parts; and,
   k. means for effecting relative axial retraction of said barrel from engagement with said component parts following cooling and solidification of said molten material.

2. Apparatus as set forth in claim 1 further including means for introducing an inert gas into said barrel during a bonding operation for the purpose of entraining and removing oxidants present in the region of said bond.

3. An improved method for molecular fusion bonding of $n$ (where $n$ equals two or more) lead components comprising the steps of:
   a. positioning the n lead components on a work axis;
   b. applying to at least one of the lead components a bromide-salt flux formed by the preliminary steps of:
      1. grinding a bromide-salt to form a powder; and,
      2. mechanically blending the powder with petroleum jelly;
   c. positioning a bonding head having a ram and a coaxial barrel over the lead components with the ram disposed on the work axis;
   d. relatively moving the ram and barrel into engagement with the lead components;
   e. heating the ram to a temperature sufficient to convert the lead components in the path of ram movement to the molten state;
   f. moving the heated ram through the barrel and axially into the lead components to at least partially penetrate the components as those portions of the latter within the path of ram movement melt, and displacing the molten lead thus formed upwardly into the barrel in surrounding relation with the ram;
   g. retracting the ram from engagement with the unmelted lead components and the molten lead;
   h. returning the molten lead theretofore displaced into the barrel back to the area of ram penetration into the lead components where such molten lead is permitted to cool and solidify; and,
   i. relatively retracting the barrel from the lead components upon cooling and solidification of the molten lead.

4. The method of claim 3 wherein said bromide salt flux comprises a mixture of hydrazine monohydrobromide and petroleum jelly.

5. The method of claim 4 wherein said mixture consists of on the order of 90% petroluem jelly and 10% hydrazine monohydrobromide.

6. A method of bonding meltable material comprising the steps of:
   a. moving a ram relative to the material so as to cause the ram to engage the material;
   b. establishing a reservoir surrounding the ram and engaged with the material to be bonded;
   c. introducing an inert gas into the reservoir for the purpose of entraining and removing oxidizing agents in the region of the material to be bonded;
   d. heating the ram to a temperature sufficient to convert the meltable material in the path of relative ram movement to the molten state;
   e. moving the heated ram relative to the material and through the reservoir so as to cause the ram to melt the material in its path of relative movement and in the environment of the inert gas to a desired depth in the material with the molten material thus formed being displaced by the ram from the area of ram penetration into the material and shifted therefrom into the reservoir;
   f. retracting the ram relative to the material from its position of maximum penetration so as to cause the ram to be withdrawn from the material; and,
   g. returning the molten material theretofore displaced into the reservoir back to the region of ram penetration into the meltable material where such molten material is permitted to cool and solidify.

7. The method as set forth in claim 6 further characterized in that said inert gas is nitrogen.

8. In a method of forming lead-to-lead bonds between a series of pairs of coaxial lead components with a heated ram, the steps of positioning a first adaptor housing defining a mold cavity and reservoir about a first pair of coaxial lead components, advancing the heated ram into said coaxial components to melt the lead and displace the molten lead into the reservoir, retracting the ram and permitting the molten lead in the reservoir to return to the mold cavity where it cools and solidifies, positioning a second adaptor housing identical to said first housing about a second pair of coaxial lead components, advancing and retracting the heated ram into and from said second housing so as to form a second bond, shifting the first housing to a third pair of coaxial components, again advancing and retracting the heated ram into and from said first housing so as to form a third bond, and repetitively manipulating said first and second housings and said ram with respect to successive pairs of coaxial lead components so as to form successive molecular fusion bonds between such pairs in alternate ones of said first and second housings.

9. An improved method for securing lead battery plates to a lead battery strap, comprising the steps of:
 a. providing a battery strap having a plurality of slots passing through the strap and terminating in raised locating collars surrounding the slots and disposed on a first side of the strap;
 b. providing battery plates having mounting lugs adapted to be passed through said slots from a second side of the strap;
 c. positioning a plurality of battery plates with their mounting lugs passing through respective different ones of said slots;
 d. positioning a bonding head having a ram and a coaxial barrel adjacent said first strap side;
 e. moving the ram and barrel into engagement with the first strap side with the barrel surrounding the locating collar while supporting the opposite strap side and the mounting lugs on a stationary work surface;
 f. heating the ram to a temperature sufficient to convert the lead components in the path of ram movement to the molten state;
 g. moving the heated ram through the barrel and at least partially through the strap and mounting lug with the ram positively displacing the molten lead thus formed upwardly into the barrel in surrounding relation with the ram;
 h. retracting the ram from engagement with the portions of the unmelted lead components and the molten lead;
 i. returning the molten lead theretofore displaced into the barrel back to the area of ram penetration into the strap and mounting lugs where such molten lead is permitted to cool and solidify; and,
 j. retracting the barrel from the strap upon cooling and solidification of the molten lead.

10. The product produced by the process of claim 9.

11. An improved method for assembling lead battery plates in groups comprising the steps of:
 a. positioning a battery plate on a supporting work surface on a work axis;
 b. positioning a lead spacer having an upstanding lead collar on top of the plate with the lead collar coaxial with the work axis;
 c. positioning a bonding head having a ram and a coaxial barrel adjacent the spacer with the ram disposed on the work axis;
 d. moving the ram and barrel into engagement with the spacer with the barrel surrounding the locating collar;
 e. heating the ram to a temperature sufficient to convert the lead components in the path of ram movement to the molten state;
 f. moving the heated ram through the barrel and axially through the spacer and into and at least partially through the plate with the ram positively displacing the molten lead thus formed upwardly into the barrel in surrounding relation with the ram;
 g. retracting the ram from engagement with the unmelted portions of the lead spacer and plate and from the molten lead;
 h. returning the molten lead theretofore displaced into the barrel back to the area of ram penetration into the spacer and plate where such molten lead is permitted to cool and solidify;
 i. retracting the barrel from the spacer upon cooling and solidification of the molten lead;
 j. positioning a second plate of like polarity on top of the spacer and a second spacer on top of the second plate in coaxial relation to the work axis; and,
 k. again advancing and retracting the barrel and ram in the manner set forth in steps d) through i) above to bond the second spacer and plate to one another and to the first spacer and plate.

12. The product produced by the process of claim 11.

13. An improved method for assembling lead battery plates in a group of positive plates interleaved with and separated from a group of negative plates comprising the steps of:
 a. positioning a first battery plate on a supporting work surface on a work axis;
 b. positioning a first lead spacer having an upstanding lead collar on top of the first plate with the lead collar coaxial with the work axis;
 c. positioning a first separator on the first plate;
 d. positioning a second battery plate having a polarity opposite the first plate on the first separator;
 e. positioning a second lead spacer having an upstanding lead collar on top of the second plate and on a second work axis spaced from the first work axis;
 f. positioning a first bonding head having a ram and a coaxial barrel adjacent the first spacer with the ram disposed on the first work axis;
 g. positioning a second bonding head having a ram and a coaxial barrel adjacent the second spacer with the ram disposed on the second work axis;
 h. moving the rams and barrels of the first and second bonding heads into engagement with respective different ones of the first and second spacers with the barrels surrounding the locating collars thereon;
 i. heating the rams to a temperature sufficient to convert the lead components in the paths of ram movement to the molten state;
 j. moving the first and second heated rams through their respective barrels and, respectively, axially through the first and second spacers and into and at least partially through the first and second plates with the rams displacing the molten lead thus formed upwardly into the barrels in surrounding relation with the rams;

k. retracting the rams from engagement with the unmelted portions of the lead spacers and plates and from the molten lead;

l. returning the molten lead theretofore displaced into the barrels back to the areas of ram penetration into the spacers and plates where such molten lead is permitted to cool and solidify; and, m. retracting the barrels from the spacers upon cooling and solidification of the molten lead.

14. The product produced by the process of claim 13.

15. A method as set forth in claim 13 comprising the further steps of:

n. positioning a third separator on the second plate;

o. positioning a third battery plate, having a polarity the same as that of the first plate, on the third separator;

p. positioning a third lead spacer having an upstanding lead collar on top of the third plate on the first work axis;

q. positioning a fourth separator on the third plate;

r. positioning a fourth battery plate, having a polarity the same as that of the second plate, on the fourth separator;

s. positioning a fourth lead spacer having an upstanding lead collar on top of the fourth plate on the second work axis; and, t. again advancing and retracting the barrels and rams of the first and second bonding heads in the manner set forth in steps h) through m) to bond the third plate and third spacer to one another and to the first plate and first spacer, and to simultaneously bond the fourth plate and fourth spacer to one another and to the second plate and second spacer.

16. The product produced by the process of claim 15.

17. A method as set forth in claim 13 wherein said battery plates have a round configuration, and said first work axis passes coaxially through said round plates and a plurality of said second work axes pass vertically through the peripheral portions of round positive plates whereby said first bonding head serves to create molecular fusion bonds between negative plates and spacers on the axis of the round plates and a plurality of said second bonding heads form molecular fusion bonds between positive plates and spacers about the peripheral portions of the positive plates and outboard of the peripheral edges of the interleaved negative plates and separator elements.

18. The product produced by the process of claim 17.

19. An improved method for molecular fusion bonding to form a through-the-wall connection in a lead-acid battery comprising the steps of:

a. positioning the battery with a first lead connector component disposed on one side of a wall in coaxial relation to an opening formed in said wall;

b. positioning a second lead connector component on the opposite side of the wall and in coaxial relation to the wall opening;

c. positioning a bonding head having a ram and a coaxial barrel adjacent the first connector component with the ram disposed on the work axis;

d. moving the ram and barrel into engagement with the first connector component while supporting the second connector component on a stationary work surface;

e. heating the ram to a temperature sufficient to convert the lead components in the path of ram movement to the molten state;

f. moving the heated ram through the barrel and axially through the first connector component and into and at least partially through the second component with the ram positively displacing the molten lead thus formed upwardly into the barrel in surrounding relation with the ram;

g. retracting the ram from engagement with the unmelted portions of the lead components and the molten lead;

h. returning the molten lead theretofore displaced into the barrel back to the area of ram penetration into the first and second connector components where such molten lead is permitted to cool and solidify; and, i. retracting the barrel from the first connector component upon cooling and solidification of the molten lead.

20. The product produced by the process of claim 19.

21. The product as set forth in claim 20 in which said first and second connector components include annular upraised integral ridges surrounding and in coaxial relation to the opening passing through said wall for biting into the wall during a bonding operation and creating a seal between the bonded parts and the wall.

22. The product as set forth in claim 20 in which deformable sealing means are interposed between both of said first and second connector components and said wall.

23. The product as set forth in claim 22 in which said wall comprises a plastic battery cover, said first connector component comprises an intercell connector, said second connector component comprises a battery post passing through the opening in said cover, and said deformable sealing means comprises first and second O-ring seals positioning in recesses formed in said plastic cover between said cover and said connector and said cover and said post respectively.

24. The product as set forth in claim 20 wherein at least one of said first and second connector components includes a portion passing through the opening in said wall.

25. The product as set forth in claim 20 wherein both of said first and second connector components include portions projecting through the opening in said wall.

26. The product as set forth in claim 25 in which one of said first and second connector components includes a tubular flange passing throuth the opening in said wall and the other of said first and second connector components includes a projecting portion extending into said tubular flange.

27. The product as set forth in claim 26 in which the tubular flange includes a tapered bore and said projecting portion of said other connector component has a greater diameter than the minimum diameter of said tapered bore so that when said first and second components are brought together in telescoping relationship, the tubular flange on said first connector component is expanded outwardly into intimate sealing engagement with the wall.

28. The product as set forth in claim 27 in which a sealing gasket is interposed between said tubular bore and said wall.

29. The product as set forth in claim 20 further characterized in that deformable sealing means are interposed between at least one of said connector components and said wall.

30. The product as set forth in claim 29 further characterized in that said wall comprises a plastic battery cover, said first connector component comprises an intercell connector, and said second connector component comprises an upstanding battery post, and wherein said deformable sealing means comprises an O-ring seal disposed in an annular groove formed in said cover and interposed between said cover and said battery post.

31. The product as set forth in claim 30 further characterized in that said cover includes an annular recess in its outer surface coaxial with the opening passing therethrough and wherein lead collar defining means are seated in said recess beneath said intercell connector.

32. The product as set forth in claim 31 wherein said lead collar defining means are integral with said intercell connector.

33. The product as set forth in claim 29 further characterized in that said wall comprises a plastic battery cover, said first connector component comprises an intercell connector, said second connector component comprises a battery post passing through said opening in said cover, and further including a lead bushing passing through said opening in said cover in coaxial surrounding relation to said post, and wherein said deformable sealing means comprises an O-ring seal positioned within a groove formed in said bushing between said bushing and said battery post.

* * * * *

Notice of Adverse Decision in Interference

In Interference No. 99,525, involving Patent No. 3,909,301, R. L. Schenk, Jr., POSITIVE DISPLACEMENT BONDING, final judgment adverse to the patentee was rendered June 30, 1981, as to claim 19.

[*Official Gazette Feb. 1, 1983.*]